United States Patent
You et al.

(10) Patent No.: US 9,544,885 B2
(45) Date of Patent: Jan. 10, 2017

(54) METHOD AND USER DEVICE FOR RECEIVING DOWNLINK SIGNAL, AND METHOD AND BASE STATION FOR TRANSMITTING DOWNLINK SIGNAL

(71) Applicant: LG ELECTRONICS INC., Seoul (KR)

(72) Inventors: Hyangsun You, Anyang-si (KR); Dongyoun Seo, Anyang-si (KR); Yunjung Yi, Anyang-si (KR); Joonkui Ahn, Anyang-si (KR); Suckchel Yang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 20 days.

(21) Appl. No.: 14/418,306

(22) PCT Filed: Jul. 31, 2013

(86) PCT No.: PCT/KR2013/006890
§ 371 (c)(1),
(2) Date: Jan. 29, 2015

(87) PCT Pub. No.: WO2014/021631
PCT Pub. Date: Feb. 6, 2014

(65) Prior Publication Data
US 2015/0245344 A1    Aug. 27, 2015

Related U.S. Application Data

(60) Provisional application No. 61/677,482, filed on Jul. 31, 2012, provisional application No. 61/701,731, filed on Sep. 17, 2012.

(51) Int. Cl.
H04W 72/04      (2009.01)
H04J 11/00      (2006.01)
(Continued)

(52) U.S. Cl.
CPC .......... *H04W 72/0413* (2013.01); *H04J 11/00* (2013.01); *H04L 1/1861* (2013.01);
(Continued)

(58) Field of Classification Search
None
See application file for complete search history.

(56) References Cited

U.S. PATENT DOCUMENTS 8,942,202 B2 *   1/2015   Kim .................. H04L 1/1861
                                                    370/330
2011/0243066 A1*  10/2011  Nayeb Nazar ........ H04L 1/007
                                                    370/328
(Continued)

FOREIGN PATENT DOCUMENTS

WO      2012-070831 A2    5/2012

OTHER PUBLICATIONS

LG Electronics, "Resource allocation for TDD channel selection", R1-110878, 3GPP TSG RAN WG1 #64, Taipei, Taiwan, Feb. 21-25, 2011 See pp. 1-6; and table 4.
(Continued)

*Primary Examiner* — Bunjob Jaroenchonwanit
(74) *Attorney, Agent, or Firm* — Dentons US LLP

(57) ABSTRACT

The present invention relates to a method and user device for transmitting first ACK/NACK information on a first cell group including a primary cell and one or more secondary cells from among a plurality of serving cells on a physical uplink control channel (PUCCH) of a specific cell in the first cell group, and to a method and base station for receiving the first ACK/NACK information on the PUCCH of the specific cell. When the first ACK/NACK information includes only ACIQNACK for the primary cell, the specific cell is the primary cell, and, when the first ACK/NACK information includes ACK/NACK on at least one of the one or more
(Continued)

secondary cells, the specific cell is a secondary cell from among the one or more secondary cells of the first cell group that is set for the ACK/NACK transmission.

16 Claims, 14 Drawing Sheets

(51) Int. Cl.
  *H04L 1/18* (2006.01)
  *H04L 5/00* (2006.01)
  *H04L 5/14* (2006.01)
  *H04W 88/08* (2009.01)
(52) U.S. Cl.
  CPC ............ *H04L 5/0055* (2013.01); *H04L 5/14* (2013.01); *H04W 88/08* (2013.01)

(56) References Cited

U.S. PATENT DOCUMENTS

| | | | |
|---|---|---|---|
| 2012/0082263 A1* | 4/2012 | Ebrahimi Tazeh Mahalleh | ............ H04B 7/0669 375/299 |
| 2012/0083284 A1* | 4/2012 | Harrison | ............... H04L 1/1692 455/450 |
| 2012/0113944 A1* | 5/2012 | Yang | ..................... H04L 1/1861 370/329 |
| 2012/0140743 A1* | 6/2012 | Pelletier | ............ H04W 72/0453 370/335 |
| 2012/0257570 A1* | 10/2012 | Jang | ........................ H04L 5/001 370/328 |
| 2012/0269179 A1* | 10/2012 | Li | ......................... H04L 1/1854 370/336 |
| 2012/0307689 A1* | 12/2012 | Kim | ..................... H04L 1/1861 370/280 |
| 2013/0051264 A1* | 2/2013 | Wang | .................... H04L 5/0098 370/252 |
| 2013/0163406 A1* | 6/2013 | Oizumi | ................. H04L 1/0061 370/216 |
| 2014/0050113 A1* | 2/2014 | Rosa | ................. H04W 52/0229 370/252 |
| 2014/0092865 A1* | 4/2014 | Heo | .................. H04W 52/0258 370/331 |
| 2015/0023286 A1* | 1/2015 | Han | ...................... H04L 1/0027 370/329 |
| 2016/0127105 A1* | 5/2016 | Park | ...................... H04L 1/1861 370/329 |
| 2016/0183210 A1* | 6/2016 | He | .......................... H04W 4/06 370/280 |

OTHER PUBLICATIONS

Pantech "Remaining details of Resource allocation for PUCCH format 3 in TDD", R1-111645, 3GPP TSG RAN1 #65, Barcelona, Spain, May 9-13, 2011 See pp. 1-4.

LG Electronics, "Resource Allocation for TDD PUCCH format 3", R1-110841, 3GPP TSG RAN WG1 Meeting #64, Taipei, Taiwan, Feb. 21-25, 2011 See pp. 1-5.

Samsung, "Resource allocation for PUCCH format 1b with Channel selection in TDD", R1-120156, 3GPP TSG RAN WG1 #68, Dresden, Germany, Feb. 6-10, 2012 See pp. 1-6.

* cited by examiner

FIG. 4
PRIOR ART
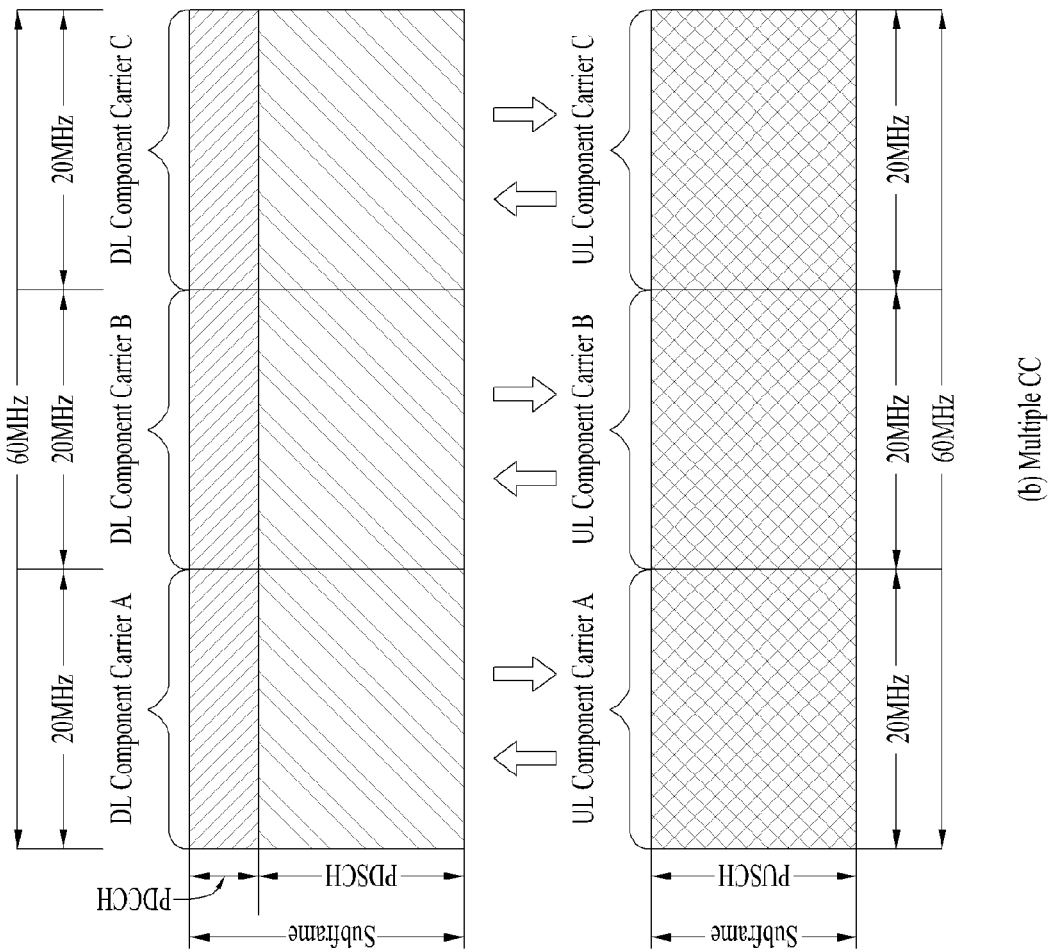
(b) Multiple CC
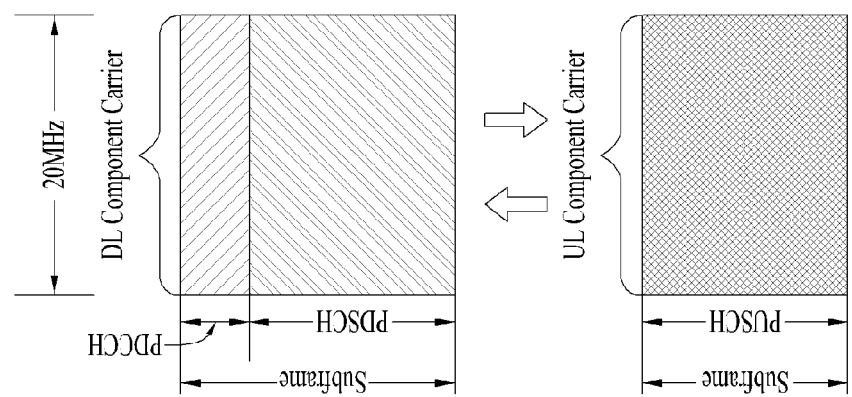
(a) Single CC

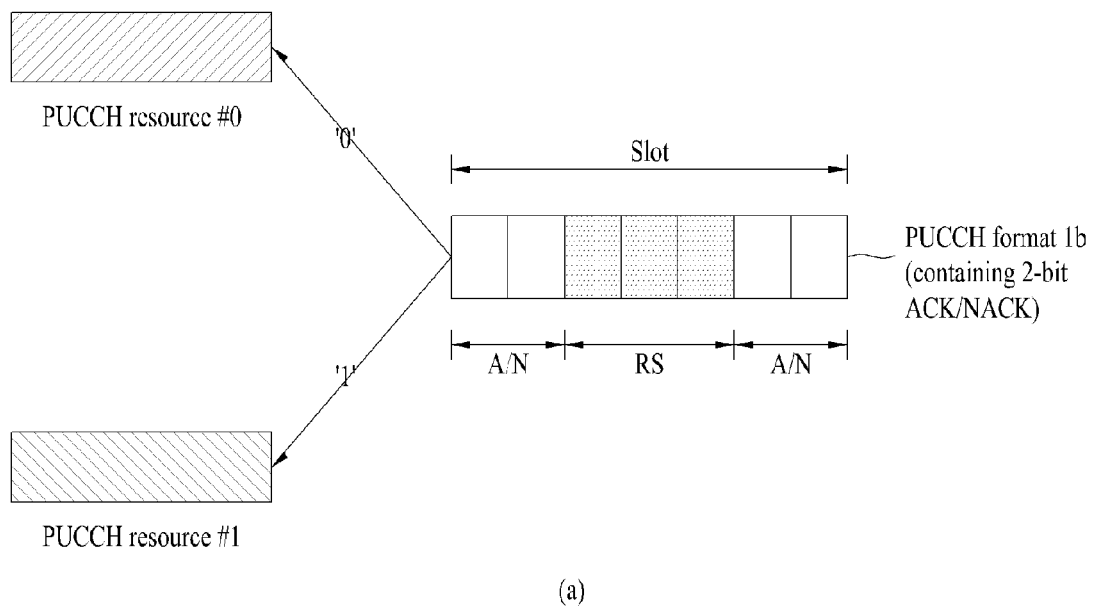
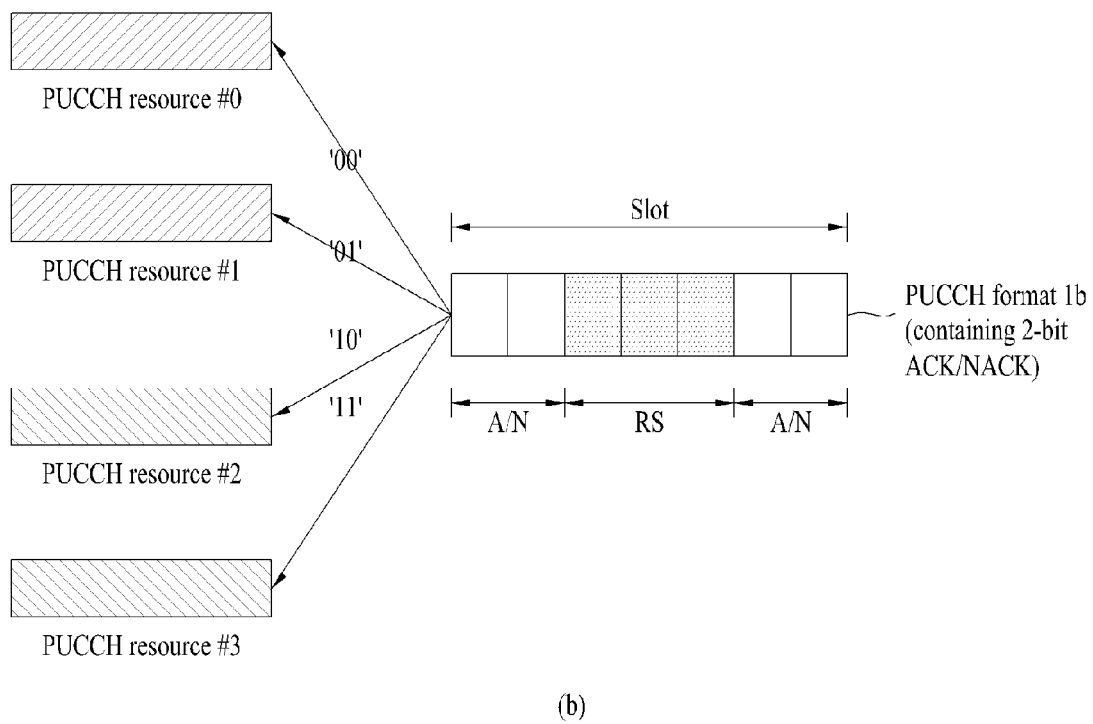
FIG. 12
PRIOR ART

METHOD AND USER DEVICE FOR RECEIVING DOWNLINK SIGNAL, AND METHOD AND BASE STATION FOR TRANSMITTING DOWNLINK SIGNAL

This application is a 35 USC §371 National Stage entry of International Application No. PCT/KR2013/006890 filed on Jul. 31, 2013, and claims priority to U.S. Provisional Application Nos. 61/677,482 filed on Jul. 31, 2012, 61/701,731 filed on Sep. 17, 2012, all of which are hereby incorporated by reference in their entireties as if fully set forth herein.

TECHNICAL FIELD

The present invention relates to a wireless communication system and, more particularly, to a method for transmitting or receiving a downlink signal and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DETAILED DESCRIPTION OF THE INVENTION

Technical Problems

Due to introduction of new radio communication technology, the number of user equipments (UEs) to which an eNB should provide a service in a prescribed resource region increases and the amount of data and control information that the BS should transmit to the UEs increases. Since the amount of resources available to the BS for communication with the UE(s) is limited, a new method in which the BS efficiently transmits downlink control information using the limited radio resources is needed.

Accordingly, the present invention provides a method and apparatus for efficiently transmitting/receiving downlink control information.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method for transmitting uplink control information by a user equipment in which multiple cells are configured, comprising generating first acknowledgement (ACK)/negative acknowledgement (NACK) information for a first cell group including a primary cell and one or more secondary cells among the multiple cells; and transmitting the first ACK/NACK information on a physical uplink control channel (PUCCH) of a specific cell in the first cell group. When the first ACK/NACK information includes only ACK/NACK for the primary cell, the specific cell may be the primary cell. When the first ACK/NACK information includes ACK/NACK for at least one of the one or more secondary cells of the first cell group, the specific cell may be a first secondary cell configured for ACK/NACK transmission among the one or more secondary cells of the first cell group In still another aspect of the present invention, provided herein is a user equipment in which multiple cells are configured to transmit uplink control information, comprising a radio frequency (RF) unit and a processor configured to control the RF unit, wherein the processor generates first acknowledgement (ACK)/negative acknowledgement (NACK) information for a first cell group including a primary cell and one or more secondary cells among the multiple cells; and controls the RF unit to cause the RF unit to the first ACK/NACK information on a physical uplink control channel (PUCCH) of a specific cell in the first cell group. When the first ACK/NACK information includes only ACK/NACK for the primary cell, the specific cell may be the primary cell. When the first ACK/NACK information includes ACK/NACK for at least one of the one or more secondary cells of the first cell group, the specific cell may be a first secondary cell configured for ACK/NACK transmission among the one or more secondary cells of the first cell group.

In still another aspect of the present invention, provided herein is a method for receiving uplink control information by a base station from a user equipment in which multiple cells are configured, comprising performing one or more downlink transmissions through a first cell group including a primary cell and one or more secondary cells among the multiple cells, and receiving first ACK/NACK information for the first cell group on a physical uplink control channel (PUCCH) of a specific cell in the first cell group. When the one or more downlink transmissions include a downlink transmission on the primary cell, the specific cell may be the primary cell, and when the one or more downlink transmissions include a downlink transmission on at least one of the one or more secondary cells of the first cell group, the specific cell may be a first secondary cell configured for ACK/NACK transmission among the one or more secondary cells of the first cell group.

In a further aspect of the present invention, provided herein is a base station for receiving uplink control information from a user equipment in which multiple cells are configured, comprising a radio frequency (RF) unit; and a processor configured to control the RF unit, wherein processor performs one or more downlink transmissions through a first cell group including a primary cell and one or more secondary cells among the multiple cells, and receives first ACK/NACK information for the first cell group on a physical uplink control channel (PUCCH) of a specific cell in the first cell group. Wherein when the one or more downlink transmissions include a downlink transmission on the primary cell, the specific cell may be the primary cell, and when the one or more downlink transmissions include a downlink transmission on at least one of the one or more secondary cells of the first cell group, the specific cell may be a first secondary cell configured for ACK/NACK transmission among the one or more secondary cells of the first cell group.

In each aspect of the present invention, the first ACK/NACK information may be transmitted on the first secondary cell using PUCCH format 3 when the first ACK/NACK information includes ACK/NACK for at least one of the one or more secondary cells of the first cell group.

In each aspect of the present invention, the user equipment may operate in frequency division duplex (FDD), and the first ACK/NACK information may be transmitted on the primary cell using PUCCH format 1a/1b when the first ACK/NACK information includes only ACK/NACK for the primary cell.

In each aspect of the present invention, the user equipment may operate in time division duplex (TDD), the first ACK/NACK information may be transmitted on the primary cell using PUCCH format 1a/1b when the first ACK/NACK information includes only ACK/NACK for the primary cell, wherein the first ACK/NACK information includes only ACK/NACK for a physical downlink control channel (PDCCH) in which a downlink assignment index (DAI) for the primary cell is 1, and the first ACK/NACK information may be transmitted on the primary cell using PUCCH format 3 when the first ACK/NACK information includes only ACK/NACK for the primary cell, wherein the first ACK/NACK information includes ACK/NACK for a PDCCH in which the DAI for the primary cell is greater than 1 (DAI>1).

In each aspect of the present invention, the user equipment may operate in frequency division duplex (FDD), generate second ACK/NACK information for a second cell group including only one or more secondary cells other than the secondary cells belonging to the first cell group among the multiple cells, and transmit the secondary ACK/NACK information on a PUCCH of a second secondary cell configured for ACK/NACK transmission among the one or more secondary cells of the secondary cell group. When the second ACK/NACK information includes ACK/NACK for a cell other than the second secondary cell, the second ACK/NACK information may be transmitted on the second secondary cell using PUCCH format 3. When the second ACK/NACK information includes only ACK/NACK for the second secondary cell, the second ACK/NACK information may be transmitted using PUCCH format 1a/1b.

In each aspect of the present invention, the user equipment may operate in time division duplex (TDD), generate second ACK/NACK information for a second cell group including only one or more secondary cells other than the secondary cells belonging to the first cell group among the multiple cells, and transmit the secondary ACK/NACK information on a PUCCH of a second secondary cell configured for ACK/NACK transmission among the one or more secondary cells of the secondary cell group. When the second ACK/NACK information includes only ACK/NACK for the second secondary cell, wherein the second ACK/NACK information includes only ACK/NACK for a physical downlink control channel (PDCCH) in which a downlink assignment index (DAI) for the second secondary cell is 1, the second ACK/NACK information may be transmitted on the second secondary cell using PUCCH format 1a/1b. When the second ACK/NACK information includes only ACK/NACK for the second secondary cell, wherein the second ACK/NACK information includes ACK/NACK for a PDCCH in which the DAI for the second secondary cell is greater than 1 (DAI>1), the second ACK/NACK information may be transmitted on the second secondary cell using PUCCH format 3

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, downlink control information can be efficiently transmitted/received. Thus, overall throughput of a wireless communication system is raised.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIGS. 4(a) and 4(b) are diagrams for explaining single-carrier communication and multi-carrier communication.

FIGS. 12(a) and 12(b) show exemplary ACKnowledgement/Negative ACK (ACK/NACK) transmission based on channel selection.

MODE FOR CARRYING OUT THE INVENTION

Figure 1:
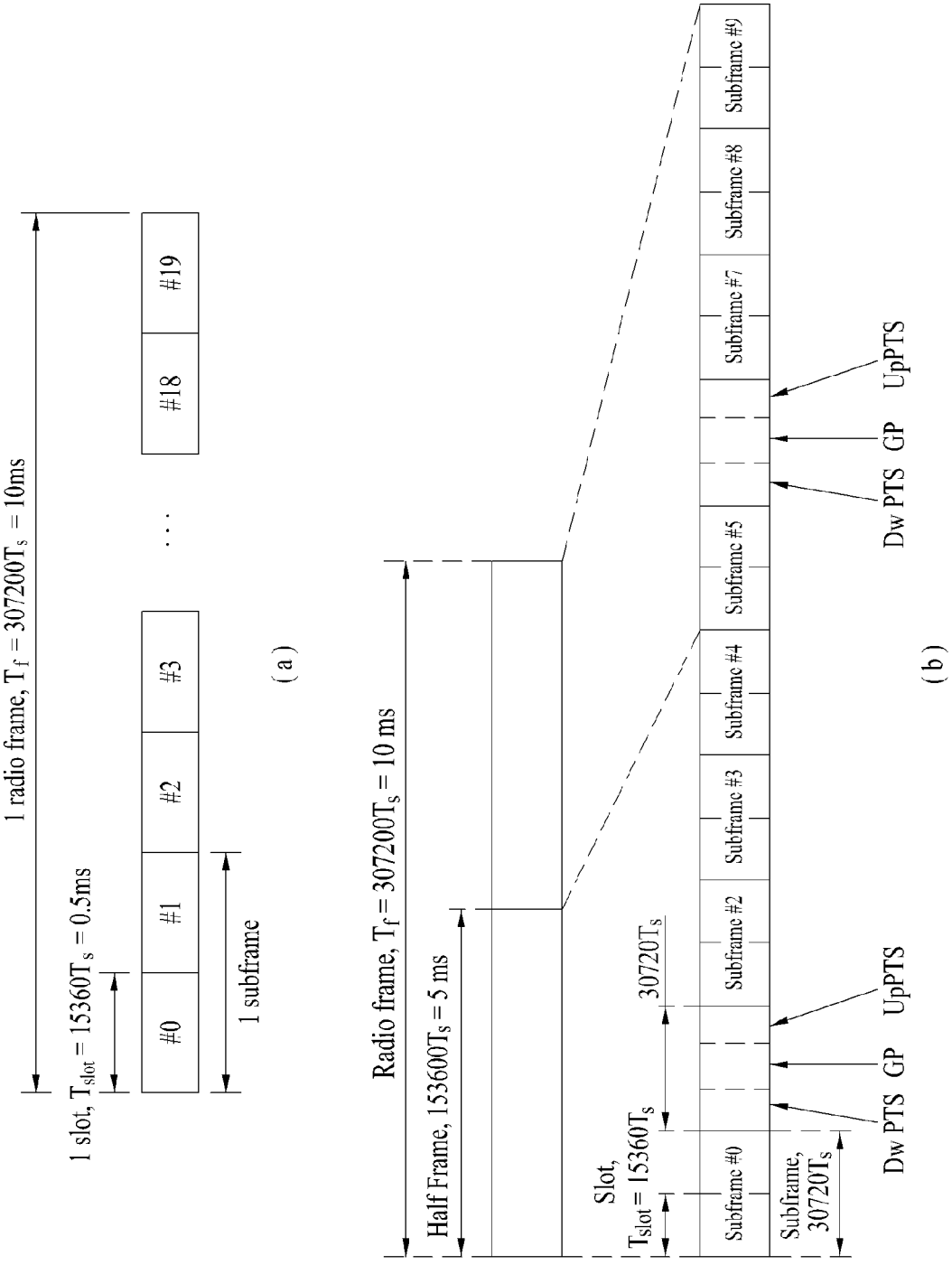
FIGS. 1(a) and 1(b) illustrate the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. In the multi-node system, the same cell identity (ID) or different cell IDs may be used to transmit/receive signals to/from a plurality of nodes. If the plural nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the multi-node system, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g. a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via a plurality of transmit (Tx)/receive (Rx) nodes, signals are transmitted/received via at least one node selected from a plurality of Tx/Rx nodes, or a node transmitting a DL signal is discriminated from a node transmitting a UL signal is called multi-eNB MIMO or coordinated multi-point transmission/reception (CoMP). Coordinated transmission schemes from among CoMP communication schemes may be broadly categorized into joint processing (JP) and scheduling coordination. The former may be divided into joint transmission (JT)/joint reception (JR) and dynamic point selection (DPS) and the latter may be divided into coordinated scheduling (CS) and coordinated beamforming (CB). DPS may be called dynamic cell selection (DCS). When JP is performed, a wider variety of communication environments can be formed, compared to other CoMP schemes. JT refers to a communication scheme by which a plurality of nodes transmits the same stream to a UE and JR refers to a communication scheme by which a plurality of nodes receive the same stream from the UE. The UE/eNB combine signals received from the plurality of nodes to restore the stream. In the case of JT/JR, signal transmission reliability can be improved according to transmit diversity since the same stream is transmitted to/from a plurality of nodes. In JP, DPS refers to a communication scheme by which a signal is transmitted/received through a node selected from a plurality of nodes according to a specific rule. In the case of DPS, signal transmission reliability can be improved because a node having a good channel state between the node and the UE is selected as a communication node.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. An interfering cell refers to a cell interfering with a specific cell. Namely, if a signal of a neighboring cell interferes with a signal of a specific cell, the neighboring cell becomes an interfering cell with respect to the specific cell and the specific cell becomes a victim cell with respect to the neighboring cell. If neighboring cells interfere with each other or unilaterally, such interference is referred to as inter-cell interference (ICI). The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described in detail when carrier aggregation is described.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRS s may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS ports may also be used to indicate a pattern of REs occupied by CRSs/UE-RSs/CSI-RSs in a predetermined resource region.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

Figure 2:
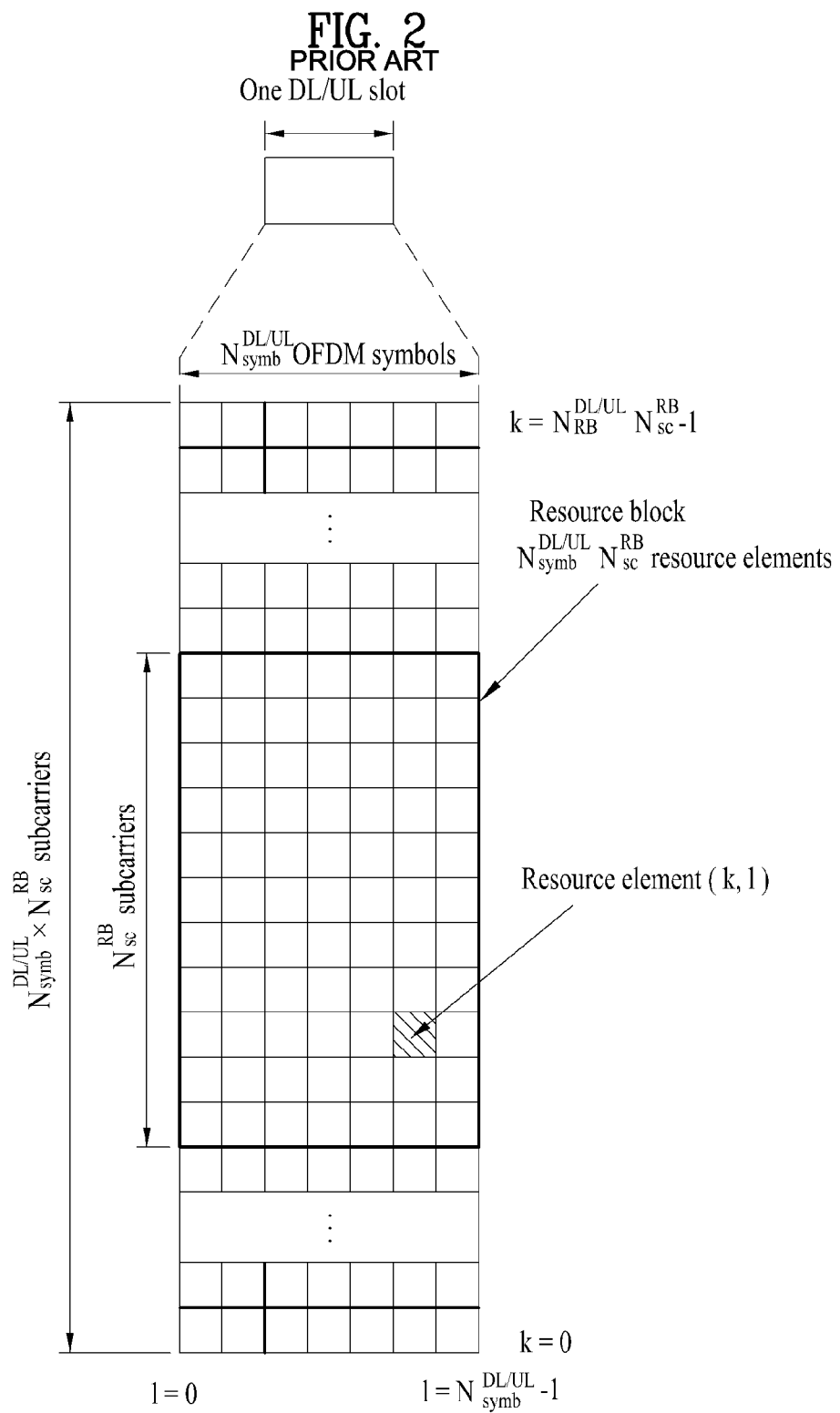
FIG. 2 illustrates the structure of a downlink (DL)/uplink (UL) slot in a wireless communication system.

(RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{DL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | — | — | — |
| 8 | 24144 · $T_s$ | | | — | — | — |

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12)

consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
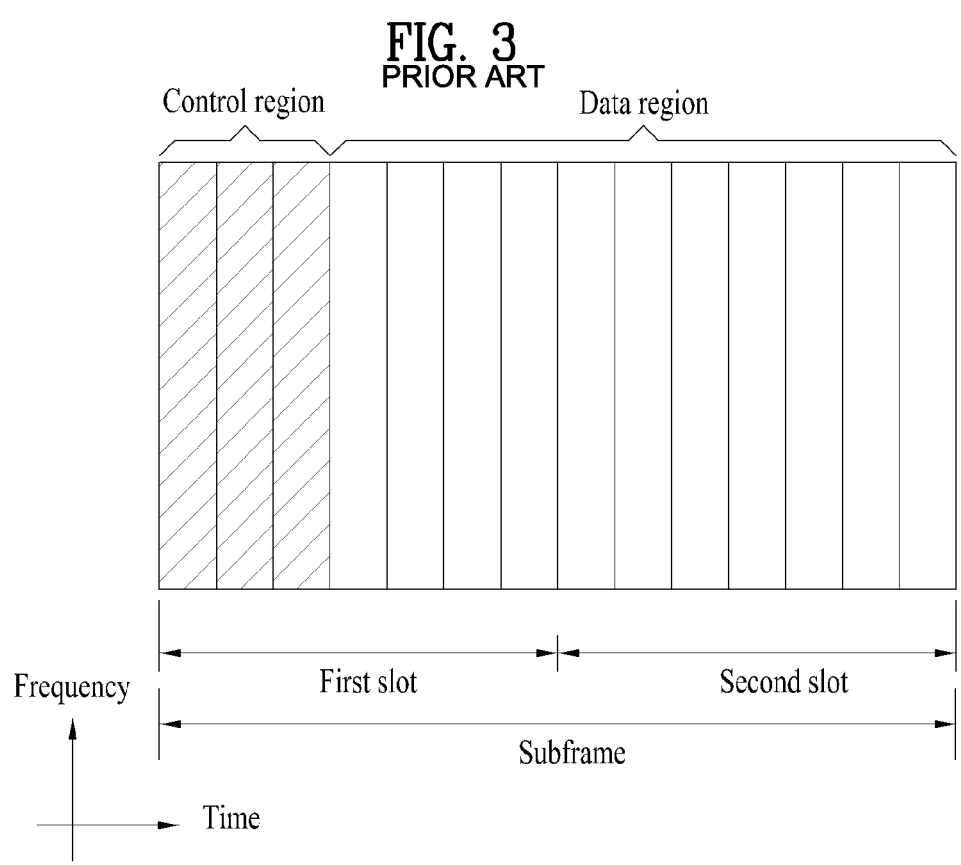
FIG. 3 illustrates the structure of a DL subframe used in a wireless communication system.

FIG. 3 illustrates the structure of a DL subframe used in a wireless communication system.

A DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. Table 3 illustrates an example of the DCI format.

TABLE 3

| DCI format | Description |
| --- | --- |
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |

TABLE 3-continued

| DCI format | Description |
| --- | --- |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

In Table 3, format 0 and 4 are DCI formats defined for UL and formats 1, 1A, 1B, 1C, 1D, 2, 2A, 2B, 2C, 3 and 3A are DCI formats for DL. In addition to the above formats, various formats may be defined.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped into each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). For example, a PCFICH and a PHICH include 4 REGs and 3 REGs, respectively. If the number of REGs not allocated to the PCFICH or the PHICH is $N_{REG}$, CCEs in a DL subframe usable for PDCCH(s) in a system are numbered from 0 to $N_{CCE}-1$ where $N_{CCE}=\text{floor}(N_{REG}/9)$.

The number of DCI formats and DCI bits is determined in accordance with the number of CCEs. The following table shows supported PDCCH formats, the number of CCEs per format, and the supported number of DCI bits per format.

TABLE 4

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are numbered and used consecutively. In order to simplify a decoding process, the PDCCH having a format that includes n number of CCEs may only start on a CCE fulfilling a CCE number corresponding to a multiple of n. For example, a PDCCH composed of n consecutive CCEs PDCCH may be started on only a CCE satisfying 'i mod n=0' where i is a CCE index (or CCE number).

The number of CCEs used for transmission of a specific PDCCH is determined by the BS in accordance with a channel status. For example, one CCE may be required for a PDCCH for a UE (for example, adjacent to BS) having a good downlink channel. However, in case of a PDCCH for a UE (for example, located near the cell edge) having a poor channel, eight CCEs may be required to obtain sufficient robustness. In addition, a power level of the PDCCH may be adjusted to correspond to a channel status.

In a 3GPP LTE/LTE-A system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs for respective PDCCH formats may have different sizes and a dedicated SS and a common SS are defined. The dedicated SS is a UE-specific SS (USS) and is configured for each individual UE. The common SS (CSS) is configured for a plurality of UEs. The following table shows aggregation levels for defining SSs.

TABLE 5

| | Search space $S_k^{(L)}$ | | Number of PDCCH candidates $M^{(L)}$ |
|---|---|---|---|
| Type | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

For the common search spaces, $Y_k$ is set to 0 for the aggregation levels L=4 and L=8. For the UE SS $S^{(L)}_k$ at aggregation level L, the variable $Y_k$ is defined by the following equation.

$$Y_k = (A \cdot Y_{k-1}) \bmod D \quad \text{[Equation 1]}$$

In Equation 1, $Y_{-1} = n_{RNTI}$, A=39827, D=65537 and $k = \lfloor n_s/2 \rfloor$, $n_s$ is the slot number within a radio frame. SI-RNTI, C-RNTI, P-RNTI, RA-RNTI and etc. may be used as an RNTI for $n_{RNTI}$.

For each serving cell on which PDCCH is monitored, the CCEs corresponding to PDCCH candidate m of the search space $S^{(L)}_k$ are given by the following equation.

$$L\{(Y_k + m') \bmod \lfloor N_{CCE,k}/L \rfloor\} + i \quad \text{[Equation 2]}$$

In Equation 2, $Y_k$ may be defined by Equation 12, i=0, . . . , L−1. For the common search space, m'=m. For the UE SS, for the serving cell on which PDCCH is monitored, if the monitoring UE is configured with carrier indicator field, for example, if a upper layer informs the UE of the existence of the carrier indicator field, then m'=m+$M^{(L)} \cdot n_{CI}$ where $n_{CI}$ is the carrier indicator field value. The carrier indicator field value is the same as a serving cell index (ServCellIndex) of a corresponding serving cell. The serving cell index is a short ID used to identify a serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies. In the meantime, if the monitoring UE is not configured with carrier indicator field (CIF) then m'=m, where m'=0, . . . , $M^{(L)}$−1. $M^{(L)}$ is the number of PDCCH candidates to monitor in the given search space. For reference, the CIF is included in DCI and, in carrier aggregation, the CIF is used to indicate for which cell the DCI carries scheduling information. An eNB may inform the UE of whether the DCI received by the UE is capable of including the CIF through a higher layer signal. That is, the UE may be configured with the CIF by a higher layer. That is, in order to confirm whether a PDCCH composed of L CCEs is transmitted to the UE, the UE is configured to check $N^{(L)} (\geq L)$ consecutive CCE(s) or CCE(s) arranged according to a specific rule. For reference, the CIF is included in DCI and, in carrier aggregation, the CIF is used to indicate for which cell the DCI carries scheduling information. An eNB may inform the UE of whether the DCI received by the UE is capable of including the CIF through a higher layer signal. That is, the UE may be configured with the CIF by a higher layer.

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transmission block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

Generally, a DCI format capable of being transmitted to a UE differs according to a transmission mode (TM) configured for the UE. In other words, for the UE configured for a specific TM, only some DCI format(s) corresponding to the specific TM rather than all DCI formats may be used. For example, the UE is semi-statically configured by higher layers so as to receive PDSCH data signaled through a PDCCH according to one of a plurality of predefined TMs. To maintain operation load of the UE according to blind decoding attempt at a predetermined level or less, all DCI formats are not always simultaneously searched by the UE. Table 6 illustrates a transmission mode for configuring multi-antenna technology and a DCI format where the UE performs blind decoding in accordance with the corresponding transmission mode. In particular, Table 6 illustrates a relation between PDSCH and PDCCH configured by C-RNTI.

TABLE 6

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2C | UE specific by C-RNTI | Up to 8 layer transmission, ports 7-1 |

Although TMs 1 to 9 are shown in Table 6, other TMs as well as the TMs defined in Table 6 may be defined.

Referring to Table 6, The UE configured to decode the PDCCH with CRC scrambled in C-RNTI by an upper layer decodes the PDCCH and also decodes the corresponding PDSCH in accordance with each combination defined in Table 6. For example, if the UE is configured in a transmission mode 1 by upper layer signaling, the UE acquires DCI of DCI format 1A or DCI of DCI format 1 by respectively trying to decode the PDCCH with the DCI format 1A and 1. For reference, it can be appreciated that DCI format 1A in Table 6 corresponds to every TM. Such a DCI format configured regardless of a TM is referred to as a DCI format for fallback and a DCI format specific to the TM is referred to as a DCI format for the TM. For example, among DCI formats corresponding to TM 1, DCI format 1A may be the DCI format for fallback and DCI format 1 may be the DCI format for the TM.

If M2M technology, multi-node system technology, later-described cross-CC scheduling technology, etc. are introduced, the amount of PDCCHs that an eNB should transmit is gradually increased. However, since the size of a control region on which the PDCCHs are capable of being transmitted is invariant, transmission of the PDCCHs serves as a bottleneck of system performance. Although channel quality can be improved by introduction of a multi-node system and application of various communication schemes, introduction of a new control channel has been demanded in order to apply an existing communication scheme and carrier aggregation technology to a multi-node environment. Due to this necessity, configuring the new control channel in a data region (hereinafter, a PDSCH region) rather than an existing control region (hereinafter, a PDCCH region) has been discussed. Hereinafter, the new control channel will be referred to as an enhanced PDCCH or an evolved PDCCH (EPDCCH). Using the EPDCCH enables transmission of control information per node to the UE and also can solve shortage of the existing PDCCH region. For reference, unlike a PDCCH which is configured on front OFDM symbol(s) of a predetermined number designated by a PCFICH in a DL subframe, the EPDCCH is configured on OFDM symbols after an OFDM symbol designated by a higher layer signal. In addition, in the case of the PDCCH, available REs on one OFDM symbol among the front OFDM symbol(s) are allocated first to the PDCCH, and then the next OFDM symbol among the front OFDM symbol(s) to the PDCCH. In contrast, in the case of the EPDCCH, PRB pairs of a predetermined number are allocated to the EPDCCH. That is, time resources of the PDCCH occupy only the front OFDM symbol(s) of the predetermined number and frequency resources of the PDCCH are distributed in the frequency domain, whereas time resources of the EPDCCH occupy a plurality of OFDM symbols after OFDM symbols of a predetermined number and frequency resources of the EPDCCH are present only in PRB pairs of a predetermined number. The PDCCH is transmitted through the same antenna port(s) as antenna port(s) configured for transmission of a CRS and the UE configured to decode the PDCCH may demodulate or decode the PDCCH using the CRS. In contrast, the ePDCCH is a channel which is introduced in consideration of a new communication technique or a new communication environment. The EPDCCH is transmitted together with a DMRS transmitted on predetermined resources on which the EPDCCH is configured and the UE configured to decode the EPDCCH demodulates the EPDCCH using the DMRS. For reference, demodulation may be understood as meaning a part of a decoding process and, in the present invention, the term decoding may be used instead of the term demodulation.

FIG. 4 is a diagram for explaining single-carrier communication and multi-carrier communication. Specially, FIG. 4(a) illustrates a subframe structure of a single carrier and FIG. 4(b) illustrates a subframe structure of multiple carriers.

A general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). For example, three 20 MHz CCs in each of UL and DL are aggregated to support a BW of 60 MHz. The CCs may be contiguous or non-contiguous in the frequency domain. Although a BW of UL CC and a BW of DL CC are the same and are symmetrical, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

Figure 5:
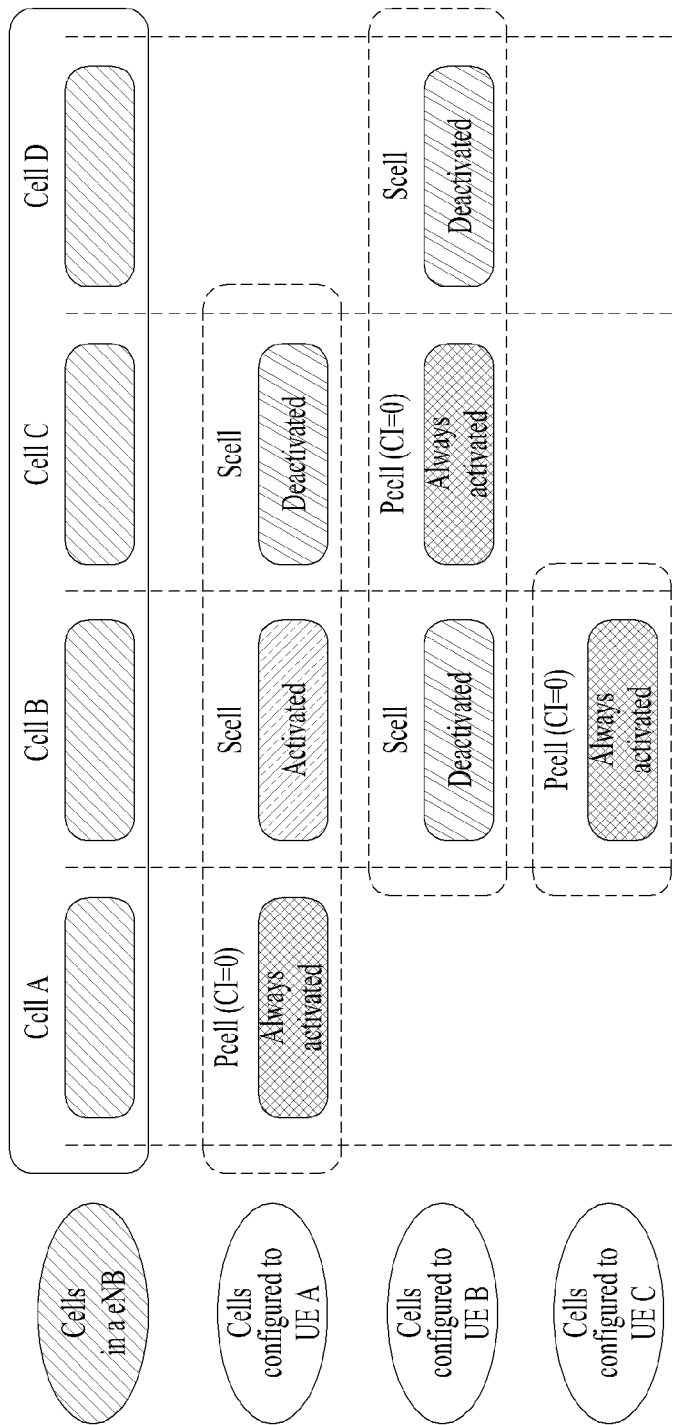
FIG. 5 illustrates the state of cells in a system supporting carrier aggregation.

FIG. 5 illustrates the state of cells in a system supporting carrier aggregation.

In FIG. 5, the configured cell for the UE may be a serving cell in terms of the UE. The configured cell for the UE, i.e. the serving cell, prereserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell. In order to distinguish between serving cell(s), serving cell indexes may be used. For example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term cell used in CA is distinguished from the term cell referring to a prescribed geographic region to which a communication service is provided by one eNB or one antenna group. To distinguish between a cell indicating a prescribed geographic region and a cell of CA, in the present invention, the cell of CA is referred to as a CC and the cell of a geographic region is referred to as a cell.

In a CA situation, a plurality of serving CCs may be configured for one UE. A scheme performed by a control channel for scheduling a data channel can be divided into existing linked carrier scheduling and cross carrier scheduling. In link carrier scheduling, a control channel transmitted on a specific CC schedules only a data channel which is to be transmitted or received on the specific CC. In contrast, in cross carrier scheduling, a serving CC having a good channel state may be used to transmit a UL/DL grant for another serving CC. In cross carrier scheduling, a CC on which a UL/DL grant which is scheduling information is transmitted may be different from a CC on which UL/DL transmission corresponding to the UL/DL grant is performed. In cross carrier scheduling, a control channel schedules, using a carrier indicator field (CIF) in DCI, a data channel transmitted on a CC different from a CC on which a PDCCH carrying the DCI is configured. When cross carrier scheduling (also referred to as cross-CC scheduling) is applied, a PDCCH for DL assignment may be transmitted on, for example, DL CC#0 and a PDSCH corresponding to the PDCCH may be transmitted on, for example, DL CC#2. Whether a CIF is present in the PDCCH may be configured semi-statically and UE-specifically (or UE group-specifically) by higher layer signaling (e.g. RRC signaling). The baseline of PDCCH transmission is summarized as below.

CIF disabled: A PDCCH on a DL CC assigns PDSCH resources on the same DL CC or PUSCH resources on a single linked UL CC.

CIF enabled: A PDCCH on a DL CC can assign PDSCH or PUSCH resources on a specific DL/UL CC among multiple aggregated DL/UL CCs using the CIF.

In the case of presence of the CIF, the eNB may assign a PDCCH monitoring DL CC set for reduction of BD complexity of the UE. The PDCCH monitoring DL CC set is a portion of the entire aggregated DL CCs and includes one or more DL CCs. The UE performs detection/decoding of PDCCHs on corresponding DL CCs. In other words, upon scheduling a PDSCH/PUSCH for the UE, the eNB transmits the PDCCH only through the PDCCH monitoring DL CC set. The PDCCH monitoring DL CC set may be configured UE-specifically, UE-group-specifically, or cell-specifically. The term "PDCCH monitoring DL CC" may be replaced with an equivalent term such as monitoring carrier, monitoring cell, etc. In addition, a CC aggregated for the UE may be replaced with an equivalent term such as serving CC, serving carrier, serving cell, etc.

Figure 6:
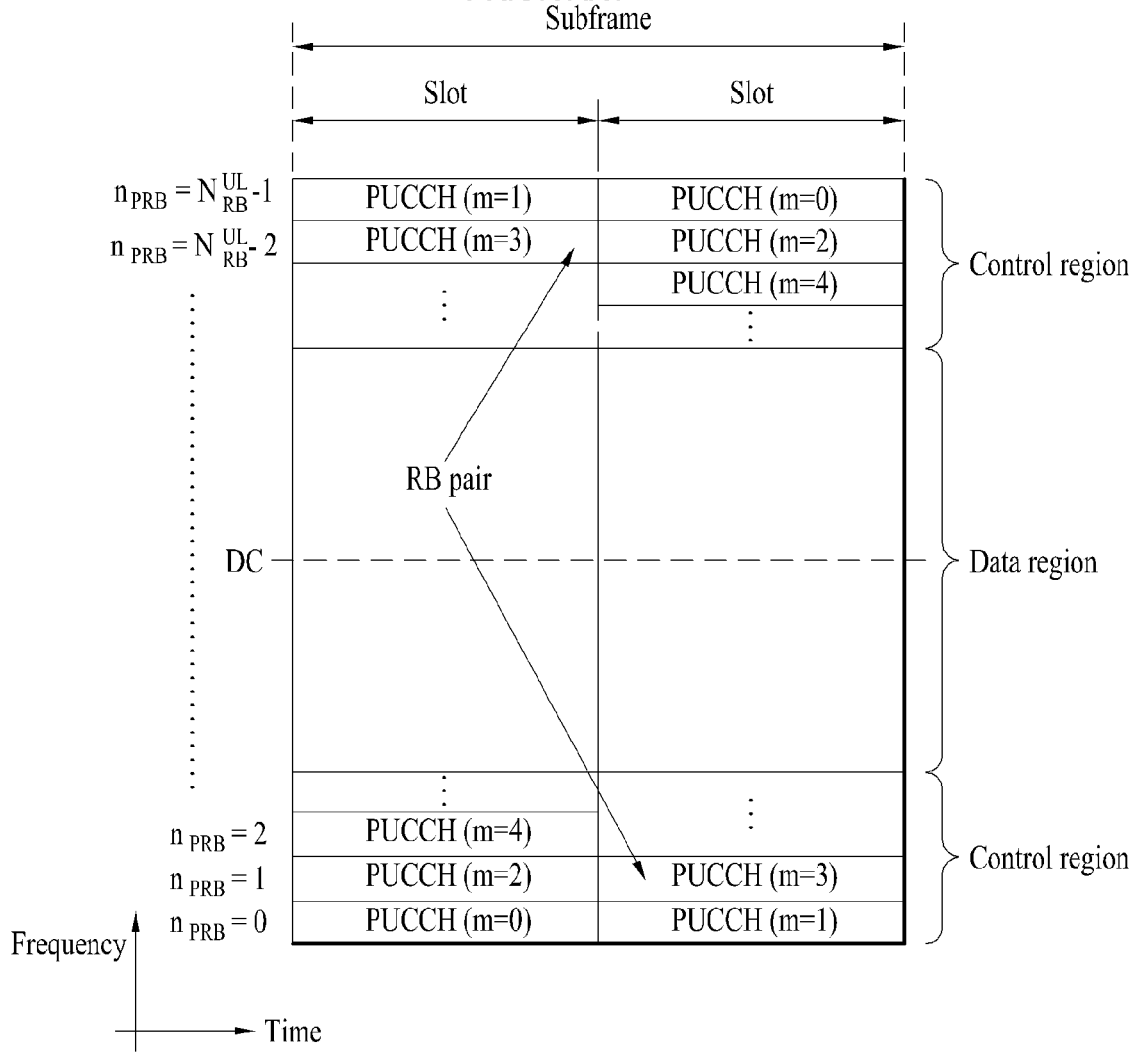
FIG. 6 illustrates the structure of a UL subframe used in a wireless communication system.

FIG. 6 illustrates the structure of a UL subframe used in a wireless communication system.

Referring to FIG. 6, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission bandwidth are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DTX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, multiple input multiple output (MIMO)-related feedback information includes the RI and the PMI. The RI indicates the number of streams or the number of layers that the UE can receive through the same time-frequency resource. The PMI is a value reflecting a space characteristic of a channel, indicating an index of a precoding matrix preferred by a UE for DL signal transmission based on a metric such as an SINR. The CQI is a value of channel strength, indicating a received SINR that can be obtained by the UE generally when an eNB uses the PMI.

If a UE uses a single carrier frequency division multiple access (SC-FDMA) scheme in UL transmission, a PUCCH and a PUSCH cannot be simultaneously transmitted on one carrier in a 3GPP LTE release-8 or release-9 system in order to maintain a single carrier property. In a 3GPP LTE release-10 system, support/non-support of simultaneous transmission of the PUCCH and the PUSCH may be indicated by higher layers.

HARQ is a method used for error control. HARQ-ACK transmitted in DL is used for error control regarding UL data and HARQ-ACK transmitted in UL is used for error control regarding DL data. In DL, an eNB schedules one or more RBs for a UE selected according to a predetermined scheduling rule and transmits data to the UE using the scheduled RBs. Hereinafter, scheduling information for DL transmission will be referred to as a DL grant and a PDCCH carrying the DL grant will be referred to as a DL grant PDCCH. In UL, the eNB schedules one or more RBs for a UE selected according to a predetermined scheduling rule and the UE transmits data using allocated resources in UL. A transmitting device performing a HARQ operation waits for an ACK signal after transmitting data (e.g. transport blocks or codewords). A receiving device performing the HARQ operation transmits an ACK signal only when the data has been correctly received and transmits a NACK signal when there is an error in the received data. Upon receiving the ACK signal, the transmitting device transmits next (new) data but, upon receiving the NACK signal, the transmitting device retransmits data. In a HARQ scheme, error data is stored in a HARQ buffer and initial data is combined with retransmission data in order to raise reception success rate.

The HARQ scheme is categorized as synchronous HARQ and asynchronous HARQ according to retransmission timing and as channel-adaptive HARQ and channel-non-adaptive HARQ depending upon whether channel state is considered during determination of the amount of retransmission resources.

In the synchronous HARQ scheme, when initial transmission fails, retransmission is performed at a timing determined by a system. For example, if it is assumed that retransmission is performed in every X-th (e.g. X=4) time unit (e.g. a TTI or subframe) after initial transmission fails, an eNB and a UE do not need to exchange information about retransmission timing. Therefore, upon receiving a NACK message, the transmitting device may retransmit corresponding data in every fourth time unit until an ACK message is received. In contrast, in the asynchronous HARQ scheme, retransmission timing is determined by new scheduling or additional signaling. That is, the retransmission timing for error data may be changed by various factors such as channel state.

In the channel-non-adaptive HARQ scheme, a modulation and coding scheme (MCS), the number of RBs, etc., which are needed for retransmission, are determined as those during initial transmission. In contrast, in the channel-adaptive HARQ scheme, the MCS, the number of RBs, etc. for retransmission are changed according to channel state. For example, in the channel-non-adaptive HARQ scheme, when initial transmission is performed using 6 RBs, retransmission is also performed using 6 RBs. In contrast, in the channel-adaptive HARQ scheme, even when initial transmission is performed using 6 RBs, retransmission may be performed using RBs less or greater in number than 6 according to channel state.

Based on such classification, a combination of the four HARQ schemes may be considered, but an asynchronous/channel-adaptive HARQ scheme and a synchronous/channel-non-adaptive HARQ scheme are mainly used. In the asynchronous/channel-adaptive HARQ scheme, the retransmission timing and the amount of retransmitted resources are adaptively changed according to channel state so as to maximize retransmission efficiency. However, since overhead is increased, this scheme is generally not considered in UL. Meanwhile, in the synchronous/channel-non-adaptive HAQR scheme, since the retransmission timing and retransmission resource allocation are determined by the system, almost no overhead occurs but retransmission efficiency is very low if this scheme is used in an environment in which the channel state is considerably changed. In current communication system, the asynchronous HARQ scheme is used in DL and the synchronous HARQ scheme is used in UL.

Meanwhile, a time delay occurs until an eNB receives ACK/NACK from a UE and transmits retransmission data after transmitting scheduling information and data according to the scheduling information. The time delay is generated due to a channel propagation delay or a time consumed for data decoding/encoding. Accordingly, if new data is transmitted after a HARQ process which is currently in progress is ended, a gap is created due to a time delay. In order to prevent a gap in data transmission from being created during a time delay duration, a plurality of independent HARQ processes is used. For example, when an interval between initial transmission and retransmission is 7 subframes, 7 independent HARQ processes may be performed to transmit data without a gap. A plurality of parallel HARQ processes enables successive UL/DL transmission while the eNB awaits HARQ feedback for previous UL/DL transmission. Each HARQ process is associated with a HARQ buffer of a medium access control (MAC) layer. Each HARQ process manages state parameters regarding the number of transmissions of a protocol data unit (PDU) in the buffer, HARQ feedback for a MAC PDU in the buffer, a current redundancy version, etc.

The present invention proposes a method for feeding back a result of a HARQ operation to an eNB or a transmitting device and performing an operation according to feedback, when the UE performs a HARQ operation. Upon receiving a data signal using a specific time/frequency resource, the UE checks whether the data signal has been correctly received. If the data signal has been correctly received, the UE transmits ACK and, if not, the UE feeds back NACK. For example, the UE may check whether the data signal has been correctly received by decoding the received data signal and performing CRC check for the decoded signal. If it is determined that decoding of the data signal is successful as a result of CRC check, ACK may be fed back and, if it is determined that decoding of the data signal is unsuccessful (i.e. failure), NACK may be fed back, as HARQ-ACK for the data signal. If ACK is reported, the eNB or the transmitting device determines that the data signal has been successfully received by the UE and, if another data signal is present for the UE, the eNB may transmit scheduling information for the other data signal and transmit the other data signal according to the scheduling information. In contrast, if NACK is reported, the eNB or the transmitting device transmits a signal capable of being used to restore corresponding data (hereinafter, restoration signal), so as to cause the UE to restore error data into original data. For example, the transmitting device transmits parity bit(s) for a data signal reported as having an error to the UE which has reported NACK, as the restoration signal. Upon failing to restore the data signal, the UE stores a reception signal in a HARQ buffer and, upon receiving the restoration signal later, the UE may combine the reception signal with the restoration signal. Hereinafter, the restoration signal will be referred to as a retransmission signal or retransmission data and a first transmitted original signal other than a signal transmitted as the restoration signal by the transmitting device will be referred to as an initial signal or initial data.

With introduction of M2M technology, multi-node systems, carrier aggregation, TDD, etc., a method for effectively transmitting a large amount of ACK/NACK information at one time has been demanded. The present invention proposes a method for effectively transmitting UL ACK/NACK information. First, the terms used in association with UL ACK/NACK information transmission of the present invention are summarized below.

HARQ-ACK (Hybrid Automatic Repeat reQuest Acknowledgement): This represents a reception response result to DL transmission (e.g. PDSCH or SPS release PDCCH), i.e. an ACK/NACK/DTX response (simply, ACK/NACK response, ACK/NACK, A/N response, or A/N). The ACK/NACK response refers to ACK, NACK, DTX, or NACK/DTX. HARQ-ACK for a CC or HARQ-ACK of a CC refers to an ACK/NACK response to DL transmission related to the CC (e.g. scheduled for the CC). A PDSCH may be replaced with a transport block or a codeword.

PDSCH: This corresponds to a DL grant PDCCH. The PDSCH is used interchangeably with a PDSCH with a PDCCH in this specification.

SPS release PDCCH: This refers to a PDCCH indicating SPS release. A UE feeds back ACK/NACK information about the SPS release PDCCH on UL.

SPS PDSCH: This refers to a PDSCH transmitted on DL using resources configured semi-statically by SPS. The SPS PDSCH has no DL grant PDCCH corresponding thereto. In this specification, the SPS PDSCH is used interchangeably with a PDSCH without a PDCCH.

PUCCH index: This corresponds to a PUCCH resource. A PUCCH index indicates, for example, a PUCCH resource index. The PUCCH resource index is mapped to at least one of an orthogonal cover (OC), a cyclic shift (CS), and a PRB.

ARI (ACK/NACK Resource Indicator): This is used to indicate a PUCCH resource. For example, the ARI may be used to indicate a resource change value (e.g. offset) for a specific PUCCH resource (group) (configured by a higher layer). As another example, the ARI may be used to indicate a specific PUCCH resource (group) index in a PUCCH resource (group) set (configured by a higher layer). The ARI may be included in a TPC field of a PDCCH corresponding to a PDSCH on an SCC. PUCCH power control is performed through a TPC field in a PDCCH that schedules a PCC (i.e. PDCCH corresponding to a PDSCH on a PCC). The ARI may be included in a TPC field of a PDCCH other than a PDCCH that has a downlink assignment index (DAI) initial value and schedules a specific cell (e.g. PCell). The ARI is used interchangeably with a HARQ-ACK resource indication value.

DAI (Downlink Assignment Index): This is included in DCI transmitted over a PDCCH. The DAI may indicate an order value or a counter value of a PDCCH. For convenience, a value indicated by a DAI field of a DL grant PDCCH is referred to as a DL DAI and a value indicated by a DAI field of a UL grant PDCCH is referred to as a UL DAI.

Implicit PUCCH resource: This represents a PUCCH resource/index linked to the lowest CCE index of a PDCCH that schedules a PCC or is transmitted on the PCC.

Explicit PUCCH resource: This may be indicated using an ARI.

PDCCH that schedules a CC: This indicates a PDCCH that schedules a PDSCH or a PUSCH on the CC. That is, the PDCCH that schedules a CC refers to a PDCCH corresponding to a PDSCH or a PUSCH on the CC.

PCC (Primary Component Carrier) PDCCH: This represents a PDCCH that schedules a PCC. That is, the PCC PDCCH represents a PDCCH corresponding to a PDSCH or a PUSCH on the PCC. The PCC PDCCH is transmitted only on the PCC on the assumption that cross-CC scheduling is not performed for the PCC.

SCC (Secondary Component Carrier) PDCCH: This represents a PDCCH that schedules an SCC. That is, the SCC PDCCH represents a PDCCH corresponding to a PDSCH or a PUSCH on the SCC. When cross-CC scheduling is permitted for the SCC, the SCC PDCCH may be transmitted on a CC other than the SCC (e.g. on a PCC or another SCC). When cross-CC scheduling is not permitted for the SCC, the SCC PDCCH is transmitted only on the SCC.

Cross-CC scheduling: This refers to an operation of transmitting a PDCCH that schedules an SCC on a CC other than the SCC (e.g. on a PCC or another SCC). When only two CCs of a PCC and an SCC are present, cross-CC scheduling refers to an operation of scheduling/transmitting all PDCCHs only on one PCC.

Non-cross-CC scheduling: This represents an operation of scheduling/transmitting a PDCCH that schedules each CC on the CC.

In the present invention, a CC that carries a PDCCH is referred to as a scheduling CC, a monitoring CC, or an MCC and a CC that carries a PDSCH/PUSCH scheduled by the PDCCH is referred to as a scheduled CC.

UCI carried by one PUCCH may differ in size and usage according to a PUCCH format and differ in size according to a code rate. The following table shows a mapping relationship between a PUCCH format and UCI.

TABLE 7

| PUCCH format | Uplink Control Information (UCI) |
|---|---|
| Format 1 | Scheduling Request (unmodulated waveform) |
| Format 1a | 1-bit HARQ ACK/NACK with/without SR |
| Format 1b | 2-bit HARQ ACK/NACK with/without SR |
| Format 2 | CSI (20 coded bits) |
| Format 2 | CSI and 1- or 2-bit HARQ ACK/NACK (20 bits) for extended CP only |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 bits) |

Referring to Table 7, PUCCH format series 1 is mainly used to transmit ACK/NACK information, PUCCH format series 2 is mainly used to transmit channel state information (CSI) such as CQI/PMI/RI, and PUCCH format series 3 is mainly used to transmit ACK/NACK information.

Figure 7:
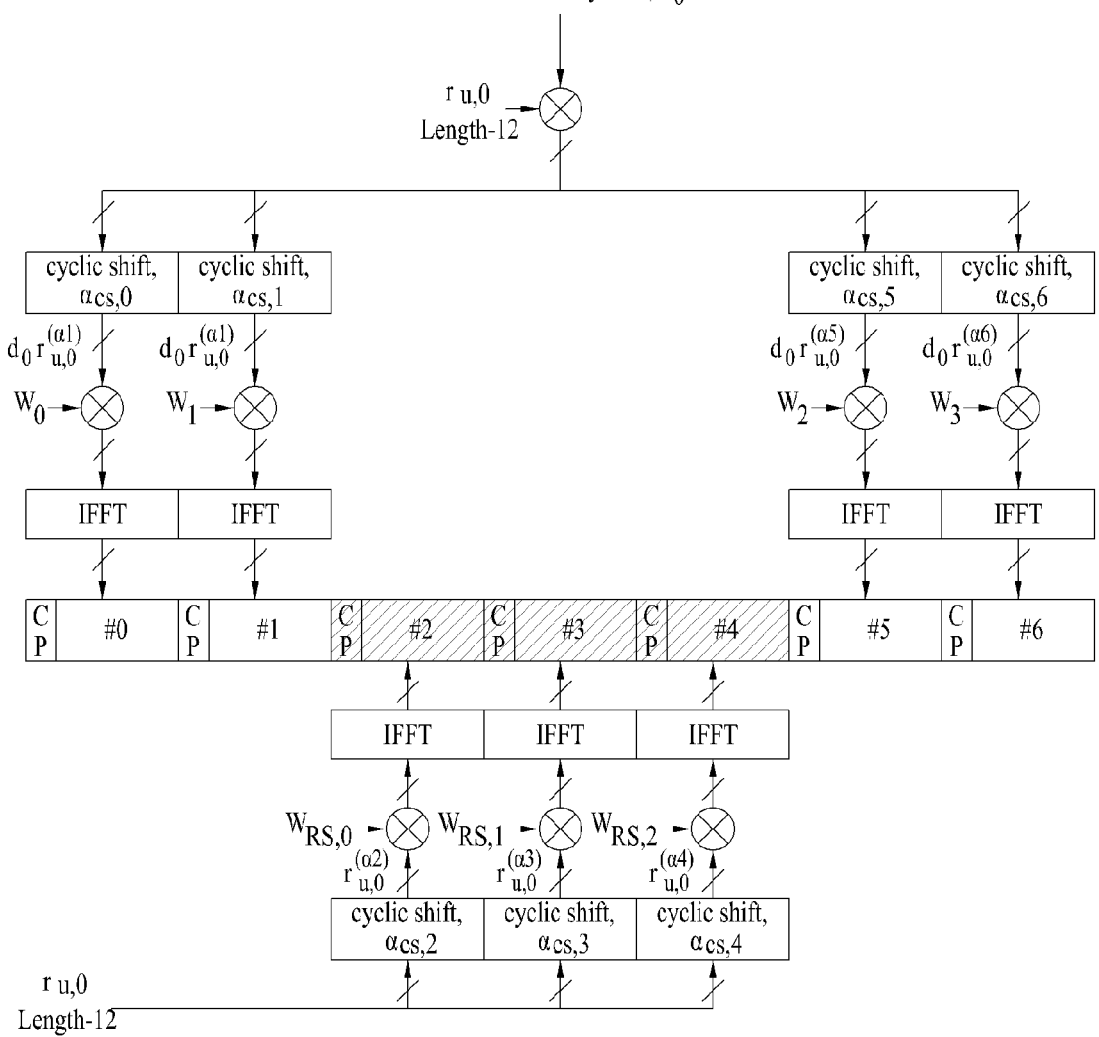
FIG. 7 illustrates a slot level structure of PUCCH format 1a/1b.

FIG. 7 illustrates a slot level structure of PUCCH format 1a/1b.

PUCCH format 1a/1b is used for ACK/NACK transmission. In a normal CP, SC-FDMA symbol #2/#3/#4 is used for demodulation reference signal (DM RS) transmission. In an extended CP, SC-FDMA symbol #2/#3 is used for DM RS transmission. Therefore, 4 SC-FDMA symbols in a slot are used for ACK/NACK transmission. For convenience, PUCCH format 1a/1b is referred to as PUCCH format 1.

Referring to FIG. 7, 1-bit [b(0)] and 2-bit [b(0)b(1)] ACK/NACK information are modulated by a binary phase shift keying (BPSK) modulation scheme and a quadrature phase shift keying (QPSK) modulation scheme, respectively and are generated as one ACK/NACK modulation symbol $d_0$. Each bit [b(i), i=0,1] of the ACK/NACK information represents a HARQ response to a corresponding DL transport block. Each bit [b(i), i=0,1] of the ACK/NACK information is 1 for positive ACK and 0 for a negative ACK (NACK). Table 8 shows a modulation table defined for PUCCH formats 1a and 1b in legacy LTE.

TABLE 8

| PUCCH format | b(0), . . . , b($M_{bit}$ − 1) | d(0) |
|---|---|---|
| 1a | 0 | 1 |
|  | 1 | −1 |
| 1b | 00 | 1 |
|  | 01 | −j |
|  | 10 | j |
|  | 11 | −1 |

PUCCH format 1a/1b performs cyclic shift ($a_{cs,x}$) in the frequency domain and performs spreading using an orthogonal spreading code (e.g. WalshHadamard or DFT code) ($w_0, w_1, w_2, w_3$) in the time domain. Since code multiplexing is performed in both the frequency domain and the time domain, more UEs can be multiplexed in the same PUCCH RB.

The ACK/NACK modulation symbol $d_0$, i.e. the complex-valued symbol $d(0)$ is multiplied with a cyclically shifted length $N^{PUCCH}_{seq}=12$ sequence $r_{u,v}^{(\tilde{a}_p)}(n)$ for each of the P antenna ports used for PUCCH transmission according to the following equation.

$$y^{(\tilde{p})}(n) = \frac{1}{\sqrt{P}} d(0) \cdot r_{u,v}^{(\alpha_{\tilde{p}})}(n), n = 0, 1, \ldots, N^{PUCCH}_{seq} - 1 \quad \text{[Equation 3]}$$

In Equation 3, $r_{u,v}^{(\tilde{a}_p)}(n)$ is defined by a cyclic shift a of a base sequence $r_{u,v}^{(\tilde{a}_p)}(n)$ according to the following equation.

$$r_{u,v}^{(\alpha)}(n) = e^{j\alpha n} \bar{r}_{u,v}(n), 0 \leq n < M^{RS}_{sc} \quad \text{[Equation 4]}$$

For PUCCH format 1a/1b, $M^{RS}_{sc}=N^{PUCCH}_{seq}$. Base sequences $\bar{r}_{u,v}(n)$ are divided into groups, where $u \in \{0, 1, \ldots, 29\}$ is the group number and v is the base sequence number within the group, such that each group contains one base sequence (v=0) of each length $M^{RS}_{sc}=mN^{RB}_{sc}$, $1 \leq m \leq 5$ and two base sequences (v=0,1) of each length $M^{RS}_{sc}=mN^{RB}_{sc}$, $6 \leq m \leq N^{max,UL}_{RB}$. For PUCCH format with $M^{RS}_{sc}=1 \cdot N^{RB}_{sc}$, base sequence is given by the following equation.

$$\bar{r}_{u,v}(n) = e^{j\phi(n)\pi/4}, 0 \leq n \leq M^{RB}_{sc} - 1 \quad \text{[Equation 5]}$$

In Equation 5, $\phi(n)$ for $M^{RS}_{sc}=1 \cdot N^{RB}_{sc}$ is given by the following table.

TABLE 9

| u | $\phi(0), \ldots, \phi(11)$ | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | 3 | 3 | 1 | −1 |

The sequence-group number u in slot $n_s$ is defined by a group hopping pattern $f_{gh}(n_s)$ and a sequence-shift pattern $f_{ss}$ according to the following equation.

$$u = (f_{gh}(n_s) + f_{ss}) \bmod 30 \quad \text{[Equation 6]}$$

There are 17 different hopping patterns and 30 different sequence-shift patterns. Sequence-group hopping can be enabled or disabled by a specific parameter provided by the higher layer. The group-hopping pattern $f_{gh}(n_s)$ for PUCCH is given by the following equation.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad \text{[Equation 7]}$$

The pseudo-random sequence c(i) may be defined by the following equation.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 8]}$$

In Equation 8, $N_c=1600$ and the first m-sequence is initialized with $x_1(0)=1$, $x_1(n)=0$, $n=1, 2, \ldots, 30$. The initialization of the second m-sequence is denoted by $c_{init}=\sum_{i=0}^{30} x_2(i) \cdot 2^i$ with a value depending on the application of the sequence.

In Equation 7, the pseudo-random sequence generator is initialized with $$c_{init} = \left\lfloor \frac{N^{cell}_{ID}}{30} \right\rfloor$$

at the beginning of each radio frame. The sequence-shift pattern $f_{ss}$ for PUCCH, $f_{ss}^{PUCCH}$, is given by $f_{ss}^{PUCCH} = N^{cell}_{ID} \bmod 30$.

Figure 8:
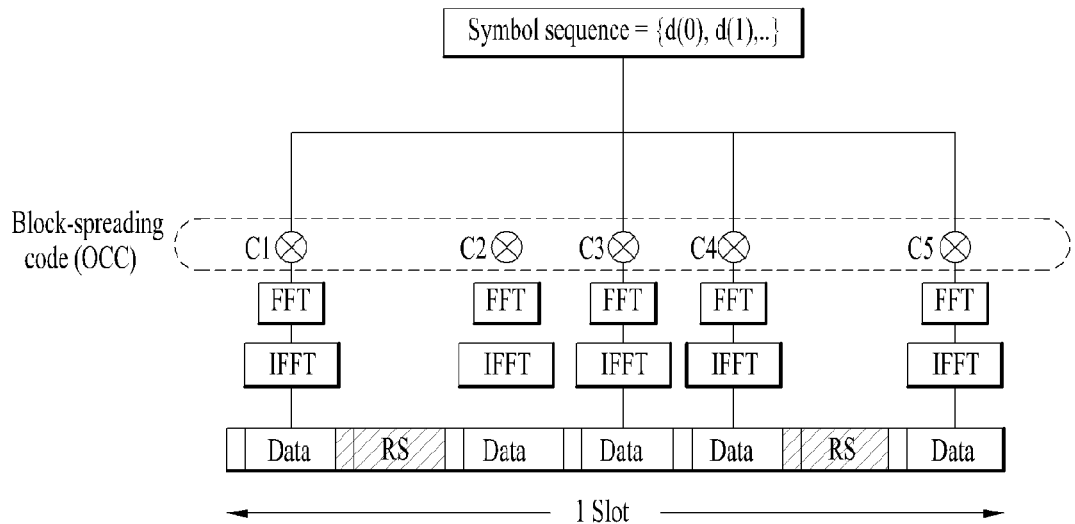
FIG. 8 illustrates a PUCCH format based on block spreading.

FIG. 8 illustrates a PUCCH format based on block spreading.

A block spreading scheme is to transmit a symbol sequence after spreading the symbol sequence in the time domain by an orthogonal cover code (OCC) (also called an orthogonal sequence). According to the block spreading scheme, control signals of multiple UEs may be multiplexed in the same RB by the OCC and then transmitted to an eNB. In PUCCH format 2, one symbol sequence is transmitted in the time domain, wherein UCI of the UEs is multiplexed using a cyclic shift of a CAZAC sequence (i.e. CCS) and then transmitted to the eNB. On the other hand, in a block spreading based new PUCCH format (hereinafter, PUCCH format 3), one symbol sequence is transmitted in the frequency domain, wherein the UCI of the UEs is multiplexed using OCC based time-domain spreading and then transmitted to the eNB. Referring to FIG. 8 as an example, one symbol sequence is spread by a length-5 (i.e. SF=5) OCC and then mapped to 5 SC-FDMA symbols. Although a total of 2 RS symbols is used during one slot in FIG. 8, 3 RS symbols may be used and an OCC of SF=4 may be used for spreading of the symbol sequence and multiplexing of the UEs. Here, the RS symbols may be generated from a CAZAC sequence having a specific cyclic shift and may be transmitted in a form of applying (multiplying) a specific OCC to a plurality of RS symbols in the time domain. In FIG. 8, fast Fourier transform (FFT) may be applied in advance before the OCC and discrete Fourier transform (DFT) may be applied instead of FFT.

For convenience of description, such a channel coding based scheme for transmitting a plurality of ACK/NACK signals using PUCCH format 2 or PUCCH format 3 is referred to as a "multi-bit ACK/NACK coding" transmission method. This method indicates a method for transmitting an ACK/NACK coded block generated by channel-coding ACK/NACK information or DTX information (indicating that a PDCCH has not been received/detected) for PDSCH(s) of multiple DL CCs, i.e. PDSCH(s) transmitted on multiple DL CCs. For example, if the UE receives two codewords (CWs) by operating in a single user MIMO (SU-MIMO) mode on any DL CC, the UE may transmit one of a total of 4 feedback states of ACK/ACK, ACK/NACK, NACK/ACK, and NACK/NACK per CW on the DL CC or one of a maximum of 5 feedback states including DTX. If the UE receives a single CW, there may be a maximum of 3 states of ACK, NACK, and DTX (if NACK and DTX are identically processed, there may be a total of two states of ACK and NACK/DTX). Accordingly, if a maximum of 5 DL CCs are aggregated for the UE and the UE operates in an SU-MIMO mode on all CCs, there may be a maximum of $5^5$ transmittable feedback states and the size of an ACK/NACK payload for representing these states is a total of 12 bits. If DTX and NACK are identically processed, the number of feedback states is $4^5$ and the size of the ACK/NACK payload for representing these states is a total of 10 bits.

Physical resources used for PUCCHs depend on two parameters, $N^{(2)}_{RB}$ and $N^{(1)}_{CS}$, given by higher layers. The parameter $N^{(2)}_{RB}$, $N_{RB}^{(2)}$ which is equal to or greater than 0 ($N^{(2)}_{RB} \geq 0$), indicates available bandwidth for PUCCH format 2/2a/2b transmission at each slot and is expressed as an integer multiple of $N^{RB}_{SC}$. The parameter $N^{(1)}_{CS}$ $N_{CS}^{(1)}$ indicates the number of cyclic shifts used for PUCCH format 1/1a/1b in an RB used for a mixture of format 1/1a/1b and format 2/2a/2b. A value of $N^{(1)}_{CS}$ $N_{CS}^{(1)}$ is an integer multiple of $\Delta_{shift}^{PUCCH}$ within a range of $\{0, 1, \ldots, 7\}$. $\Delta^{PUCCH}_{shift}$ is provided by higher layers. If $N^{(1)}_{CS}$ $N_{CS}^{(1)}$ is 0, no mixed RBs are present. At each slot, at most one RB supports a mixture of PUCCH format 1/1a/1b and PUCCH format 2/2a/2b. Resources used for transmission of PUCCH format 1/1a/1b, PUCCH format 2/2a/2b, and PUCCH format 3 by antenna port p are expressed by $n^{(1,\tilde{p})}_{PUCCH}$, $n^{(2,\tilde{p})}_{PUCCH} < N^{(2)}_{RB} N^{RB}_{sc} + \mathrm{ceil}(N^{(1)}_{cs}/8) \cdot (N^{RB}_{sc} - N^{(1)}_{CS} - 2)$, and $n^{(3,\tilde{p})}_{PUCCH} n_{PUCCH}^{(1,\tilde{p})}$, respectively, which are indexes of non-negative integer indexes.

A UE is assigned a PUCCH resource for UCI transmission by an eNB through an explicit scheme using a higher-layer signal or through an implicit scheme using a dynamic control signal.

More specifically, an orthogonal sequence and/or a cyclic shift to be applied to UCI are determined from PUCCH resource indexes according to a specific rule predefined for each PUCCH format, and resource indexes of two RBs in a subframe, to which a PUCCH is to be mapped, are provided. For example, a PRB for PUCCH transmission in a slot $n_s$ is given as follows.

$$n_{PRB} = \begin{cases} \left\lfloor \frac{m}{2} \right\rfloor & \text{if } (m + n_s \bmod 2) \bmod 2 = 0 \\ N_{RB}^{UL} - 1 - \left\lfloor \frac{m}{2} \right\rfloor & \text{if } (m + n_s \bmod 2) \bmod 2 = 1 \end{cases} \quad \text{[Equation 9]}$$

In Equation 9, the variable m depends on the PUCCH format. PUCCH format 1/1a/1b, PUCCH format 2/2a/2b, and PUCCH format 3 are given by Equation 10, Equation 11, and Equation 12, respectively.

$$m = \begin{cases} N^{(2)}_{RB} & \text{if } n^{(1,\tilde{p})}_{PUCCH} < c \cdot \frac{N^{(1)}_{cs}}{\Delta^{PUCCH}_{shift}} \\ \left\lfloor \frac{n^{(1,\tilde{p})}_{PUCCH} - c \cdot \frac{N^{(1)}_{cs}}{\Delta^{PUCCH}_{shift}}}{c \cdot \frac{N^{RB}_{sc}}{\Delta^{PUCCH}_{shift}}} \right\rfloor + N^{(2)}_{RB} + \left\lceil \frac{N^{(1)}_{cs}}{8} \right\rceil & \text{otherwise} \end{cases} \quad \text{[Equation 10]}$$

$$c = \begin{cases} 3 & \text{normal cyclic prefix} \\ 2 & \text{extended cyclic prefix} \end{cases}$$

In Equation 10, $n_{PUCCH}^{(1,\tilde{p})}$ denotes a PUCCH resource index of an antenna port $\tilde{p}$ for PUCCH format 1/1a/1b. For ACK/NACK PUCCH, $n_{PUCCH}^{(1,\tilde{p})}$ is a value implicitly determined by the first CCE index of a PDCCH carrying scheduling information of a corresponding PDSCH.

$$m = \lfloor n_{PUCCH}^{(2,\tilde{p})} / N_{sc}^{RB} \rfloor \quad \text{[Equation 11]}$$

where $n_{PUCCH}^{(2,\tilde{p})}$ denotes a PUCCH resource index of an antenna port $\tilde{p}$ for PUCCH format 2/2a/2b and is a value transmitted to a UE from an eNB through higher-layer signaling.

$$m = \lfloor n_{PUCCH}^{(3,\tilde{p})} / N_{SF,0}^{PUCCH} \rfloor \quad \text{[Equation 12]}$$

$n_{PUCCH}^{(3,\tilde{p})}$ denotes a PUCCH resource index of an antenna port $\tilde{p}$ for PUCCH format 3 and is a value transmitted to a UE from an eNB through higher-layer signaling. $N^{PUCCH}_{SF,0}$ indicates a spreading factor for the first slot of a subframe. For all of two slots of a subframe using normal PUCCH format 3, $N^{PUCCH}_{SF,0}$ is 5. For first and second slots of a subframe using a reduced PUCCH format 3, $N^{PUCCH}_{SF,0}$ $n_{SF,0}^{PUCCH}$ is 5 and 4, respectively.

Figure 9:
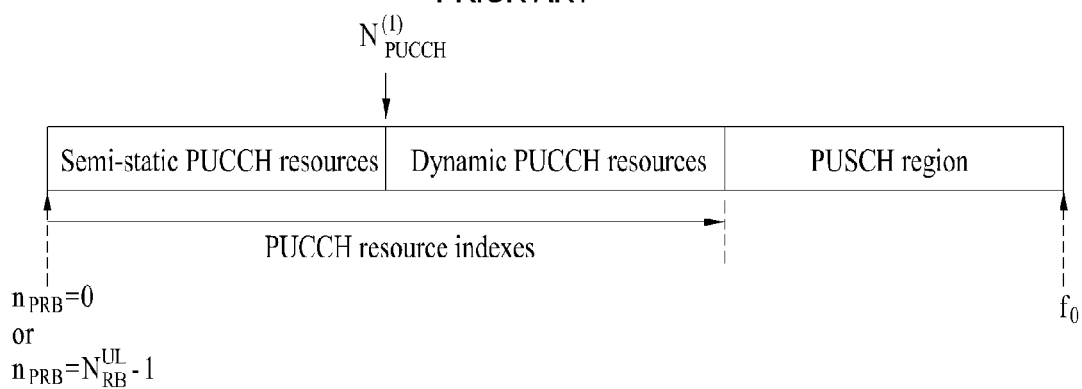
FIG. 9 illustrates logical arrangement of physical uplink control channel (PUCCH) resources used in one cell.

FIG. 9 illustrates logical arrangement of PUCCH resources used in one cell.

PUCCH resources configured on one CC include PUCCH resources for transmission of CSI, PUCCH resources for transmission of SPS ACK/NACK and SR, and PUCCH resources for transmission of dynamic ACK/NACK (i.e. PUCCH resources dynamically allocated in linkage with a PDCCH). In a 3GPP LTE/LTE-A system, the PUCCH resources for transmission of CSI, SPS ACK/NACK, SR, etc. are semi-statically reserved by a higher layer signal in an explicit manner. Hereinafter, the PUCCH resources dynamically determined in linkage with the PDCCH for transmission of ACK/NACK will be especially referred to as dynamic PUCCH resources or implicit PUCCH resources, and PUCCH resources explicitly configured by a higher layer signal will be especially referred to as semi-static PUCCH resources or explicit PUCCH resources.

Referring to FIG. 9, PUCCH resources for one cell (e.g. $N^{cell}_{ID}$) or one CC are arranged in order of CSI PUCCH resources, SPS ACK/NACK and SR PUCCH resources, and dynamic ACK/NACK PUCCH resources, starting from subcarriers distant from a direct current (DC) subcarrier (i.e. a subcarrier mapped to $f_0$ in a frequency up-conversion process) in the direction of the DC subcarrier. In other words, the PUCCH resources configured semi-statically by higher layer signaling are located at the outer side of UL transmission bandwidth and the ACK/NACK PUCCH resources configured dynamically are located nearer a center frequency than the semi-statically configured PUCCH resources. As a PUCCH resource is nearer the center frequency, an index of the PUCCH resource increases. In other words, an index of a PUCCH resource allocated to a PRB near the center frequency is greater than an index of a PUCCH resource allocated to a PRB distant from the center frequency. Multiple PUCCH resources in the same PRB are indexed based on a PRB orthogonal sequence and/or a cyclic shift.

In each UE, an ACK/NACK signal is transmitted on different resources including different CSs (frequency domain codes) of a computer-generated constant amplitude zero autocorrelation (CG-CAZAC) sequence and OCs (time domain spread codes). An OC includes, for example, a Walsh/discrete Fourier transform (DFT) OC. An orthogonal sequence (e.g. [$w_0$, $w_1$, $w_2$, $w_3$]) may be applied in either an arbitrary time domain (after fast Fourier transform (FFT) modulation) or an arbitrary frequency domain (before FFT modulation). If the number of CSs is 6 and the number of OCs is 3, a total of 18 UEs may be multiplexed in the same physical resource block based on a single antenna port. In other words, PUCCH resources used for transmission of an ACK/NACK signal may be distinguished by an OCC, a CS (or a CAZAC CS (CCS)), and a PRB. If any one of the OCC, CS, and PRB of PUCCH resources differs, the PUCCH resources may be considered as different resources FIG. 10 illustrates an example of determining a dynamic PUCCH resource in a 3GPP LTE/LTE-A system.

PUCCH resources for ACK/NACK are not pre-allocated to each UE and a plurality of UEs in a cell dividedly uses a plurality of PUCCH resources at each time point. Specifically, PUCCH resources used by the UE to carry ACK/NACK are dynamically determined based on a PDCCH carrying scheduling information for a PDSCH carrying corresponding DL data or a PDCCH indicating a SPS release. An entire region in which the PDCCH is transmitted in each DL subframe includes a plurality of CCEs and the PDCCH transmitted to the UE is composed of one or more CCEs. For example, if an aggregation level is 2, the PDCCH is composed of two CCEs. The UE transmits ACK/NACK through PUCCH resources linked to a specific CCE (e.g. first CCE) among CCEs constituting a PDCCH received thereby.

Figure 10:
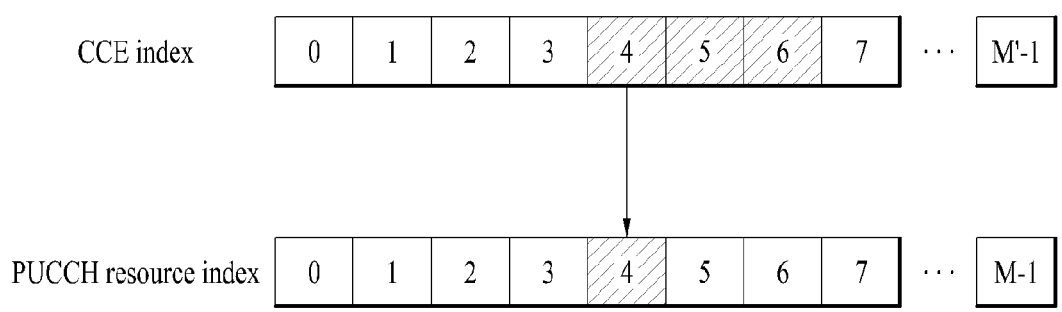
FIG. 10 illustrates an example of determining a dynamic PUCCH resource in a 3GPP LTE/LTE-A system.

Referring to FIG. 10, each square on a DL CC represents a CCE and each square on a UL CC represents a PUCCH resource. A PUCCH index corresponds to a PUCCH resource for ACK/NACK. Assuming that information about a PDSCH is transmitted over a PDCCH consisting of CCE indexes 4 to 6 as illustrated in FIG. 10, the UE transmits ACK/NACK over PUCCH index 4 corresponding to CCE index 4 which is the first CCE constituting the PDCCH. Specifically, a PUCCH resource index for transmission through two antenna ports ($p_0$ and $p_1$) in a 3GPP LTE/LTE-A system, i.e. $n_{PUCCH}^{(1,\tilde{p})}$ of Equation 10, is determined as follows.

$$n_{PUCCH}^{(1,\tilde{p}0)} = n_{CCE} + N_{PUCCH}^{(1)} \quad \text{[Equation 13]}$$

$$n_{PUCCH}^{(1,\tilde{p}1)} = n_{CCE} + 1 + N_{PUCCH}^{(1)} \quad \text{[Equation 14]}$$

Here, $n^{(1,\tilde{p}=p0)}_{PUCCH}$ denotes a PUCCH resource index (i.e. number) to be used by the antenna port $p_0$, $n^{(1,\tilde{p}=p1)}_{PUCCH}$ denotes a PUCCH resource index to be used by the antenna port $p_1$, and $N^{(1)}_{PUCCH}$ denotes a value signaled from a higher layer. $N^{(1)}_{PUCCH}$ corresponds to a location at which a dynamic PUCCH resource is started among PUCCH resources of a cell. $n_{CCE}$ corresponds to the smallest value among CCE indexes used for PDCCH transmission. For example, when a CCE aggregation level is 2 or more, the first CCE index among a plurality of CCE indexes aggregated for PDCCH transmission is used to determine an ACK/NACK PUCCH resource. That is, a PUCCH resource used to transmit ACK/NACK for a PDCCH or a PDSCH according to the PDCCH is determined in association with a DL CCE and this is called a dynamic CCE-to-AN linkage.

Meanwhile, a UE conforming to an LTE system cannot simultaneously transmit a PUCCH and a PUSCH. Therefore, when UCI (e.g. CQI/PMI, HARQ-ACK, RI, etc.) needs to be transmitted in a subframe in which a PUSCH is transmitted, the UE multiplexes the UCI in a PUSCH region (PUSCH piggyback). Even in an LTE-A system, the UE may be configured not to simultaneously transmit the PUCCH and the PUSCH. In this case, when transmission of the UCI (e.g. CQI/PMI, HARQ-ACK, RI, etc.) is needed in a subframe in which the PUSCH is transmitted, the UE may multiplex the UCI in a PUSCH region (PUSCH piggybacking).

Figure 11:
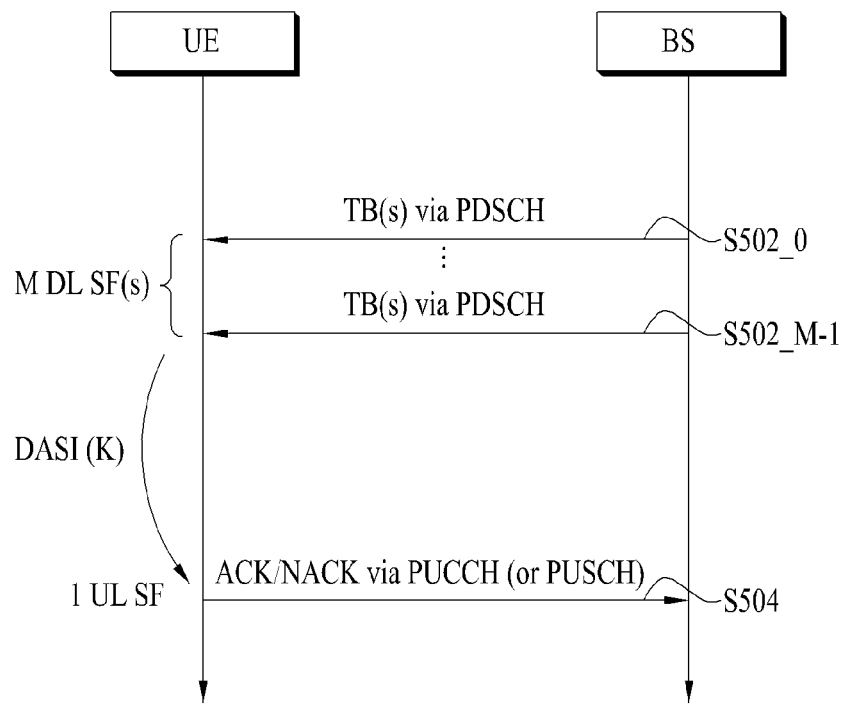
FIG. 11 illustrates a TDD UL ACK/NACK transmission procedure in a single carrier situation.

FIG. 11 illustrates a TDD UL ACK/NACK transmission procedure in a single carrier situation.

Referring to FIG. 11, a UE may receive one or more signals transmitted on DL (e.g. PDSCH signals) in M DL subframes (SFs) (S502_0 to S502_M−1). Each PDSCH signal is used to transmit one or more (e.g., 2) transport blocks (TBs) (or CWs) according to a transmission mode. Although not shown, the UE may also receive PDCCH signals requiring an ACK/NACK response, for example, PDCCH signals indicating SPS release (simply, SPS release PDCCH signals) in steps S502_0 to S502_M−1. In the presence of the PDSCH signals and/or the SPS release PDCCH signals in the M DL SFs, the UE transmits ACK/NACK in one UL SF corresponding to the M DL SFs after a process for generating ACK/NACK (e.g. ACK/NACK (payload) generation, ACK/NACK resource allocation, etc.) (S504). ACK/NACK includes response information to the PDSCH signals and/or the SPS release PDCCH signals received in steps S502_0 to S502_M−1. Although ACK/NACK is transmitted basically over a PUCCH, if a PUSCH is to be transmitted at an ACK/NACK transmission timing, ACK/NACK may be transmitted over the PUSCH. Various PUCCH formats listed in Table 7 may be used for ACK/NACK transmission. To reduce the number of ACK/NACK bits transmitted in a PUCCH format, various methods such as ACK/NACK bundling, ACK/NACK channel selection, etc. may be used.

As described above, ACK/NACK is transmitted in one UL SF in response to data received in M DL SFs in TDD (i.e., M DL SF(s): 1 UL SF). The UL-DL relationship is given by a downlink association set index (DASI).

Table 10 lists DASIs (K::{$k_0$, $k_1$, ... $k_{M-1}$}) defined in the LTE/LTE-A system. Table 10 illustrates spacings between a UL SF carrying ACK/NACK and a DL SF linked to the UL SF. Specifically, if a PDSCH and/or an SPS release PDCCH is transmitted in SF (n−k) (k∈K), the UE transmits ACK/NACK in SF n.

TABLE 10

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In a TDD mode, the UE needs to transmit, in one UL SF, an ACK/NACK signal for one or more signals received on DL (e.g. PDSCHs) in M DL SFs. A scheme of transmitting ACK/NACK for multiple DL SFs in one UL SF is as follows.

1) ACK/NACK bundling: ACK/NACK bits for multiple data units (e.g. a PDSCH, an SPS release PDCCH, etc.) are bundled by logical operation (e.g. logic-AND operation). For example, if all of the data units are successfully decoded, a receiving side (e.g. UE) transmits an ACK signal. On the other hand, even if the receiving side fails to decode (or detect) any one of the data units, the receiving side transmits a NACK signal or transmits no signals.

2) Channel selection: Upon receiving multiple data units (e.g. a PDSCH, an SPS release PDCCH, etc.), the UE occupies multiple PUCCH resources for ACK/NACK transmission. An ACK/NACK response to the multiple data units is identified by a combination of PUCCH resources used for actual ACK/NACK transmission and the contents of transmitted ACK/NACK (e.g. a bit value and a QPSK symbol value). Channel selection is also referred to as ACK/NACK selection or PUCCH selection. Channel selection will now be described in more detail.

FIG. 12 illustrates ACK/NACK transmission based on channel selection.

A scheme for transmitting information by data constellation and selection of a specific resource among a plurality of resources defined using RSs and data is referred to as a channel selection transmission scheme.

Referring to FIG. 12(a), for example, two PUCCH resources (PUCCH resource #0 and #1) may be configured with respect to PUCCH format 1b for 2-bit ACK/NACK feedback. If 3-bit ACK/NACK information is transmitted, two bits of the 3-bit ACK/NACK information may be expressed through PUCCH format 1b and the other one bit may be expressed according to which one of the two PUCCH resources is selected. For example, it may be predefined such that '0' means that UCI is transmitted using PUCCH resource #0 and '1' means that the UCI is transmitted using PUCCH resource #1. Since one bit (0 or 1) may be expressed by selecting one of the two 2 PUCCH resources, additional 1-bit ACK/NACK information may be expressed together with 2-bit ACK/NACK information expressed through PUCCH format 1b.

Referring to FIG. 12(b), for example, 4 PUCCH resources (PUCCH resources #0 to #4) may be configured with respect to PUCCH format 1b for 2-bit ACK/NACK feedback. If 4-bit ACK/NACK information is transmitted, two bits of the 4-bit ACK/NACK information may be expressed through 2-bit information carried by PUCCH format 1b and the other two bits may be expressed according to which one of the 4 PUCCH resources is selected. As an example, it may be predefined that '00' means that UCI is transmitted using PUCCH resource #0 and '01' means that the UCI is transmitted using PUCCH resource #1. Since two bits (00, 01, 10 or 11) may be expressed by selecting one of the 4 PUCCH resources, additional 2-bit ACK/NACK information may be expressed together with 2-bit ACK/NACK information expressed through PUCCH format 1b.

Namely, in the channel selection scheme, the UE occupies a plurality of UL physical channel resources (e.g. PUCCH resources) in order to transmit a multiplexed ACK/NACK signal in response to reception of multiple DL data. As an example, upon receiving a plurality of PDSCHs, the UE may occupy PUCCH resources of the same number as the number of PDCCHs indicating the respective PDSCHs using specific CCEs of the PDCCHs. In this case, the multiplexed ACK/NACK signal may be transmitted using a combination of a PUCCH resource selected from among the multiple occupied PUCCH resources and the contents of modulation/coding applied to the selected PUCCH resource. Which bit should be transmitted on which PUCCH resource in which ACK/NACK state may be predetermined. That is, a mapping table between an ACK/NACK state, a PUCCH resource, and a transmission bit (or complex modulation symbol) may be predefined and prestored in the eNB and the UE.

Channel selection using PUCCH format 1b and a HARQ-ACK procedure according to PUCCH format 3 will now be described in more detail.

Table 11 to Table 16 illustrate tables for PUCCH channel selection for a single CC in TDD.

Table 11 is a table for channel selection for transmission of HARQ-ACK multiplexing for M=2, Table 12 is a table for channel selection for transmission of HARQ-ACK multiplexing for M=3, Table 13 is a table for channel selection for transmission of HARQ-ACK multiplexing for M=4, Table 14 is a table for channel selection for transmission of HARQ-ACK multiplexing for M=2, Table 15 is a table for channel selection for transmission of HARQ-ACK multiplexing for M=3, and Table 16 is a table for channel selection for transmission of HARQ-ACK multiplexing for M=4. The UE for which a single serving CC is configured may perform channel selection according to Table 11, Table 12, or Table 13 or according to Table 14, Table 15, or Table 16, based on higher layer signaling. For the table indicated by higher layer signaling, the UE shall transmit b(0),b(1) on PUCCH resource $n_{PUCCH}^{(1)}$ in subframe n using PUCCH format 1b. The value of b(0), b(1) and the PUCCH resource $n_{PUCCH}^{(1)}$ are generated by channel selection according to the selected set of Tables for M=2, 3 and 4, respectively.

TABLE 11

Transmission of HARQ-ACK multiplexing for M = 2

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | | No transmission |

TABLE 12

Transmission of HARQ-ACK multiplexing for M = 3

| HARQ-ACK(0), HARQ-ACK(1), HARQ-ACK(2) | $n_{PUCCH}^{(1)}$ | b(0), b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 1 |
| ACK, NACK/DTX, ACK | $n_{PUCCH,0}^{(1)}$ | 1, 1 |
| ACK, NACK/DTX, NACK/DTX | $n_{PUCCH,0}^{(1)}$ | 0, 1 |
| NACK/DTX, ACK, ACK | $n_{PUCCH,2}^{(1)}$ | 1, 0 |
| NACK/DTX, ACK, NACK/DTX | $n_{PUCCH,1}^{(1)}$ | 0, 0 |
| NACK/DTX, NACK/DTX, ACK | $n_{PUCCH,2}^{(1)}$ | 0, 0 |
| DTX, DTX, NACK | $n_{PUCCH,2}^{(1)}$ | 0, 1 |
| DTX, NACK, NACK/DTX | $n_{PUCCH,1}^{(1)}$ | 1, 0 |
| NACK, NACK/DTX, NACK/DTX | $n_{PUCCH,0}^{(1)}$ | 1, 0 |
| DTX, DTX, DTX | | No transmission |

TABLE 13

Transmission of HARQ-ACK multiplexing for M = 4

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | | No transmission |

TABLE 14

Transmission of HARQ-ACK multiplexing for M = 2

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | | No Transmission |

TABLE 15

Transmission of HARQ-ACK multiplexing for M = 3

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | | No Transmission |

TABLE 16

Transmission of HARQ-ACK multiplexing for M = 4

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | | No Transmission |

In Table 11 to Table 16, HARQ-ACK(i) represents a HARQ ACK/NACK/DTX response of an i-th data unit ($0 \leq i \leq 3$). The HARQ ACK/NACK/DTX response includes ACK, NACK, DTX, and NACK/DTX. NACK/DTX indicates NACK or DTX. ACK and NACK represent decoding success and failure of a transport block (which is equivalent to a code block) transmitted through a PDSCH, respectively. Discontinuous transmission (DTX) represents PDCCH detection failure. In relation to each data unit, a maximum of 4 PUCCH resources (i.e. $n^{(1)}_{PUCCH,0}$ to $n^{(1)}_{PUCCH,3}$) may be occupied. Multiplexed ACK/NACK is transmitted through one PUCCH resource selected from the occupied PUCCH resources. $n^{(1)}_{PUCCH,i}$ denoted in Table 11 to Table 16 indicates a PUCCH resource used to actually transmit ACK/NACK. b(0)b(1) represents two bits transmitted through the selected PUCCH resource and is modulated according to a QPSK scheme. For example, if the UE successfully decoded 4 data units, the UE transmits (1,1) to the eNB through a PUCCH resource connected to $n^{(1)}_{PUCCH,1}$. Since a combination of a PUCCH resource and a QPSK symbol is not sufficient to represent all possible ACK/NACK assumptions, NACK and DTX are coupled (NACK/DTX or N/D) except in some cases.

Hereinafter, the case in which a channel selection scheme using PUCCH format 1b is configured for HARQ-ACK transmission in TDD CA will be described. It is assumed that, in legacy LTE-A, two serving CCs (i.e. PCC and SCC) having the same TDD UL-DL configuration are aggregated.

First, a channel selection scheme using PUCCH format 1b for M≤2 in UL subframe n for HARQ-ACK transmission will now be described. Here, M corresponds to the number of elements in set K described with reference to Table 10 (i.e. the number of DL SFs corresponding to a UL SF). For UL subframe n with M≤2, the UE may transmit b(0)b(1) on PUCCH resource $n^{(1)}_{PUCCH}$ selected from A PUCCH resources, $n^{(1)}_{PUCCH,i}$ where 0≤i≤A−1 and A∈{2,3,4}. Specifically, the UE transmit ACK/NACK information, according to Table 17 to Table 19, in subframe n using PUCCH format 1b. For UL subframe n with M=1, HARQ-ACK(j) denotes the ACK/NACK/DTX response for a transport block or SPS release PDCCH associated with serving CC c, where the transport block and serving CC for HARQ-ACK (j) and A PUCCH resources may be given by Table 23. For UL subframe n with M=2, HARQ-ACK(j) denotes the ACK/NACK/DTX response for a PDSCH transmission or SPS release PDCCH within subframe(s) given by set on each serving cell, where the subframes on each serving cell for HARQ-ACK(j) and A PUCCH resources may be given by Table 20.

TABLE 17

Transmission of HARQ-ACK multiplexing for A = 2

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | | No Transmission |

TABLE 18

Transmission of HARQ-ACK multiplexing for A = 3

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | | No Transmission |

TABLE 19

Transmission of HARQ-ACK multiplexing for A = 4

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |

TABLE 19-continued

Transmission of HARQ-ACK multiplexing for A = 4

| HARQ-ACK(0), HARQ-ACK(1), HARQ-ACK(2), HARQ-ACK(3) | $n_{PUCCH}^{(1)}$ | b(0)b(1) |
|---|---|---|
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | | No Transmission |

TABLE 20

Mapping of subframes on each serving cell to HARQ-ACK(j) for PUCCH format 1b HARQ-ACK channel selection for TDD with M = 2

| | HARQ-ACK(j) | | | |
|---|---|---|---|---|
| A | HARQ-ACK(0) | HARQ-ACK(1) | HARQ-ACK(2) | HARQ-ACK(3) |
| 4 | The first subframe of PCC | The second subframe of PCC | The first subframe of SCC | The second subframe of SCC |

The UE determines the A PUCCH resources, $n^{(1)}_{PUCCH,i}$ where 0≤i≤A−1 ordered according to the serving CC in increasing order of j given in Table 23 for M=1 and Table 20 for M=2, as follows. For a PDSCH transmission indicated by the detection of a corresponding PDCCH within subframe(s) n−$k_m$, where $k_m$∈K on PCC, or for a PDCCH indicating downlink SPS release within subframe(s) n−$k_m$, where $k_m$∈K on PCC, the PUSCH resource is $n_{PUCCH,i}^{(1)}$= (M−m−1)·$N_c$+m·$N_{c+1}$+$n_{CCE,m}$+$N_{PUCCH}^{(1)}$, where c is selected from { 0, 2, 3, 3} such that $N_c$≤$n_{CCE,m}$<$N_{c+1}$, $N_c$=max{0, ⌊[$N_{RB}^{DL}$·($N_{sc}^{RB}$·c−4)]/36⌋}, and for a subframe n with M=1 and a transmission mode that supports up to two transport blocks on the serving CC where the corresponding PDSCH transmission occurs, the PUCCH resource $n_{PUCCH,i+1}^{(1)}$ is given by $n_{PUCCH,i+1}^{(1)}$=(M−m−1) $N_c$+ m·$N_{c+1}$+$n_{CCE,m}$+1+$N_{PUCCH}^{(1)}$ where $n_{CCE,m}$ is the 1$^{st}$ CCE used for transmission of the corresponding DCI assignment and $N_{PUCCH}^{(1)}$ is configured by higher layers. For a PDSCH transmission on the PCC where there is not a corresponding PDCCH detected within subframe(s) n−k, where k∈K, the value of $n_{PUCCH,i}^{(1)}$ determined according to higher layer configuration. For a PDSCH transmission indicated by the detection of a corresponding PDCCH within subframe(s) n−k, where k∈K on SCC, the value of $n_{PUCCH,i}^{(1)}$, and the value of $n_{PUCCH,i+1}^{(1)}$ for a subframe n with M=2 or for a subframe n with M=1 and a transmission mode on the SCC that supports up to two transport blocks is determined according to higher layer configuration. The TPC field in the DCI format of the corresponding PDCCH shall be used to determine the PUCCH resource values from one of the four resource values configured by higher layers. For a UE configured for a transmission mode on the secondary cell that supports up to two transport blocks and a subframe n with M=1, or for a subframe n with M=2, a PUCCH resource value maps to two PUCCH resources ($n_{PUCCH,i}^{(1)}$, $n_{PUCCH,i+1}^{(1)}$) otherwise, the PUCCH resource value maps to a single PUCCH resource $n_{PUCCH,i}^{(1)}$. A UE shall assume that the same HARQ-ACK PUCCH resource value is transmitted in the TPC field on all PDCCH assignments on the SCC(s) in a given subframe.

Next, a channel selection scheme using PUCCH format 1b for M>2 in UL subframe n for HARQ-ACK transmission is described. A basic principle of the channel selection scheme is identical/similar to the case of M≤2. Specifically, the UE transmits ACK/NACK information according to Table 21 and Table 22 using PUCCH format 1b in UL subframe n. For M>2 in UL subframe n, $n_{PUCCH,0}^{(1)}$ and $n_{PUCCH,1}^{(1)}$ are associated with DL transmission(s) (e.g. PDSCH transmission(s)) on a PCC and $n_{PUCCH,2}^{(1)}$ and $n_{PUCCH,3}^{(1)}$ are associated with DL transmission(s) (e.g. PDSCH transmission(s)) on an SCC.

In addition, HARQ-ACK(i) for an arbitrary CC means an ACK/NACK/DTX response to a PDCCH in which DAI-counter (DAI-c) scheduling the CC is i+1 (or to a PDSCH corresponding to the PDCCH). Meanwhile, in the presence of a PDCCH with/without a PDSCH, HARQ-ACK(0) may represent an ACK/NACK/DTX response to the PDCCH with/without the PDSCH and HARQ-ACK(i) may represent an ACK/NACK/DTX response to the PDCCH in which DAI-c is i (or to the PDSCH corresponding to the PDCCH).

Table 21 illustrates a mapping table for channel selection for M=3 when two CCs having the same TDD UL-DL configuration are configured.

TABLE 21

Transmission of HARQ-ACK multiplexing for M = 3

| PCC HARQ-ACK(0), HARQ-ACK(1), HARQ-ACK(2) | SCC HARQ-ACK(0), HARQ-ACK(1), HARQ-ACK(2) | Resource $n_{PUCCH}^{(1)}$ | Constellation b(0), b(1) | RM Code Input Bits o(0), o(1), o(2), o(3) |
|---|---|---|---|---|
| ACK, ACK, ACK | ACK, ACK, ACK | $n_{PUCCH,1}^{(1)}$ | 1, 1 | 1, 1, 1, 1 |
| ACK, ACK, NACK/DTX | ACK, ACK, ACK | $n_{PUCCH,1}^{(1)}$ | 0, 0 | 1, 0, 1, 1 |
| ACK, NACK/DTX, any | ACK, ACK, ACK | $n_{PUCCH,3}^{(1)}$ | 1, 1 | 0, 1, 1, 1 |
| NACK/DTX, any, any | ACK, ACK, ACK | $n_{PUCCH,3}^{(1)}$ | 0, 1 | 0, 0, 1, 1 |
| ACK, ACK, ACK | ACK, ACK, NACK/DTX | $n_{PUCCH,0}^{(1)}$ | 1, 0 | 1, 1, 1, 0 |
| ACK, ACK, NACK/DTX | ACK, ACK, NACK/DTX | $n_{PUCCH,3}^{(1)}$ | 1, 0 | 1, 0, 1, 0 |
| ACK, NACK/DTX, any | ACK, ACK, NACK/DTX | $n_{PUCCH,0}^{(1)}$ | 0, 1 | 0, 1, 1, 0 |
| NACK/DTX, any, any | ACK, ACK, NACK/DTX | $n_{PUCCH,3}^{(1)}$ | 0, 0 | 0, 0, 1, 0 |
| ACK, ACK, ACK | ACK, NACK/DTX, any | $n_{PUCCH,2}^{(1)}$ | 1, 1 | 1, 1, 0, 1 |
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |
| ACK, ACK, ACK | NACK/DTX, any, any | $n_{PUCCH,1}^{(1)}$ | 1, 0 | 1, 1, 0, 0 |
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |
| NACK, any, any | NACK/DTX, any, any | $n_{PUCCH,0}^{(1)}$ | 0, 0 | 0, 0, 0, 0 |
| DTX, any, any | NACK/DTX, any, any | No Transmission | | 0, 0, 0, 0 |

Here, $n_{PUCCH,0}^{(1)}$ and/or $n_{PUCCH,1}^{(1)}$ may be assigned an implicit PUCCH resource linked to a PDCCH that schedules a PCC (i.e. PCC-PDCCH) regardless of whether cross-CC scheduling is performed, and $n_{PUCCH,2}^{(1)}$ and/or $n_{PUCCH,3}^{(1)}$ may be assigned an implicit PUCCH resource linked to a PDCCH that schedules an SCC (i.e. SCC-PDCCH) according to whether cross-CC scheduling is performed or an explicit PUCCH resource reserved through RRC. For example, in a TDD situation, $n_{PUCCH,0}^{(1)}$ and $n_{PUCCH,1}^{(1)}$ may be assigned implicit PUCCH resources linked to PCC-PDCCHs in which a DAI-c is 1 and 2, respectively, and $n_{PUCCH,2}^{(1)}$ and $n_{PUCCH,3}^{(1)}$ may be assigned implicit PUCCH resources linked to SCC-PDCCHs in which a DAI-c is 1 and 2, respectively.

Table 22 illustrates a mapping table for channel selection for M=4 when two CCs having the same TDD UL-DL configuration are aggregated.

TABLE 22

Transmission of HARQ-ACK multiplexing for M = 4

| PCC HARQ-ACK(0), HARQ-ACK(1), HARQ-ACK(2), HARQ-ACK(3) | SCC HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2), o(3) |
|---|---|---|---|---|
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK, NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |

TABLE 22-continued

Transmission of HARQ-ACK multiplexing for M = 4

| PCC HARQ-ACK(0), HARQ-ACK(1), HARQ-ACK(2), HARQ-ACK(3) | SCC HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2), o(3) |
|---|---|---|---|---|
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |
| ACK, ACK, NACK/DTX, any | NACK/DTX, any, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| ACK, DTX, DTX, DTX | NACK/DTX, any, any, any | $n_{PUCCH,0}^{(1)}$ | 1, 1 | 0, 1, 0, 0 |
| ACK, DTX, DTX, DTX | (ACK, NACK/DTX, any, any), except for (ACK, DTX, DTX, DTX) | $n_{PUCCH,0}^{(1)}$ | 1, 1 | 0, 1, 0, 0 |
| ACK, ACK, ACK, ACK | NACK/DTX, any, any, any | $n_{PUCCH,0}^{(1)}$ | 1, 1 | 0, 1, 0, 0 |
| ACK, ACK, ACK, ACK | (ACK, NACK/DTX, any, any), except for (ACK, DTX, DTX, DTX) | $n_{PUCCH,0}^{(1)}$ | 1, 1 | 0, 1, 0, 0 |
| NACK, any, any, any | NACK/DTX, any, any, any | $n_{PUCCH,0}^{(1)}$ | 0, 0 | 0, 0, 0, 0 |
| NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| (ACK, NACK/DTX, any, any), except for (ACK, DTX, DTX, DTX) | NACK/DTX, any, any, any | $n_{PUCCH,0}^{(1)}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n_{PUCCH,0}^{(1)}$ | 0, 0 | 0, 0, 0, 0 |
| DTX, any, any, any | NACK/DTX, any, any, any | No Transmission | | 0, 0, 0, 0 |
| DTX, any, any, any | (ACK, NACK/DTX, any, any), except for (ACK, DTX, DTX, DTX) | No Transmission | | 0, 0, 0, 0 |

Here, $n_{PUCCH,0}^{(1)}$, $n_{PUCCH,1}^{(1)}$, $n_{PUCCH,2}^{(1)}$, and $n_{PUCCH,3}^{(1)}$ may be assigned by the same scheme as shown in Table 21.

Table 23 illustrates a transport block (TB) of HARQ-ACK (j) and a serving CC according to the number A of PUCCH resources. In Table 23, 'NA' denotes not applicable.

TABLE 23

Mapping of Transport block and Serving CC to HARQ-ACK(j) for PUCCH format 1b HARQ-ACK channel selection

| | HARQ-ACK(j) | | | |
|---|---|---|---|---|
| A | HARQ-ACK(0) | HARQ-ACK(1) | HARQ-ACK(2) | HARQ-ACK(3) |
| 2 | TB1 PCC | TB2 SCC | NA | NA |
| 3 | TB1 SCC1 | TB2 SCC1 | TB3 SCC2 | NA |
| 4 | TB1 PCC | TB2 PCC | TB3 SCC | TB4 SCC |

TABLE 24

Mapping of Transport Block and Serving CC to HARQ-ACK(j) for PUCCH format 1b HARQ-ACK channel selection

| | HARQ-ACK(j) | | | |
|---|---|---|---|---|
| A | HARQ-ACK(0) | HARQ-ACK(1) | HARQ-ACK(2) | HARQ-ACK(3) |
| 2 | TB1 PCC | TB1 SCC | NA | NA |
| 3 | TB1 SCC1 | TB2 SCC1 | TB1 SCC2 | NA |
| 4 | TB1 PCC | TB2 PCC | TB1 SCC | TB2 SCC |

For FDD, a HARQ-ACK procedure using PUCCH format 3 is described. For M≥1 and more than one serving CC, the UE uses PUCCH resource $n_{PUCCH}^{(3,\tilde{p})}$ or $n_{PUCCH}^{(1,\tilde{p})}$ for transmission of HARQ-ACK in subframe n on $\tilde{p}$ mapped to antenna port p, where M is the number of elements in the set K defined in Table 10. For a single PDSCH transmission only on the primary cell indicated by the detection of a corresponding PDCCH within subframe(s) $n-k_m$, where $k_m \in K$ with the DAI value in the PDCCH equal to '1', or for a PDCCH indicating downlink SPS release within subframe(s) $n-k_m$, where $k_m \in K$ with the DAI value in the PDCCH equal to '1', the UE uses PUCCH format 1a/1b and PUCCH resource $n_{PUCCH}^{(1,\tilde{p})}$ with $n_{PUCCH}^{(1,\tilde{p}=p_0)} = (M-m-1) \cdot N_c + m \cdot N_{c+1} + n_{CCE,m} + N_{PUCCH}^{(1)}$ for antenna port $\tilde{p}=p_0$, where $n_{PUCCH}^{(1)}$ is configured by higher layers, c is selected from {0, 1, 2, 3} such that $N_c \le n_{CCE,m} < N_{c+1}$, $N_c = \max\{0, \lfloor [N_{RB}^{DL} \cdot$ ($N_{sc}^{RB} \cdot c - 4 \lfloor j/36 \rfloor\}$, and $n_{CCE,m}$ is the number of the 1$^{st}$ CCE used for transmission of the corresponding PDCCH in subframe $n-k_m$ where $k_m \in K$. For two antenna port transmission the PUCCH resource for $p=p_1$ is given by $n_{PUCCH}^{(1,p=p_1)} = n_{PUCCH}^{(3,p=p_0)} + 1$. For a single PDSCH transmission only on the PCC where there is not a corresponding PDCCH detected within subframe(s) $n-k_m$, where $k_m \in K$ and no PDCCH indicating downlink SPS release within subframe(s) $n-k_m$, where $k_m \in K$, the UE shall use PUCCH format 1a/1b and PUCCH resource $n_{PUCCH}^{(1,p)}$ with the value of $n_{PUCCH}^{(1,p)}$ is determined according to higher layer configuration. For a UE configured for two antenna port transmission, a PUCCH resource value maps to two PUCCH resources with the first PUCCH resource $n_{PUCCH}^{(1,p=p_0)}$ for antenna port $p_0$ and the second PUCCH resource $n_{PUCCH}^{(3,p=p_1)}$ for antenna port $p_1$, otherwise, the PUCCH resource value maps to a single PUCCH resource $n_{PUCCH}^{(1,p=p_0)}$ for antenna port $P_0$.

For M>1 and a PDSCH transmission only on the PCC where there is not a corresponding PDCCH detected within subframe(s) $n-k_m$, where $k_m \in K$ and an additional PDSCH transmission only on the primary cell indicated by the detection of a corresponding PDCCH within subframe(s) $n-k_m$, where $k_m \in K$ with the DAI value in the PDCCH equal to '1' or a PDCCH indicating downlink SPS release within the subframe(s) $n-k_m$, where $k_m \in K$ with the DAI value in the PDCCH equal to '1', the UE transmits b(0)b(1) in subframe n using PUCCH format 1b on PUCCH resource $n_{PUCCH}^{(1)}$ selected from A PUCCH resources $n_{PUCCH,i}^{(1)}$, where $0 \leq i \leq A-1$. For a UE configured with a transmission mode that supports up to two transport blocks on the PCC, A=3; otherwise, A=2. The PUCCH resource $n_{PUCCH,0}^{(1)}$ is determined according to higher layer configuration, where $n_{PUCCH}^{(1)}$ is configured by higher layers, and c is selected from {0, 1, 2, 3} such that $N_c \leq n_{CCE,m} < N_{c+1}$, $N_c = \max\{0, \lfloor [N_{RB}^{DL} \cdot (N_{sc}^{RB} \cdot c - 4)]/36 \rfloor\}$. $n_{CCE,m}$ is the number of the 1$^{st}$ CCE index (i.e. CCE number) used for transmission of the corresponding PDCCH in subframe(s) $n-k_m$, where $k_m \in K$. For a UE configured with a transmission mode that supports up to two transport blocks on the PCC, the PUCCH resource $n_{PUCCH,2}^{(1)}$ is determined as $n_{PUCCH,2}^{(1)} = n_{PUCCH,1}^{(1)} + 1$. HARQ-ACK(0)) is the ACK/NACK/DTX response for the PDSCH without a corresponding PDCCH detected. HARQ-ACK(1) is the ACK/NACK/DTX response for the first transport block of the PDSCH indicated by the detection of a corresponding PDCCH for which the value of the DAI field in the corresponding DCI format is equal to '1' or for the PDCCH indicating downlink SPS release for which the value of the DAI field in the corresponding DCI format is equal to '1'. HARQ-ACK(2) is the ACK/NACK/DTX response for the second transport block of the PDSCH indicated by the detection of a corresponding PDCCH for which the value of the DAI field in the corresponding DCI format is equal to '1'.

For M>1 and a PDSCH transmission only on the primary cell indicated by the detection of a corresponding PDCCH within subframe(s) $n-k_m$, where $k_m \in K$ with DAI value in the PDCCH greater than '1' or a PDCCH indicating downlink SPS release within the subframe(s) $n-k_m$, where $k_m \in K$ with DAI value in the PDCCH greater than '1', the UE uses PUCCH format 3 and PUCCH resource $n_{PUCCH}^{(3,p)}$, where the value of $n_{PUCCH}^{(3,p)}$ is determined according to higher layer configuration and the TPC field in a PDCCH assignment with DAI value greater than '1'. The TPC field is used to determine the PUCCH resource value from one of the four PUCCH resource values configured by higher layers. A UE assumes that the same HARQ-ACK PUCCH resource value is transmitted on all PDCCH assignments used to determine the PUCCH resource values within the subframe(s) $n-k_m$, where $k_m \in K$. For a PDSCH transmission on the secondary cell indicated by the detection of a corresponding PDCCH within subframe(s) $n-k_m$, where $k_m \in K$), the UE shall use PUCCH format 3 and PUCCH resource $n_{PUCCH}^{(3,p)}$, where the value of $n_{PUCCH}^{(3,p)}$ is determined according to higher layer configuration and the TPC field in the corresponding PDCCH. If a PDCCH corresponding to a PDSCH on the primary cell within subframe(s) $n-k_m$, where $k_m \in K$, or a PDCCH indicating downlink SPS release within subframe(s) $n-k_m$, where $k_m \in K$, the TPC field in the PDCCH with the DAI value greater than '1' is used as an index for one of the four resource values configured by higher layers. A UE assumes that the same HARQ-ACK PUCCH resource value is transmitted on all PDCCH assignments in the PCC and in each SCC that are used to determined the PUCCH resource value within the subframe(s) $n-k_m$, $k_m \in K$.

For PUCCH format 3 and PUCCH resource $n_{PUCCH}^{(3,p)}$ and two antenna port transmission, a PUCCH resource value is mapped to two PUCCH resources—the PUCCH resource $n_{PUCCH}^{(3,p=p_0)}$ for antenna port $p_0$ and the PUCCH resource $n_{PUCCH}^{(3,p=p_1)}$ for antenna port $p_1$, otherwise, the PUCCH resource value maps to a single PUCCH resource is mapped to a single PUCCH resource $n_{PUCCH}^{(3,p=p_0)}$ for antenna port $p_0$.

Next, for two serving CCs in FDD, a HARQ-ACK procedure using PUCCH format 1b and a HARQ-ACK procedure using PUCCH format 3, through channel selection, are described.

For FDD with two configured serving CCs and PUCCH format 1b with channel selection, the UE transmits b(0)b(1) on PUCCH resource $n_{PUCCH}^{(1)}$ selected from A PUCCH resources, $n_{PUCCH,j}^{(1)}$ where $0 \leq i \leq A-1$ and $A \in \{2,3,4\}$. HARQ-ACK(j) denotes the ACK/NACK/DTX response for a transport block or SPS release PDCCH associated with serving CC c. The transport block and serving CC for HARQ-ACK(j) and A PUCCH resources may be given by Table 25. A UE configured with a transmission mode that supports up to two transport blocks on serving CC c uses the same HARQ-ACK response for both the transport blocks in response to a PDSCH transmission with a single transport block or a PDCCH indicating downlink SPS release associated with the serving CC c.

TABLE 25

| Value of 'TPC command for PUCCH' | PUCCH Resource Value for HARQ-ACK Resource for PUCCH $n_{PUCCH,j}^{(1)}$ or $(n_{PUCCH,j}^{(1)}, n_{PUCCH,j+1}^{(1)})$ |
|---|---|
| '00' | The 1st PUCCH resource value configured by the higher layers |
| '01' | The 2$^{nd}$ PUCCH resource value configured by the higher layers |
| '10' | The 3$^{rd}$ PUCCH resource value configured by the higher layers |
| '11' | The 4$^{th}$ PUCCH resource value configured by the higher layers |

The UE can determine the A PUCCH resources, $n_{PUCCH,0}^{(1)}$ associated with HARQ-ACK(j) where $0 \leq i < A-1$ in Table 25, as follows. For a PDSCH transmission indicated by the detection of a corresponding PDCCH in subframe n−4 on the PCC, the PUCCH resource is $n_{PUCCH,j}^{(1)} = n_{CCE} + N_{PUCCH}^{(1)}$, and for transmission mode that supports up to two TBs, the PUCCH resource $n_{PUCCH,j+1}^{(1)}$ is given by $n_{PUCCH,j+1}^{(1)} = n_{CCE} + 1 + N_{PUCCH}^{(1)}$ Where CCE ∈ where is the 1st CCE number (i.e. index) used for transmission of the corresponding PDCCH and $N_{PUCCH}^{(1)}$ is configured by higher layers. for a PDSCH transmission on the PCC where there is not a corresponding PDCCH detected in subframe n−4, the value of $n_{PUCCH,j}^{(1)}$ is determined. For transmission mode that supports up to two TBs, the PUCCH resource $n_{PUCCH,j+1}^{(1)}$ is given by $n_{PUCCH,j+1}^{(1)} = n_{PUCCH,j}^{(1)} + 1$. For a PDSCH transmission indicated by the detection of a corresponding PDCCH in subframe n−4 on the SCC, the value of $n_{PUCCH,j}^{(1)}$, and the value of $n_{PUCCH,j+1}^{(1)}$ for transmission mode that supports up to two TBs are determined according to higher layer configuration and Table 26. The TPC field in the DCI format of the corresponding PDCCH is used to determine a PUCCH resource, from among the four resource values configured by higher layers, with the mapping defined in Table 26. For a UE configured for a transmission mode that supports up to two TBs, a PUCCH resource value in Table 26 is mapped to two PUCCH resources $(n_{PUCCH,j}^{(1)}, n_{PUCCH,j+1}^{(1)})$, otherwise, the PUCCH resource value is mapped to a single PUCCH resource $n_{PUCCH,j}^{(1)}$.

TABLE 26

Transmission of Format 1b HARQ-ACK channel selection for A = 2

| HARQ-ACK(0) | HARQ-ACK(1) | $n_{PUCCH}^{(1)}$ | b(0)b(1) |
|---|---|---|---|
| ACK | ACK | $n_{PUCCH,1}^{(1)}$ | 1, 0 |
| ACK | NACK/DTX | $n_{PUCCH,0}^{(1)}$ | 1, 1 |
| NACK/DTX | ACK | $n_{PUCCH,1}^{(1)}$ | 0, 1 |
| NACK | NACK/DTX | $n_{PUCCH,0}^{(1)}$ | 0, 0 |
| DTX | NACK/DTX | | No Transmission |

TABLE 27

Transmission of Format 1b HARQ-ACK channel selection for A = 3

| HARQ-ACK(0) | HARQ-ACK(1) | HARQ-ACK(2) | $n_{PUCCH}^{(1)}$ | b(0)b(1) |
|---|---|---|---|---|
| ACK | ACK | ACK | $n_{PUCCH,1}^{(1)}$ | 1, 1 |
| ACK | NACK/DTX | ACK | $n_{PUCCH,1}^{(1)}$ | 1, 0 |
| NACK/DTX | ACK | ACK | $n_{PUCCH,1}^{(1)}$ | 0, 1 |
| NACK/DTX | NACK/DTX | ACK | $n_{PUCCH,2}^{(1)}$ | 1, 1 |
| ACK | ACK | NACK/DTX | $n_{PUCCH,0}^{(1)}$ | 1, 1 |
| ACK | NACK/DTX | NACK/DTX | $n_{PUCCH,0}^{(1)}$ | 1, 0 |
| NACK/DTX | ACK | NACK/DTX | $n_{PUCCH,0}^{(1)}$ | 0, 1 |
| NACK/DTX | NACK/DTX | NACK | $n_{PUCCH,2}^{(1)}$ | 0, 0 |
| NACK | NACK/DTX | DTX | $n_{PUCCH,0}^{(1)}$ | 0, 0 |
| NACK/DTX | NACK | DTX | $n_{PUCCH,0}^{(1)}$ | 0, 0 |
| DTX | DTX | DTX | | No Transmission |

TABLE 28

Transmission of Format 1b HARQ-ACK channel selection for A = 4

| HARQ-ACK(0) | HARQ-ACK(1) | HARQ-ACK(2) | HARQ-ACK(3) | $n_{PUCCH,i}^{(1)}$ | b(0)b(1) |
|---|---|---|---|---|---|
| ACK | ACK | ACK | ACK | $n_{PUCCH,1}^{(1)}$ | 1, 1 |
| ACK | NACK/DTX | ACK | ACK | $n_{PUCCH,2}^{(1)}$ | 0, 1 |
| NACK/DTX | ACK | ACK | ACK | $n_{PUCCH,1}^{(1)}$ | 0, 1 |
| NACK/DTX | NACK/DTX | ACK | ACK | $n_{PUCCH,3}^{(1)}$ | 1, 1 |
| ACK | ACK | ACK | NACK/DTX | $n_{PUCCH,1}^{(1)}$ | 1, 0 |

TABLE 28-continued

Transmission of Format 1b HARQ-ACK channel selection for A = 4

| HARQ-ACK(0) | HARQ-ACK(1) | HARQ-ACK(2) | HARQ-ACK(3) | $n_{PUCCH,i}^{(1)}$ | b(0)b(1) |
|---|---|---|---|---|---|
| ACK | NACK/DTX | ACK | NACK/DTX | $n_{PUCCH,2}^{(1)}$ | 0, 0 |
| NACK/DTX | ACK | ACK | NACK/DTX | $n_{PUCCH,1}^{(1)}$ | 0, 0 |
| NACK/DTX | NACK/DTX | ACK | NACK/DTX | $n_{PUCCH,3}^{(1)}$ | 1, 0 |
| ACK | ACK | NACK/DTX | ACK | $n_{PUCCH,2}^{(1)}$ | 1, 1 |
| ACK | NACK/DTX | NACK/DTX | ACK | $n_{PUCCH,2}^{(1)}$ | 1, 0 |
| NACK/DTX | ACK | NACK/DTX | ACK | $n_{PUCCH,3}^{(1)}$ | 0, 1 |
| NACK/DTX | NACK/DTX | NACK/DTX | ACK | $n_{PUCCH,3}^{(1)}$ | 0, 0 |
| ACK | ACK | NACK/DTX | NACK/DTX | $n_{PUCCH,0}^{(1)}$ | 1, 1 |
| ACK | NACK/DTX | NACK/DTX | NACK/DTX | $n_{PUCCH,0}^{(1)}$ | 1, 0 |
| NACK/DTX | ACK | NACK/DTX | NACK/DTX | $n_{PUCCH,0}^{(1)}$ | 0, 1 |
| NACK/DTX | NACK | NACK/DTX | NACK/DTX | $n_{PUCCH,0}^{(1)}$ | 0, 0 |
| NACK | NACK/DTX | NACK/DTX | NACK/DTX | $n_{PUCCH,0}^{(1)}$ | 0, 0 |
| DTX | DTX | NACK/DTX | NACK/DTX | | No Transmission |

For FDD, a HARQ-ACK procedure using PUCCH format 3 is described. For FDD with PUCCH format 3, the UE determines PUCCH resource $n_{PUCCH}^{(3,\tilde{p})}$ or $n_{PUCCH}^{(1,\tilde{p})}$ for transmission of HARQ-ACK in subframe n for $\tilde{p}$ mapped to antenna port p, as follows. For a PDSCH transmission only on the PCC indicated by the detection of a corresponding PDCCH in subframe n−4, or for a PDCCH indicating downlink SPS release in n−4 on the PCC, the UE uses PUCCH format 1a/1b and PUCCH resource $n_{PUCCH}^{(1,\tilde{p}_0)} = n_{CCE} + N_{PUCCH}^{(1)}$ for antenna port $p_0$, where $n_{CCE}$ is the 1st CCE number (i.e. index) used for transmission of the corresponding PDCCH and $N_{PUCCH}^{(1)}$ is configured by higher layers. When two antenna port transmission is configured for PUCCH format 1a/1b, the PUCCH resource for antenna port $p_1$ is given by $n_{PUCCH}^{(1,\tilde{p}_1)} = n_{CCE} + 1 + N_{PUCCH}^{(1)}$. for a PDSCH transmission only on the PCC where there is not a corresponding PDCCH detected in subframe n−4, the UE uses PUCCH format 1a/1b and PUCCH resource $n_{PUCCH}^{(1,\tilde{p})}$, where the value of $n_{PUCCH}^{(1,\tilde{p})}$ is determined according to higher layer configuration and Table 49. For two antenna port transmission for PUCCH format 1a/1b, a PUCCH resource value is mapped to two PUCCH resources with $n_{PUCCH}^{(1,\tilde{p}_0)}$ for antenna port $p_0$ and $n_{PUCCH}^{(1,\tilde{p}_1)}$ for antenna port $p_1$, otherwise, the PUCCH resource value is mapped to a single PUCCH resource $n_{PUCCH}^{(1,\tilde{p}_0)}$ for antenna port $p_0$. For a PDSCH transmission on the SCC indicated by the detection of a corresponding PDCCH in subframe n−4, the UE uses PUCCH format 3 and PUCCH resource $n_{PUCCH}^{(3,\tilde{p})}$ where the value of $n_{PUCCH}^{(3,\tilde{p})}$ is determined according to higher layer configuration and Table 29. The TPC field in the DCI format of the corresponding PDCCH is used to determine a PUCCH resource value, from among the four resource values configured by higher layers, according Table 29. For two antenna port transmission for PUCCH format 3, a PUCCH resource value in Table 29 is mapped to two PUCCH resources—$n_{PUCCH}^{(3,\tilde{p}_0)}$ for antenna port $p_0$ and $n_{PUCCH}^{(3,\tilde{p}_1)}$ for antenna port $p_1$, otherwise, the PUCCH resource value is mapped to a single PUCCH resource for antenna port $p_0$. It is assumed that the same HARQ-ACK PUCCH resource value is transmitted in each DCI format of the corresponding SCC1 PDCCH assignments in a given subframe.

TABLE 49

PUCCH Resource value for Downlink Semi-Persistent Scheduling

| Value of 'TPC command for PUCCH' | $n_{PUCCH}^{(1,\tilde{p})}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

TABLE 29

PUCCH Resource Value for HARQ-ACK Resource for PUCCH

| Value of 'TPC command for PUCCH' | $n_{PUCCH}^{(3,\tilde{p})}$ |
|---|---|
| '00' | The 1st PUCCH resource value configured by the higher layers |
| '01' | The $2^{nd}$ PUCCH resource value configured by the higher layers |
| '10' | The $3^{rd}$ PUCCH resource value configured by the higher layers |
| '11' | The $4^{th}$ PUCCH resource value configured by the higher layers |

In CA of a legacy system, a PCC should be present which can be accessed as a single CC and transmit/receive a control signal and data and where cell ID acquisition, system information transmission and physical control signal transmission can be performed, and an SCC can be used for data transmission/reception only when aggregated with the PCC. In the legacy system, a scheme for transmitting, only on the PCC, ACK/NACK for a plurality of DL data transmitted on a plurality of CCs is used. In a CA environment in which a plurality of CCs is present, both cross-CC scheduling and non-cross-CC scheduling may be used for scheduling for each CC.

Unlike the conventional scheme for transmitting, only on the PCC, a PUCCH including ACK/NACK information for a plurality of DL data/control channels transmitted on a plurality of CCs, the present invention proposes transmitting, even on the SCC, the PUCCH including the ACK/NACK information for a plurality of DL data transmitted on a plurality of CCs. This may be helpful in terms of UCI offloading for preventing heavy load on the PCC caused by transmission of UCI only on the PCC. Especially, when more CCs are aggregated, the present invention may be more effective.

Figure 13:
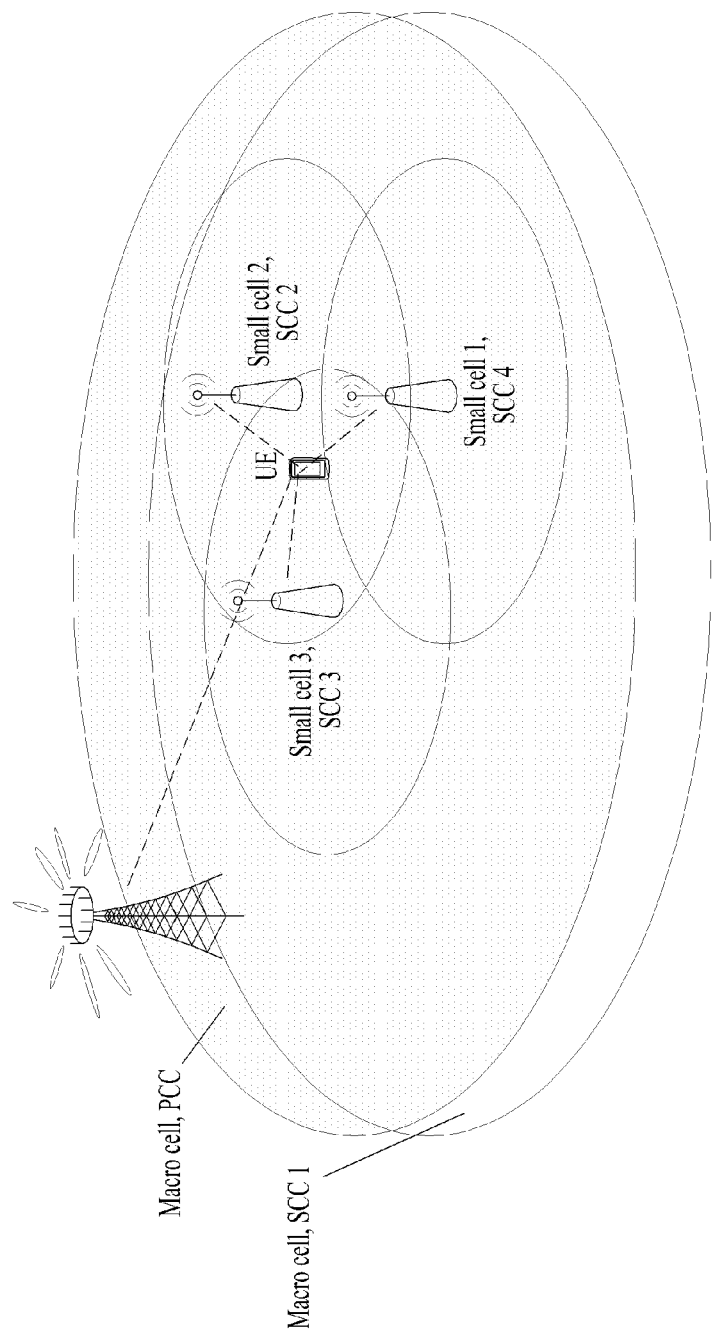
FIG. 13 illustrates inter-site carrier aggregation.

FIG. 13 illustrates inter-site CA.

In the legacy system, only use of CCs aggregated in one node has been considered. However, it may be considered that CCs configured for the UE are used in multiple nodes separated from each other by a given distance or more as well as in one node. When backhaul to which the multiple nodes are connected is not ideal backhaul, a latency may occur in sharing information between nodes. Aggregation of CCs using such nodes is referred to as inter-site CA. The present invention may be helpful when latency occurs in signal transmission between multiple CC groups as in an environment such as inter-site CA and thus it is difficult to receive ACK/NACK of all CCs on the PCC. When an SCC of a small cell or a cell near the UE is used together with the PCC through aggregation, it may be helpful for the UE to transmit the PUCCH on the corresponding CC in terms of power saving.

A. CC Grouping for ACK/NACK Transmission

Figure 14:
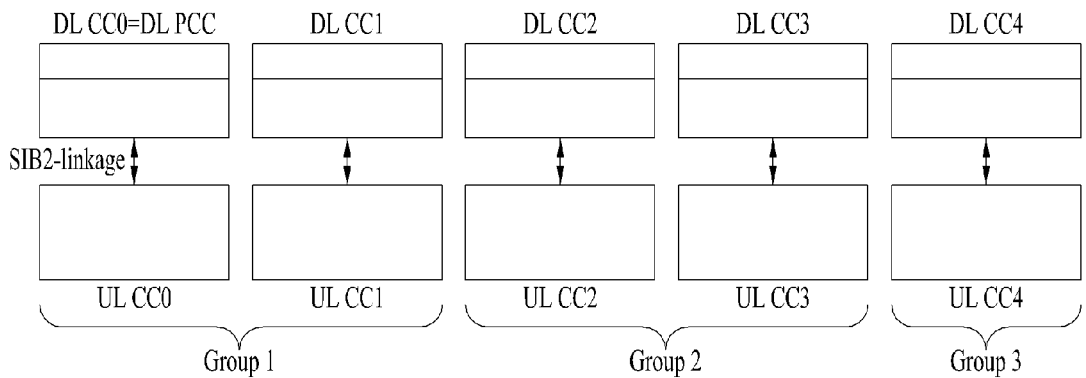
FIGS. 14 and 15 are diagrams for explaining ACK/NACK transmission according to embodiments of the present invention.
Figure 15:
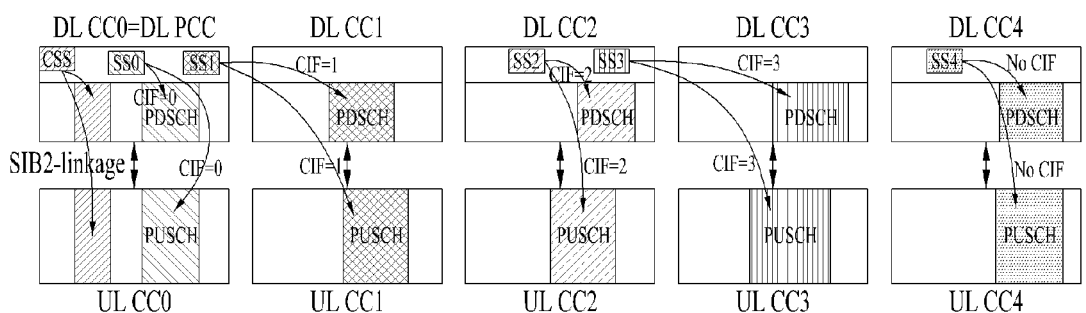

FIGS. 14 and 15 are diagrams for explaining ACK/NACK transmission according to embodiments of the present invention. Particularly, FIG. 14 illustrates carriers grouped for ACK/NACK transmission of the present invention.

Referring to FIG. 14, multiple carrier-aggregated CCs are grouped into one or multiple groups and ACK/NACK in each group may be transmitted on a specific CC in the group.

A group for transmitting ACK/NACK may be configured according to any one of embodiments.

A.1. All carrier aggregated CCs are included in one group.

A.2. Only a PCC is included in group 1 and SCCs are grouped into one or multiple groups.

A.3. A PCC and a part of SCCs are included in group 1 and the other SCCs are grouped into one or multiple groups:

For example, when multiple CCs are present as illustrated in FIG. 14, PCC and CC1 may be configured as one group, CC2 and CC3 may be configured as one group, and CC4 may be configured as one group.

A.4. A scheduling CC and a scheduled CC of the scheduling CC are grouped into one group:

For example, referring to FIG. 15 under the assumption that serving CCs are group as illustrated in FIG. 14, when multiple scheduling CCs are present, a PCC, which is a scheduling CC, and CC1, which is a scheduled CC, may be configured as one group, CC2, which is a scheduling CC, and CC3, which is a scheduled CC, may be configured as one group, and CC4, which is a scheduling CC, may be configured as one group.

B. ACK/NACK Transmission CC Configuration in Group

It is necessary to determine a CC on which ACK/NACK for DL data transmitted on CCs in a CC group is to be transmitted. The CC group(s) may be configured according to any one of the above-described embodiments of A.1 to A.4. Hereinafter, a PCC or an SCC on which ACK/NACK for DL data transmitted on a plurality of CCs or for DL transmissions through a plurality of CCs is to be transmitted will be referred to as an A-CC. In addition, a PDCCH for scheduling the PCC, a PDCCH for scheduling the SCC, and a PDCCH for scheduling the A-CC will be referred to as a PCC PDCCH, an SCC PDCCH, and an A-CC PDCCH, respectively.

The present invention proposes a method for determining a CC (i.e. A-CC) on which ACK/NACK for DL data transmitted on multiple CCs in a group is to be transmitted. A CC (i.e. A-CC) on which ACK/NACK for DL data transmitted on multiple CCs (i.e. for DL transmissions through multiple CCs) in a group is to be transmitted may be determined according to any one of the following methods.

B.1. Configuration according to a prescheduled rule

B.2. Configuration through an RRC signal

B.3. Configuration through a MAC message during activation/deactivation of an SCC B.4. Configuration through a PDCCH or EPDCCH (hereinafter, (E)PDCCH):

In order to indicate an A-CC, which is a CC on which ACK/NACK for DL data transmitted through a plurality of CCs is transmitted, an (E)PDCCH may be used. If it is desired to change an A-CC in a CC group configured for a UE, an eNB may inform the UE of new A-CC information through a part or all of (E)PDCCHs that schedule CC(s) in the CC group in a subframe corresponding to an associated timing. Especially, if it is desired to change the A-CC, the eNB may inform the UE of the new A-CC information through an (E)PDCCH that schedules a PCC or an existing A-CC. The UE may be aware of a CC on which ACK/NACK is to be transmitted by receiving information about the A-CC included in a part or all of (E)PDCCHs. Upon receiving the new A-CC information, the UE may transmit ACK/NACK through a PUCCH resource of a new A-CC starting from a timing when ACK/NACK information of a PDSCH linked with a corresponding (E)PDCCH is transmitted.

The eNB may transmit A-CC information over every (E)PDCCH. In this case, the UE may transmit, through a PUCCH resource on a new A-CC obtained through an (E)PDCCH, ACK/NACK information of a PDSCH linked to the (E)PDCCH over all received (E)PDCCHs.

If the received (E)PDCCHs do not include information of the new A-CC or the UE has not correctly received the (E)PDCCHs, the UE may continue to transmit a PUCCH on an A-CC on which ACK/NACK has been transmitted at a previous timing. If the UE transmits ACK/NACK for data associated with multiple (E)PDCCHs through the same resource, the UE may assume that A-CC information included in the (E)PDCCHs is the same.

B.5. Configuration Through System Information Block (SIB):

In order to indicate an A-CC which is a CC on which ACK/NACK information for DL data transmitted on multiple CCs is transmitted, an SIB may be used. Upon receiving information about a new A-CC through the SIB, the UE may transmit ACK/NACK through a PUCCH resource on the new A-CC starting from a time when the contents of a new SIB are applied.

B.6. Configuration of an SCC having the lowest cell index among serving cell indexes (ServCellIndex) of SCC(s) configured for a UE as an A-CC. That is, configuration of the SCC having the lowest SCC index as the A-CC.

B.7. Configuration of a PCC as an A-CC:

If a PCC is included in a group for transmitting ACK/NACK, ACK/NACK may always be transmitted through the PCC.

B.8. Configuration of a scheduling CC as an A-CC:

As a method for transmitting, through a PUCCH, ACK/NACK information for DL data transmitted on multiple CCs, it may be considered that ACK/NACK information for a PDSCH of a specific CC is transmitted through a scheduling CC of the specific CC. That is, when there are a scheduling CC, and scheduled CCs on which the scheduling CC performs cross scheduling, ACK/NACK information about the scheduling CC and the scheduled CC(s) may be transmitted on the scheduling CC. For example, when multiple scheduling CCs are present as illustrated in FIG. 15, ACK/NACK information for a PCC and CC1 may be transmitted through a PUCCH configured on the PCC which is a scheduling CC of the PCC and CC1, ACK/NACK information for CC2 and CC3 may be transmitted through a PUCCH configured on CC2 which is a scheduling CC of CC2 and CC3, and ACK/NACK information for CC4 may be transmitted through a PUCCH configured on CC4.

B.9. Configuration of a CC Associated with a HARQ Process ID as an A-CC

As a method for transmitting, through a PUCCH, ACK/NACK for DL data transmitted on multiple CCs, it may be considered that a CC on which ACK/NACK is to be transmitted differs according to a HARQ process ID (or number or index) relating to ACK/NACK to be transmitted by the UE. To this end, the present invention proposes a method in which a CC on which ACK/NACK is to be transmitted is designated according to a HARQ process ID and the eNB informs the UE of the designated CC. Upon receiving a PDSCH on a specific CC and transmitting ACK/NACK for the PDSCH, the UE may determine a CC on which a PUCCH is to be transmitted through a HARQ process ID of the PDSCH.

C. ACK/NACK Transmission Scheme in a Group—PUCCH Format 3

The present invention proposes a method for transmitting, on an A-CC, ACK/NACK information for DL data transmitted on multiple CCs in a group.

C.1. PUCCH format 1a/1b on a PCC and/or PUCCH format 3 on an A-CC

Figure 18:
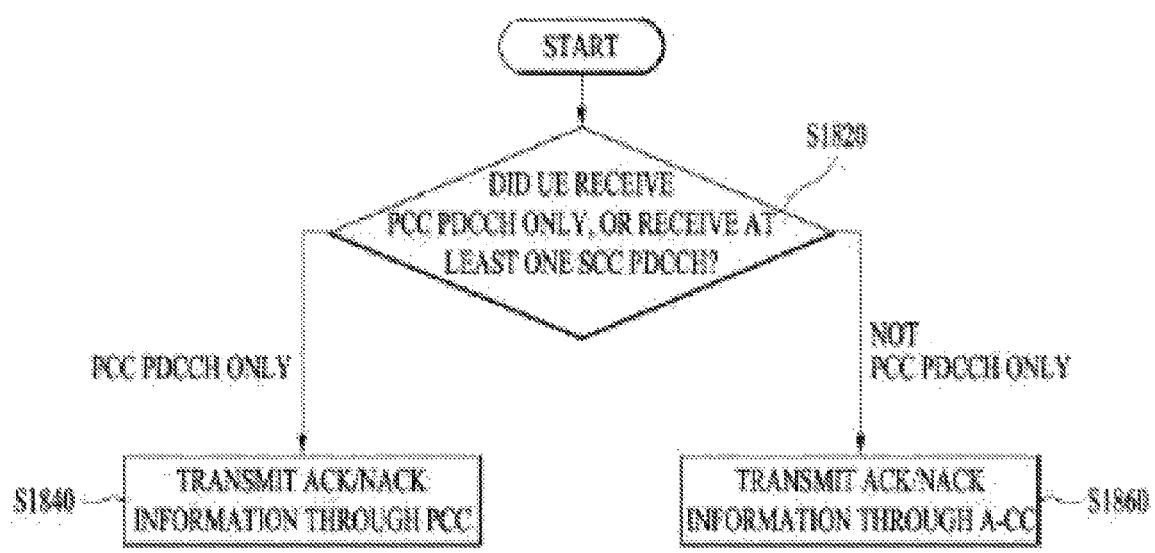
FIG. 18 is a flow diagram illustrating an example of ACK/NACK transmission according to an embodiment of the present invention.

FIG. 18 is a flow diagram illustrating an example of ACK/NACK transmission according to an embodiment of the present invention. Referring to FIG. 18, the present invention proposes a method in which the UE transmits ACK/NACK information on an A-CC (S1860) upon receiving at least one SCC-PDCCH (S1820, NOT PCC PDCCH ONLY) and transmits a PUCCH on a PCC (S1840) upon receiving only a PCC-PDCCH (S1820, PCC PDCCH ONLY), when a PUCCH including ACK/NACK information for DL data transmitted on multiple CCs is transmitted on the A-CC in the case in which the PCC is included in a group for transmitting the ACK/NACK information. Embodiment C.1 of the present invention will now be described in more detail with respect to FDD and TDD.

<FDD Case>

Upon receipt of at least one SCC-PDCCH in an FDD environment (S1820, NOT PCC PDCCH ONLY), the UE may transmit ACK/NACK information for all CCs in a group on an A-CC (S1860) using PUCCH format 3 and, upon receipt of only a PCC-PDCCH (S1820, PCC PDCCH ONLY), the UE may transmit only ACK/NACK information for the PCC-PDSCH (S1840) using PUCCH format 1a/1b.

More characteristically, when a PUCCH is transmitted on the A-CC, TPC command information of the PUCCH to be actually transmitted may be contained in a "TPC command for PUCCH" field of the PCC-PDCCH and information about an ACK/NACK resource indicator (ARI) may be included in a "TPC command for PUCCH" field of SCC-PDCCHs. In this case, the "TPC command for PUCCH" field of the PCC-PDCCH may refer to a TPC command for a PUCCH transmitted on the A-CC rather than a TPC command for a PUCCH transmitted on a PCC.

Alternatively, when the PUCCH is transmitted on the A-CC, the TPC command information of the PUCCH to be actually transmitted may be contained in a "TPC command for PUCCH" field of a PDCCH of the A-CC and the information about the ARI may be included in a "TPC command for PUCCH" field of a PDCCH of CCs except for the A-CC among a PCC and SCCs.

<TDD Case)>

In the TDD environment, ACK/NACK information for multiple subframes needs to be simultaneously transmitted through a PUCCH on one CC.

Figure 16:
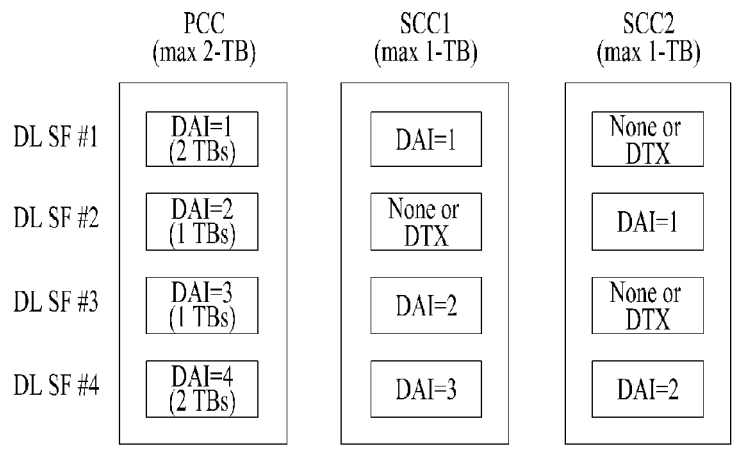
FIG. 16 illustrates DL transmission of multiple transport blocks (TBs) in time division duplex (TDD).

FIG. 16 illustrates DL transmission of multiple TBs in TDD.

Referring to FIG. 16, multiple PDCCHs transmitted in multiple subframes on one CC are distinguished from PDSCHs associated with the PDCCHs by different downlink assignment indexes (DAIs).

The present invention proposes a method in which the UE transmits ACK/NACK information on an A-CC (S1860)

upon receiving at least one PDCCH among a PCC-PDCCH with DAI>1 and SCC-PDCCHs (S1820, NOT PCC PDCCH ONLY) and transmits a PUCCH on a PCC (S1840) upon receiving only a PCC-PDCCH with DAI=1 (S1820, PCC PDCCH ONLY), when a PUCCH including ACK/NACK information for DL data transmitted on multiple CCs is transmitted on the A-CC in the TDD environment in the case in which the PCC is included in a group for transmitting ACK/NACK. In this case, the UE may transmit ACK/NACK information of all CCs in a group on the A-CC using PUCCH format 3 upon receiving at least one PDCCH among the PCC-PDCCH with DAI>1 and the SCC-PDCCHs and transmit only ACK/NACK information for a PCC-PDSCH on the PCC using PUCCH format 1a/1b upon receiving only the PCC-PDCCH with DAI=1.

Alternatively, the present invention proposes a method in which the UE transmits the ACK/NACK information on the A-CC (S1860) upon receiving at least one PDCCH among the SCC-PDCCHs (S1820, NOT PCC PDCCH ONLY) and transmits the PUCCH on the PCC (S1840) upon receiving only the PCC-PDCCH (S1820, PCC PDCCH ONLY), when the PUCCH including the ACK/NACK information for DL data transmitted on multiple CCs is transmitted on the A-CC in the TDD environment. In this case, the UE may transmit the ACK/NACK information on the A-CC using PUCCH format 3 upon receiving at least one PDCCH among the SCC-PDCCHs, transmit only ACK/NACK information for the PCC-PDSCH or ACK/NACK information for all CCs in a group on the PCC using PUCCH format 3 upon non-receiving the SCC-PDCCHs and receiving only a part or all of PDCCHs among the PCC-PDCCHs with DAI>1, and transmit only ACK/NACK information for the PCC-PDSCH on the PCC using PUCCH format 1a/1b upon receiving the PCC-PDCCH with DAI=1.

When the PUCCH is transmitted on the A-CC, TPC command information of a PUCCH to be actually transmitted may be included in a "TPC command for PUCCH" field of the PCC-PDCCH with DAI=1 and information about an ARI may be included in a "TPC command for PUCCH" field of the PCC-PDCCH with DAI>1 and the SCC-PDCCHs. In this case, the "TPC command for PUCCH" field of the PCC-PDCCH with DAI=1 may mean a TPC command for a PUCCH transmitted on the A-CC rather than a TPC command for a PUCCH transmitted on the PCC. Alternatively, when the PUCCH is transmitted on the A-CC, the TPC command information of the PUCCH to be actually transmitted may be contained in the "TPC command for PUCCH" field of the PDCCH with DAI=1 for the A-CC and the information about the ARI may be contained in a "TPC command for PUCCH" field of a PDCCH except for the PDCCH with DAI=1 for the A-CC among PDCCHs for the PCC and the SCCs.

C.2. PUCCH Format 1a/1b/3 on an A-CC

In a group for transmitting ACK/NACK information in the FDD environment, the ACK/NACK information may be transmitted on the A-CC using PUCCH format 1a/1b/3. This may be applied especially when one group consists of only SCCs.

<FDD Case>

Upon receiving at least one PDCCH among PDCCHs for different CCs other than the A-CC, i.e. among PDCCHs that schedule different CCs, in the FDD environment, the UE may transmit ACK/NACK information for PDSCHs of CCs in a group using PUCCH format 3 on the A-CC and, upon receiving only a PDCCH for the A-CC (i.e. an A-CC PDCCH), the UE may transmit ACK/NACK information for PDSCHs of CCs in a group on the A-CC using PUCCH format 1a/1b.

When the UE transmits ACK/NACK for DL data of CCs in a group on the A-CC and transmits such ACK/NACK using PUCCH format 3, the UE may transmit ACK/NACK information for PDSCHs of CCs in a group on the A-CC using PUCCH format 3 upon receiving at least one PDCCH among PDCCHs of different CCs other than the A-CC and transmit only ACK/NACK of an A-CC PDSCH on the A-CC using PUCCH format 1a/1b upon receiving only the PDCCH for the A-CC.

Information about a TPC command of a PUCCH to be transmitted on the A-CC may be contained in a "TPC command for PUCCH" field included in the A-CC PDCCH and information about an ARI of a PUCCH may be contained in a "TPC command for a PUCCH" field of a PDCCH of the other CCs.

<TDD Case>

ACK/NACK information in a group for transmitting ACK/NACK information in the TDD environment may be transmitted on the A-CC using PUCCH format 1a/1b/3. This may be applied especially when one group consists of only SCCs.

Upon receiving at least one PDCCH among PDCCHs for CCs other than the A-CC, the UE may transmit ACK/NACK information for PDSCHs on CCs in a group on the A-CC using PUCCH format 3 and, upon receiving only an A-CC PDCCH, the UE may transmit ACK/NACK information on the A-CC using PUCCH format 1a/1b or PUCCH format 3.

Alternatively, upon receiving at least one PDCCH among PDCCHs of CCs other than the A-CC (i.e. receiving a PDCCH other than the A-CC) or receiving one PDCCH among PDCCH(s) with DAI>1 for the A-CC, the UE may transmit ACK/NACK information for PDSCHs on CCs in a group on the A-CC using PUCCH format 3 and, upon receiving only a PDCCH with DAI=1 for the A-CC (i.e. an A-CC PDCCH with DAI=1), the UE may transmit only ACK/NACK for the A-CC PDSCH on the A-CC using PUCCH format 1a/1b.

When ACK/NACK information for DL data transmitted on multiple CCs in the TDD environment is transmitted using PUCCH format 3 and a PUCCH is transmitted on the A-CC, TPC command information of the PUCCH to be transmitted on the A-CC may be contained in a "TPC command for PUCCH" field included in the A-CC PDCCH with DAI=1 and information about an ARI of the PUCCH may be contained in a "TPC command for PUCCH" field of an A-CC PDCCH with DAI>1 and the other SCC-PDCCH(s).

D. ACK/NACK Transmission Scheme in Group—Channel Selection

The present invention proposes a method for transmitting, on an SCC, ACK/NACK information for DL data transmitted on two CCs, using a channel selection scheme when the two CCs constitute one ACK/NACK transmission group.

D.1. Transmission of Only CC1-ACK/NACK on CC1 and Transmission of CC2-ACK/NACK on CC2

Hereinafter, CCx-ACK/NACK or CCx ACK/NACK refers to ACK/NACK for CCx.

The present invention proposes that the UE transmit ACK/NACK information of a corresponding group on CC1 upon receiving only CC1-PDCCH and transmit ACK/NACK information of a corresponding group on CC2 upon receiving only CC2-PDCCH, when two CCs of CC1 and CC2 are included in a group for transmitting ACK/NACK and a PUCCH carrying ACK/NACK information for DL data transmitted on multiple CCs in the group is transmitted. That is, if the UE receives only CC1-PDCCH, CC1 is configured as an A-CC and if the UE receives only CC2-PDCCH, CC2 is configured as the A-CC.

Characteristically, when only CC1 and CC2 for transmitting ACK/NACK information are present in the group, the UE may use PUCCH channel selection for ACK/NACK transmission. In this case, upon receipt of only CC1-PDCCH, the UE may transmit ACK/NACK through a PUCCH resource on CC1 and, upon receipt of only CC2-PDCCH, the UE may transmit ACK/NACK through a PUCCH resource on CC2. A 'PCC', and an 'SCC' that is carrier-aggregated with the PCC may be present in the group for ACK/NACK transmission. When the present embodiment is applied to the group consisting of the 'PCC' and the 'SCC', 'CC1' may be replaced with the 'PCC' and 'CC2' may be replaced with the 'SCC' that is carrier-aggregated with the PCC. Alternatively, 'CC2' may be replaced with the 'PCC' and 'CC1' may be replaced with the 'SCC' that is carrier-aggregated with the PCC. In a legacy system, this may mean an allocation scheme for swapping a PUCCH resource index (e.g. PUCCH 2 or PUCCH 3) linked to the SCC for a PUCCH resource linked to the PCC and swapping a PUCCH resource index (e.g. PUCCH 0 or PUCCH 1) linked to the PCC for a PUCCH resource linked to the SCC. For example, a HARQ-ACK index (e.g. HARQ-ACK(2) or HARQ-ACK (3)) corresponding to the SCC in Tables 11, 12, 13, 14, 15, 16, 17, 18, 19, 21, 22, and 23 may be mapped to HARQ-ACK information corresponding to the PCC through swapping and a HARQ-ACK index (e.g. HARQ-ACK(0) or HARQ-ACK(1)) corresponding to the PCC may be mapped to HARQ-ACK information corresponding to the SCC through swapping. Such a proposed scheme is referred to as a "CC swapping method" for convenience.

Alternatively, 'SCC1' which is an SCC and 'SCC2' which is another SCC may be present in a group for transmitting ACK/NACK information. When the present invention is applied to such a group, 'CC1' may be replaced with 'SCC1' and 'CC2' may be replaced with 'SCC2'. The case in which the present embodiment is applied to FDD and TDD will now be described in more detail.

<FDD Case>

In the FDD environment, carrier-aggregated CC1 and CC2 may be present and scheduling for the two CCs may be performed on CC1. According to the present embodiment, in order for the UE to transmit ACK/NACK information on CC1 upon receiving only CC1-PDCCH and to transmit ACK/NACK information on CC2 upon receiving only CC2-PDCCH, a PUCCH resource for transmitting ACK/NACK through channel selection may be given according to Table 30.

TABLE 30

| n | Max TB (CC1, CC2) | PUCCH 0 | PUCCH 1 | PUCCH 2 | PUCCH 3 |
|---|---|---|---|---|---|
| 2 | (1-TB, 1-TB) | From CC1-PDCCH | Explicit #1 | NA | NA |
| 3 | (2-TB, 1-TB) | From CC1-PDCCH | From CC1-PDCCH | Explicit #1 | NA |
| 3 | (1-TB, 2-TB) | Explicit #1 | Explicit #2 | From CC1-PDCCH | NA |
| 4 | (2-TB, 2-TB) | From CC1-PDCCH | From CC1-PDCCH | Explicit #1 | Explicit #2 |

As shown in Table 30, when 4 PUCCH resources for ACK/NACK transmission, i.e. PUCCH 0, PUCCH 1, PUCCH 2, and PUCCH 3, are present, a method for acquiring the PUCCH resources differ according to 'Max TB' of CC1 and CC2, i.e. the number n of transport blocks. In Table 30, 'From CC1-PDCCH' indicates that a PUCCH resource implicitly linked to CC1-PUCCH is used for a PUCCH resource for ACK/NACK transmission. A PUCCH resource indicated by 'From CC1-PDCCH' for PUCCH 0 and PUCCH 2 represents an implicit PUCCH resource linked to the first CCE index (i.e. $n_{CCE}$) of CC1-PDCCH and a PUCCH resource indicated by 'From CC1-PDCCH' for PUCCH 1 and PUCCH 3 represents an implicit PUCCH resource linked to a CCE index '$n_{CCE}+1$' of CC1-PDCCH. 'Explicit #1' and 'Explicit #2' indicate plural (e.g. 4) explicit PUCCH resource pairs pre-designated by RRC. Which pair among the plural explicit PUCCH resource pairs is used to transmit a PUCCH carrying ACK/NACK information is indicated through an ARI. In this case, a TPC field of CC2-PDCCH may be used as the ARI.

In this case, 'Explicit #1' and 'Explicit #2' which are the plural (e.g. 4) explicit PUCCH resource pairs pre-designated by RRC may mean PUCCH resources of CC2. If PUCCH resources are acquired through 'From CC1-PDCCH', a PUCCH carrying ACK/NACK information may be transmitted on CC1 and, if PUCCH resources are acquired through 'Explicit #1' or 'Explicit #2', the PUCCH carrying the ACK/NACK information may be transmitted on CC2. For ACK/NACK transmission, Table 26, Table 27, and Table 28 may be used as a 2-bit mapping table, a 3-bit mapping table, and a 4-bit mapping table, respectively. In applying Table 26, Table 27, and Table 28 to the present embodiment, a PCC may be replaced with CC1 and an SCC may be replaced with CC2. Upon receiving only CC2-PDCCH, the UE transmits ACK/NACK information on CC2 (i.e. using a PUCCH resource obtained from 'Explicit #1' or 'Explicit #2' and, upon only CC1-PDCCH, the UE transmits the ACK/NACK information on CC1 (i.e. using a PUCCH resource obtained through 'From CC1-PDCCH').

In Table 30, the case in which the "CC swapping method" proposed in the present invention for n=4 is applied will now be described. First, if swapping is applied to PUCCH 0/1 linked to CC1 and PUCCH 2/3 linked to CC2, PUCCH resources may be given according to Table 31.

TABLE 31

| n | Max TB (CC1, CC2) | PUCCH 0 | PUCCH 1 | PUCCH 2 | PUCCH 3 |
|---|---|---|---|---|---|
| 4 | (2-TB, 2-TB) | Explicit #1 | Explicit #2 | From CC1-PDCCH | From CC1-PDCCH |

In Table 31, CC1 may be regarded as a PCC and CC2 may be regarded as an SCC. HARQ-ACK(0) and HARQ-ACK(1) may be mapped to CC2, i.e. HARQ-ACK information corresponding to the SCC and HARQ-ACK(2) and HARQ-ACK(3) may be mapped to CC1, i.e. HARQ-ACK information corresponding to the PCC. According to the same rule, the "CC swapping method" may be applied to the above-described embodiments and later-described embodiments.

In the FDD environment, non-cross-CC scheduling may be performed for carrier-aggregated CC1 and CC2. In order for the UE to transmit ACK/NACK information on CC1 upon receiving only CC1-PDCCH and to transmit ACK/NACK on CC2 upon receiving only CC2-PDCCH, a PUCCH resource for ACK/NACK information transmission through channel selection may be given according to Table 32.

TABLE 32

| n | Max TB (CC1, CC2) | PUCCH 0 | PUCCH 1 | PUCCH 2 | PUCCH 3 |
|---|---|---|---|---|---|
| 2 | (1-TB, 1-TB) | From CC1-PDCCH | From CC2-PDCCH | NA | NA |
| 3 | (2-TB, 1-TB) | From CC1-PDCCH | From CC1-PDCCH | From CC2-PDCCH | NA |
| 3 | (1-TB, 2-TB) | From CC2-PDCCH | From CC2-PDCCH | From CC1-PDCCH | NA |
| 4 | (2-TB, 2-TB) | From CC1-PDCCH | From CC1-PDCCH | From CC2-PDCCH | From CC2-PDCCH |

In Table 32, 'From CC1(CC2)-PDCCH' means that a PUCCH resource implicitly linked to CC1(CC2)-PDCCH is used as a PUCCH resource for channel selection. A PUCCH resource indicated by 'From CC1(CC2)-PDCCH' for PUCCH 0 and PUCCH 2 means an implicit PUCCH resource linked to the first CCE index (i.e. $n_{CCE}$) of CC1 (CC2)-PDCCH and a PUCCH resource indicated by 'From CC1(CC2)-PDCCH' for PUCCH 1 and PUCCH 3 means an implicit PUCCH resource linked to a CCE index '$n_{CCE}+1$' of CC1-PDCCH.

When a PUCCH resource is acquired from 'From CC1-PDCCH', a PUCCH may be transmitted on CC1 and when the PUCCH resource is acquired from 'From CC2-PDCCH', the PUCCH may be transmitted on CC2. Table 26, Table 27, and Table 28 mat be used as a 2-bit mapping table, a 3-bit mapping table, and a 4-bit mapping table, respectively, for ACK/NACK transmission. When Table 26, Table 27, and Table 28 are applied, the UE transmits ACK/NACK information on CC2 (i.e. through a PUCCH resource indicated by 'From CC1-PDCCH') upon receiving only CC2-PDCCH and transmits the ACK/NACK information on CC1 (i.e. through a PUCCH resource indicated by 'From CC1-PDCCH') upon receiving only CC1-PDCCH.

<TDD Case>

Case of M=1

In the TDD environment, when carrier-aggregated CC1 and CC2 are present and the number (i.e. M) of DL subframes associated with a PUCCH carrying ACK/NACK information is 1, PUCCH resource(s) may be determined by the same method as in <FDD case> of the above-described D.1.

Notably, in the TDD environment, Table 17, Table 18, and Table 19 may be used as a 2-bit mapping table, a 3-bit mapping table, and a 4-bit mapping table, respectively, for ACK/NACK transmission. In this case, ACK/NACK transmission may be performed by replacing a PCC and an SCC denoted in each table as CC1 and as CC2, respectively.

Case of M=2, 3 or 4

In the TDD environment, when carrier-aggregated CC1 and CC2 are present and scheduling for the two CCs is performed on CC1, if the number (i.e. M) of DL subframes associated with a PUCCH carrying ACK/NACK transmission using channel selection is 2, 3, or 4, Table 19, Table 21, and Table 22 may be used for ACK/NACK transmission.

When CC1 and CC2 are present and scheduling for the two CCs is performed on CC1, in order for the UE to transmit ACK/NACK information on CC1 upon receiving only CC1-PDCCH and to transmit ACK/NACK on CC2 upon receiving only CC2-PDCCH according to the present embodiment, a PUCCH resource for ACK/NACK transmission through channel selection may be given according to Table 33 and Table 34. Table 33 may be applied when M=2 and Table 34 may be applied when M=3 or 4.

TABLE 33

| PUCCH 0 | PUCCH 1 | PUCCH 2 | PUCCH 3 |
|---|---|---|---|
| From CC1 subframe #1 | From CC1 subframe #2 | Explicit #1 with ARI | Explicit #2 with ARI |

TABLE 34

| PUCCH 0 | PUCCH 1 | PUCCH 2 | PUCCH 3 |
|---|---|---|---|
| From CC1 DAI1-PDCCH | From CC1 DAI2-PDCCH | Explicit #1 with ARI | Explicit #2 with ARI |

In Table 33 and Table 34, 'From CC1 subframe #1' means that a PUCCH resource implicitly linked to the first CCE index of a PDCCH in CC1 subframe #1 is used as a PUCCH resource for ACK/NACK transmission. 'From CC1 subframe #2 means that a PUCCH resource implicitly linked to the first CCE index of a PDCCH in CC1 subframe #2 is used as the PUCCH resource for ACK/NACK transmission. 'From CC1 DAI1-PDCCH' means that a PUCCH resource implicitly linked to CC1-PDCCH with DA1 is used as the PUCCH resource for ACK/NACK transmission. A PUCCH resource indicated by 'From CC1 DAI1-PDCCH' for PUCCH 0 means an implicit PUCCH resource linked to the first CCE index (i.e. $n_{CCE}$) of CC1-PDCCH with DA1 and a PUCCH resource indicated by 'From CC1 DAI2-PDCCH' for PUCCH 1 means an implicit PUCCH resource linked to the first CCE index (i.e. $n_{CCE}$) of CC1-PDCCH with DAI=2. 'Explicit #1 with ARI' and 'Explicit #2 with ARI' mean plural (e.g. 4) explicit PUCCH resource pairs predesignated by RRC. Which pair among the plural explicit PUCCH resource pairs is to be used to transmit a PUCCH carrying ACK/NACK information is indicated to the UE through an ARI. TPC fields of CC2-PDCCH with DA1 and CC2-PDCCH with DA2 may be used as ARIs.

In Table 33 and Table 34, 'Explicit #1 with ARI' and 'Explicit #2 with ARI' which are plural (e.g. 4) explicit PUCCH resource pairs pre-designated by RRC may mean PUCCH resources of CC2. If the PUCCH resources are acquired from 'From CC1 DAI1-PDCCH' or 'From CC1 DAI2-PDCCH', a PUCCH may be transmitted on CC1 and, if the PUCCH resources are acquired from 'From CC2 DAI1-PDCCH' or 'From CC2 DAI2-PDCCH', the PUCCH may be transmitted on CC2. Table 19, Table 21, and Table 22 may be applied for ACK/NACK transmission. When Table 19, Table 21, and Table 22 are applied, the UE transmits ACK/NACK information on CC2 upon receiving only a PDCCH of CC2 and transmits the ACK/NACK information on CC1 upon receiving only a PDCCH of CC1.

When CC1 and CC2 are present in a group for ACK/NACK transmission and non-cross-CC scheduling is performed for CC1 and CC2, in order for the UE to transmit ACK/NACK information on CC1 upon receiving only CC1-PDCCH and transmit ACK/NACK on CC2 upon receiving only CC2-PDCCH according to the present embodiment, a PUCCH resource of channel selection for ACK/NACK transmission may be given according to Table 35 and Table 36. Table 35 may be applied when M=2 and Table 36 may be applied when M=3 or 4.

TABLE 35

| PUCCH 0 | PUCCH 1 | PUCCH 2 | PUCCH 3 |
|---|---|---|---|
| From CC1 subframe #1 | From CC1 subframe #2 | From CC2 subframe #1 | From CC2 subframe #2 |

TABLE 36

| PUCCH 0 | PUCCH 1 | PUCCH 2 | PUCCH 3 |
|---|---|---|---|
| From CC1 DAI1-PDCCH | From CC1 DAI2-PDCCH | From CC2 DAI1-PDCCH | From CC2 DAI2-PDCCH |

In Table 35, 'From CC1(CC2) subframe #1' means that a PUCCH resource implicitly linked to the first CCE index of a PDCCH in CC1(CC2) subframe #1 is used as a PUCCH resource for ACK/NACK transmission. 'From CC1(CC2) subframe #2 means that a PUCCH resource implicitly linked to the first CCE index of a PDCCH in CC1(CC2) subframe #2 is used as the PUCCH resource for ACK/NACK transmission. In Table 36, 'From CC1(CC2) DAI1-PDCCH' means that a PUCCH resource implicitly linked to CC1 (CC2)-PDCCH with DAI is used as the PUCCH resource for ACK/NACK transmission and 'From CC1(CC2) DAI2-PDCCH' means that a PUCCH resource implicitly linked to CC1(CC2)-PDCCH with DAI=2 is used for the PUCCH resource for ACK/NACK transmission.

In Table 35 and Table 36, when a PUCCH resource is obtained from 'From CC1 DAI1-PDCCH' or 'From CC1 DAI2-PDCCH', a PUCCH carrying ACK/NACK information may be transmitted on CC1 and when the PUCCH resource is obtained from 'From CC2 DAI1-PDCCH' or 'From CC2 DAI2-PDCCH', the PUCCH carrying the ACK/NACK information may be transmitted on CC2. In this case, Table 19, Table 21, and Table 22 may be applied for ACK/NACK transmission. In relation to the present embodiment, a PCC and an SCC of Table 19, Table 21, and Table 22 may be replaced with CC1 and CC2, respectively. The UE transmits ACK/NACK information on CC2 upon receiving only CC2-PDCCH and transmits the ACK/NACK information on CC1 upon receiving only CC1-PDCCH.

D.2. Transmission of CC1-ACK/NACK and CC2-ACK/NACK on CC2

When two CCs of CC1 and CC2 are included in a group for ACK/NACK transmission, a PUCCH carrying ACK/NACK information for DL data transmitted on CC1 and CC2 may be configured on CC2.

Characteristically, when only CC1 and CC2 for ACK/NACK transmission are present in a group, the UE may use PUCCH channel selection for ACK/NACK transmission and transmit ACK/NACK information through a PUCCH resource on CC2.

In this case, a 'PCC', and an 'SCC' carrier-aggregated with the PCC may be present in the group for ACK/NACK transmission. When the present embodiment is applied to the group including both the PCC and the SCC, 'CC1' indicated in the present embodiment may refer to the 'PCC' and 'CC2' indicated in the present embodiment may refer to the 'SCC' carrier-aggregated with the PCC. Alternatively, 'CC2' may refer to the 'PCC' and 'CC1' may refer to the 'SCC' carrier-aggregated with the PCC. This may mean resource allocation through swapping of PUCCH resource indexes (e.g. PUCCH 2 and PUCCH 3) linked to the SCC for PUCCH resources linked to the PCC and swapping of PUCCH resource indexes (e.g. PUCCH 0 and PUCCH 1) linked to the PCC for PUCCH resources linked to the SCC.

For example, in Table 11 to Table 19, Table 21, Table 22, and Table 23, ACK/NACK information may be mapped to a PUCCH resource, a constellation value, an RM code input bit, etc. by swapping HARQ-ACK indexes (e.g. HARQ-ACK(2) and HARQ-ACK(3)) corresponding to the SCC for HARQ-ACK information corresponding to the PCC and swapping HARQ-ACK indexes (e.g. HARQ-ACK(0) and HARQ-ACK(1)) corresponding to the PCC for HARQ-ACK information corresponding to the SCC. This proposed scheme is referred to as the "CC swapping method" as described in D. 1, for convenience.

In a group for ACK/NACK transmission, 'SCC1' which is an SCC and 'SCC2' which is another SCC may be present. When the present invention is applied to a group including only two SCCs, 'CC1' and 'CC2' indicated in the present embodiment may refer to 'SCC1' and 'SCC2', respectively.

The case in which FDD and TDD are applied according to the present embodiment will now be described in more detail.

<FDD Case>

In the FDD environment, scheduling for two carrier-aggregated CCs, CC1 and CC2, may be performed using CC1 and ACK/NACK information may be transmitted through a PUCCH resource on CC2. In this case, in order to transmit, on CC2, ACK/NACK information for data transmitted on CC1 and CC2, a PUCCH resource for ACK/NACK transmission through channel selection may be given according to Table 37.

TABLE 37

| n | Max TB (CC1, CC2) | PUCCH 0 | PUCCH 1 | PUCCH 2 | PUCCH 3 |
|---|---|---|---|---|---|
| 2 | (1-TB, 1-TB) | Explicit #1 | Explicit #2 | NA | NA |
| 3 | (2-TB, 1-TB) | Explicit #1 | Explicit #2 | Explicit #3 | NA |
| 3 | (1-TB, 2-TB) | Explicit #1 | Explicit #2 | Explicit #3 | NA |
| 4 | (2-TB, 2-TB) | Explicit #1 | Explicit #2 | Explicit #3 | Explicit #4 |

In Table 37, 'Explicit #1', 'Explicit #2', 'Explicit #3', and 'Explicit #4' represent plural (e.g. 4) explicit PUCCH resource pairs pre-designated by RRC. Which pair among the plural explicit PUCCH resource pairs is used to transmit a PUCCH carrying ACK/NACK information is indicated to the UE through an ARI. In this case, a TPC field of CC2-PDCCH may be used to indicate the ARI. If the TPC field of CC2-PDCCH is used as the ARI and the UE needs to transmit only ACK/NACK information for data transmitted on CC1 without receiving CC2-PDCCH, the UE cannot receive the ARI from the eNB and, thus, the UE cannot be aware of a PUCCH resource for transmitting the ACK/NACK information. In this case, the UE may transmit a PUCCH using a prescheduled or RRC-configured explicit PUCCH resource pair.

In Table 37, 'Explicit #1', 'Explicit #2', 'Explicit #3', and 'Explicit #4' which are plural (e.g.

4) explicit PUCCH resource pairs pre-designated by RRC may mean PUCCH resources of CC2. Accordingly, the UE may use PUCCH channel selection for ACK/NACK transmission for CC1 and CC2 and transmit ACK/NACK information through the PUCCH resources on CC2.

In the FDD environment, scheduling for two carrier-aggregated CCs, CC1 and CC2, may be performed on CC2 and ACK/NACK information for data transmitted on CC1 and CC2 may be transmitted on CC2. In order to transmit, on CC2, ACK/NACK information for data transmitted on CC1 and CC2, a PUCCH resource through channel selection may be given according to Table 38 and Table 39 for example.

TABLE 38

| n | Max TB (CC1, CC2) | PUCCH 0 | PUCCH 1 | PUCCH 2 | PUCCH 3 |
|---|---|---|---|---|---|
| 2 | (1-TB, 1-TB) | From CC2-PDCCH | From CC1-PDCCH | NA | NA |
| 3 | (2-TB, 1-TB) | From CC1-PDCCH | From CC1-PDCCH | From CC2-PDCCH | NA |
| 3 | (1-TB, 2-TB) | From CC2-PDCCH | From CC2-PDCCH | From CC1-PDCCH | NA |
| 4 | (2-TB, 2-TB) | From CC2-PDCCH | From CC2-PDCCH | From CC1-PDCCH | From CC1-PDCCH |

TABLE 39

| n | Max TB (CC1, CC2) | PUCCH 0 | PUCCH 1 | PUCCH 2 | PUCCH 3 |
|---|---|---|---|---|---|
| 2 | (1-TB, 1-TB) | From CC1-PDCCH | From CC2-PDCCH | NA | NA |
| 3 | (2-TB, 1-TB) | From CC1-PDCCH | From CC1-PDCCH | From CC2-PDCCH | NA |
| 3 | (1-TB, 2-TB) | From CC2-PDCCH | From CC2-PDCCH | From CC1-PDCCH | NA |
| 4 | (2-TB, 2-TB) | From CC1-PDCCH | From CC1-PDCCH | From CC2-PDCCH | From CC2-PDCCH |

In Table 39 and Table 39, 'From CC1(CC2)-PDCCH' means that a PUCCH resource implicitly linked to CC1 (CC2)-PDCCH is used as a PUCCH resource for ACK/NACK transmission. A PUCCH resource indicated by 'From CC1(CC2)-PDCCH' for PUCCH 0 and PUCCH 2 means an implicit PUCCH resource linked to the first CCE index (i.e. $n_{CCE}$) of CC1(CC2)-PDCCH. A PUCCH resource indicated by 'From CC1(CC2)-PDCCH' for PUCCH 1 and PUCCH 3 means an implicit PUCCH resource linked to a CCE index '$n_{CCE}+1$' of CC1(CC2)-PDCCH. In this case, since both CC1-PDCCH and CC2-PDCCH are transmitted on CC2 in an environment in which cross scheduling is performed on CC2, both the PUCCH resource indicated by 'From CC1-PDCCH' and the PUCCH resource indicated by 'From CC2-PDCCH' mean resources on CC2. Therefore, the UE may use PUCCH channel selection for ACK/NACK transmission for CC1 and CC2 and transmit corresponding ACK/NACK information through the PUCCH resources on CC2.

In the FDD environment, non-cross-CC scheduling for two carrier-aggregated CCs, CC1 and CC2, may be performed. In order to transmit ACK/NACK information for data transmitted on CC1 and CC2 through the PUCCH resources on CC2, a PUCCH resource for channel selection may be given according to Table 40.

TABLE 40

| n | Max TB (CC1, CC2) | PUCCH 0 | PUCCH 1 | PUCCH 2 | PUCCH 3 |
|---|---|---|---|---|---|
| 2 | (1-TB, 1-TB) | Explicit | From CC2-PDCCH | NA | NA |
| 3 | (2-TB, 1-TB) | Explicit #1 | Explicit #2 | From CC2-PDCCH | NA |
| 3 | (1-TB, 2-TB) | From CC2-PDCCH | From CC2-PDCCH | Explicit | NA |
| 4 | (2-TB, 2-TB) | Explicit #1 | Explicit #2 | From CC2-PDCCH | From CC2-PDCCH |

In Table 40, 'From CC2-PDCCH' means that a PUCCH resource implicitly linked to CC2-PDCCH is used as a PUCCH resource for ACK/NACK transmission. A PUCCH resource indicated by 'From CC2-PDCCH' for PUCCH 0 and PUCCH 2 means an implicit PUCCH resource linked to the first CCE index (i.e. $n_{CCE}$) of CC2-PDCCH. A PUCCH resource indicated by 'From CC2-PDCCH' for PUCCH 1 and PUCCH 3 means an implicit PUCCH resource linked to a CCE index '$n_{CCE}+1$' of CC2-PDCCH. 'Explicit #1' and 'Explicit #2' mean plural (e.g. 4) explicit PUCCH resource pairs pre-designated by RRC. Which pair among the plural explicit PUCCH resource pairs is used to transmit a PUCCH is indicated to the UE through an ARI. In this case, a TPC field of CC1-PDCCH may be used to indicate the ARI.

'Explicit #1' and 'Explicit #2' which are the plural (e.g. 4) explicit PUCCH resource pairs pre-designated by RRC may mean PUCCH resources of CC2. Therefore, the UE may use PUCCH channel selection for ACK/NACK transmission for CC1 and CC2 and transmit ACK/NACK through the PUCCH resources on CC2.

In Table 40, if the "CC swapping method" of the present invention for n=4 is applied, for example, PUCCH 0/1 linked to CC1 and PUCCH 2/3 linked to CC2 may be swapped as follows.

TABLE 41

| n | Max TB (CC1, CC2) | PUCCH 0 | PUCCH 1 | PUCCH 2 | PUCCH 3 |
|---|---|---|---|---|---|
| 4 | (2-TB, 2-TB) | From CC2-PDCCH | From CC2-PDCCH | Explicit #1 | Explicit #2 |

In Table 41, CC1 may be regarded as a PCC and CC2 may be regarded as an SCC. HARQ-ACK(0) and HARQ-ACK (1) may be mapped to CC2, i.e. HARQ-ACK information corresponding to the SCC, and HARQ-ACK(2) and HARQ-ACK(3) may be mapped to CC1, i.e. HARQ-ACK information corresponding to the PCC. The "CC swapping method" may be applied to all of the above-described TDD/FDD cases and to all of the later-described TDD/FDD cases.

<TDD Case>

M=1 Case

When carrier-aggregated CC1 and CC2 are present in the TDD environment, if the number (i.e. M) of DL subframes associated with a PUCCH carrying ACK/NACK information is 1, PUCCH resource(s) may be used by the same method as in <FDD case> of the above-described D.2.

Notably, in the TDD environment, Table 17, Table 18, and Table 19 may be used as a 2-bit mapping table, a 3-bit mapping table, and a 4-bit mapping table, respectively, for ACK/NACK transmission. In this case, a PCC and an SCC associated with each table may be replaced with CC1 and CC2, respectively.

Case of M=2, 3, or 4

In the TDD environment, when carrier-aggregated CC1 and CC2 are present and scheduling for CC1 and CC2 is performed on CC1, if the number (i.e. M) of DL subframes associated with a PUCCH carrying ACK/NACK information through channel selection is 2, 3, or 4, Table 19, Table 21, and Table 22 are used for ACK/NACK transmission.

In the TDD environment, scheduling for the two carrier-aggregated CC1 and CC2 may be performed using CC1 and ACK/NACK information may be transmitted through a PUCCH resource on CC2. In this case, PUCCH resource(s) for channel selection for transmitting, on CC2, ACK/NACK information for data transmitted on CC1 and CC2 may be obtained according to Table 42.

TABLE 42

| PUCCH 0 | PUCCH 1 | PUCCH 2 | PUCCH 3 |
|---|---|---|---|
| Explicit #1 with ARI | Explicit #2 with ARI | Explicit #3 with ARI | Explicit #4 with ARI |

In Table 42, 'Explicit #1 with ARI', 'Explicit #2 with ARI', 'Explicit #3 with ARI', and 'Explicit #4 with ARI' mean plural (i.e. 4) explicit PUCCH resource pairs predesignated by RRC. A PUCCH resource pair which should be used by the UE among the plural explicit PUCCH resource pairs is indicated to the UE through an ARI. TPC fields of CC2-PDCCH with DA1 and CC2-PDCCH with DAI=2 may be used as ARIs. When a TPC field of CC2-PDCCH is used as ARI, if the UE needs to transmit only ACK/NACK information for data transmitted on CC1 without receiving CC2-PDCCH, the UE cannot be aware of a PUCCH resource for ACK/NACK transmission because the ARI is not received from the eNB. Then, the UE may transmit a PUCCH using a prescheduled or RRC-configured explicit PUCCH resource pair.

In Table 42, Explicit #1 with ARI', 'Explicit #2 with ARI', 'Explicit #3 with ARI', and 'Explicit #4 with ARI' which are the plural (e.g. 4) explicit PUCCH resource pairs pre-designated by RRC may mean PUCCH resources of CC2. Therefore, the UE may use PUCCH channel selection for ACK/NACK transmission for CC1 and CC2 and transmit ACK/NACK information through the PUCCH resources on CC2.

In the TDD environment, scheduling for two carrier-aggregated CCs, CC1 and CC2, may be performed on CC2 and ACK/NACK information may be transmitted on CC2. In this case, in order to transmit, on CC2, ACK/NACK information for data transmitted on CC1 and CC2, a PUCCH resource for channel selection may be acquired according to Table 43, Table 44 or Table 45, and Table 46. Table 43 and Table 45 are applied when M=2, and Table 44 and Table 46 are applied when M=3 or 4. For example, when M=2, Table 43 may be used and, when M=3 or 4, Table 44 may be used. As another example, when M=2, Table 45 may be used and, when M=3 or 4, Table 46 may be used. A table to be used may be configured by a higher layer.

TABLE 43

| PUCCH 0 | PUCCH 1 | PUCCH 2 | PUCCH 3 |
|---|---|---|---|
| From CC1 subframe #1 | From CC1 subframe #2 | From CC2 subframe #1 | From CC2 subframe #2 |

TABLE 44

| PUCCH 0 | PUCCH 1 | PUCCH 2 | PUCCH 3 |
|---|---|---|---|
| From CC1 DAI1-PDCCH | From CC1 DAI2-PDCCH | From CC2 DAI1-PDCCH | From CC2 DAI2-PDCCH |

TABLE 45

| PUCCH 0 | PUCCH 1 | PUCCH 2 | PUCCH 3 |
|---|---|---|---|
| From CC2 subframe #1 | From CC2 subframe #2 | From CC1 subframe #1 | From CC1 subframe #2 |

TABLE 46

| PUCCH 0 | PUCCH 1 | PUCCH 2 | PUCCH 3 |
|---|---|---|---|
| From CC2 DAI1-PDCCH | From CC2 DAI2-PDCCH | From CC1 DAI1-PDCCH | From CC1 DAI2-PDCCH |

In Table 43, Table 44, Table 45, and Table 46, 'From CC1(CC2) subframe #1' means that a PUCCH resource implicitly linked to the first CCE index of CC1(CC2) subframe #1 is used as a PUCCH resource for ACK/NACK transmission. 'From CC1(CC2) subframe #2' means that a PUCCH resource implicitly linked to the first CCE index of a PDCCH of CC1 (CC2) subframe #2 is used as a PUCCH resource for ACK/NACK transmission. 'From CC1(CC2) DAI1-PDCCH' means that a PUCCH resource implicitly linked to CC1(CC2)-PDCCH with DAI=1 is used as a PUCCH resource for ACK/NACK transmission and 'From CC1(CC2) DAI2-PDCCH' means that a PUCCH resource implicitly linked to CC1(CC2)-PDCCH with DAI=2 is used as a PUCCH resource for ACK/NACK transmission. In this case, since both CC1-PDCCH and CC2-PDCCH are transmitted on CC2 in an environment in which CC2 performs cross scheduling, both a PUCCH resource indicated by 'From CC1 DAI1-PDCCH' or 'From CC1 DAI2-PDCCH' and a PUCCH resource indicated by 'From CC2 DAI1-PDCCH' or 'From CC2 DAI2-PDCCH' mean resources on CC2. Therefore, the UE may use PUCCH channel selection for ACK/NACK transmission for CC1 and CC2 and corresponding ACK/NACK information may be transmitted through the PUCCH resources on CC2.

In the TDD environment, when non-cross-CC scheduling is performed, in order to transmit ACK/NACK for data transmitted on CC1 and CC2 through the PUCCH resources on CC2, a PUCCH resource for channel selection may be given according to Table 47 and Table 48. Table 47 may be applied when M=2 and Table 48 may be applied when M=3 or 4.

TABLE 47

| PUCCH 0 | PUCCH 1 | PUCCH 2 | PUCCH 3 |
|---|---|---|---|
| Explicit #1 with ARI | Explicit #2 with ARI | From CC2 subframe #1 | From CC2 subframe #2 |

TABLE 48

| PUCCH 0 | PUCCH 1 | PUCCH 2 | PUCCH 3 |
|---|---|---|---|
| Explicit #1 with ARI | Explicit #2 with ARI | From CC2 DAI1-PDCCH | From CC2 DAI2-PDCCH |

In Table 47 and Table 48, 'From CC2 subframe #1' means that a PUCCH resource implicitly linked to the first CCE index of a PDCCH of CC2 subframe #1 is used as a PUCCH resource for ACK/NACK transmission. 'From CC2 subframe #2 means that a PUCCH resource implicitly linked to the first CCE index of a PDCCH of CC2 subframe #2 is used as a PUCCH resource for ACK/NACK transmission. 'From CC2 DAI1-PDCCH' means that a PUCCH resource implicitly linked to CC2-PDCCH with DA1 is used as a PUCCH resource for ACK/NACK transmission and 'From CC2 DAI2-PDCCH' means that a PUCCH resource implicitly linked to CC2-PDCCH with DAI=2 is used as a PUCCH resource for ACK/NACK transmission. 'Explicit #1 with ARI' and 'Explicit #2 with ARI' represent plural (e.g. 4) explicit PUCCH resource pairs predesignated by RRC. Which pair among the plural explicit PUCCH resource pairs is used by the UE to transmit a PUCCH is indicated through an ARI. In this case, TPC fields of CC1-PDCCH with DA1 and CC1-PDCCH with DAI=2 may be used as ARIs.

In Table 47 and Table 48, 'Explicit #1 with ARI' and 'Explicit #2 with ARI' which are the plural (e.g. 4) explicit PUCCH resource pairs pre-designated by RRC may mean PUCCH resources of CC2. Therefore, the UE may use PUCCH channel selection for ACK/NACK transmission for CC1 and CC2 and transmit corresponding ACK/NACK information through the PUCCH resources on CC2.

E. ACK/NACK Transmission During Deactivation of A-CC

If an A-CC which is a CC used for transmission of ACK/NACK information for multiple CCs is an SCC and the A-CC is deactivated, a CC which is to be used as the A-CC needs to be redesignated. However, if such an operation is not smoothly performed and a new A-CC is not redesignated although the existing A-CC is deactivated, the UE may transmit ACK/NACK information through the following methods.

E.1. Return to an ACK/NACK Transmission Scheme According to a Legacy System:

When a new A-CC is not redesignated although an A-CC is deactivated, it is proposed that the UE apply a conventional scheme (e.g. PUCCH format 3/1a/1b only on a PCC). If the A-CC is activated again, the UE may transmit a PUCCH on a corresponding CC according to any one of the above-described embodiments of the present invention. For example, if the A-CC is activated again, the UE may transmit ACK/NACK information using PUCCH format 1a/1b on a PCC or transmit ACK/NACK information using PUCCH format 3 on the A-CC.

E.2. ACK/NACK Transmission by Regarding a PCC as an ACC:

When a new A-CC is not redesignated although an ACC of a specific group is deactivated, the UE may transmit ACK/NACK information in the group on a PCC by regarding the PCC as the A-CC of the group. The PCC may or may not belong to the group. In order to support the above operation, the eNB allocates PUCCH format 3 even to the PCC in consideration of PUCCH transmission on the PCC rather than the existing A-CC.

E.3. ACK/NACK Transmission by Regarding a Specific CC as an ACC

When a new A-CC is not redesignated although an A-CC of a specific group is deactivated, the UE may transmit ACK/NACK information in the group on a specific CC by regarding the specific CC (in the group) as an A-CC. Characteristically, the specific CC carrying ACK/NACK information may be an SCC having the lowest SCC index (in the group). To support the above operation, the eNB may allocate a region of PUCCH format 3 to all CCs (e.g. in TDD) or all SCCs (e.g. in FDD) in consideration of PUCCH transmission on a CC rather than the A-CC. Characteristically, a CC on which ACK/NACK information is transmitted may be a scheduling CC of PDSCH(s) associated with corresponding ACK/NACK information (in the group).

In TDD, when all SCCs are deactivated, it is proposed that that the UE perform an operation of regarding a PCC as an A-CC. When all SCCs are deactivated in TDD, ACK/NACK transmission through PUCCH format 3 may be performed in addition to ACK/NACK transmission through PUCCH format 1a/1b. In FDD, when all SCCs are deactivated, only ACK/NACK transmission through PUCCH format 1a/1b on a PCC may be performed.

If a new A-CC is not redesignated although an A-CC of a specific group is deactivated in consideration of a different TDD environment, i.e. different TDD UL-DL configurations of carrier-aggregated CA, the UE may transmit ACK/NACK information in the group on the specific CC by regarding one of CCs having the same TDD configuration as an existing A-CC (e.g. a CC having the lowest serving cell index among CCs having the same TDD configuration as an existing A-CC) among CCs in the group or all CCs as an A-CC. When the same CC as the deactivated A-CC is not present, the PCC is regarded as the A-CC.

If an A-CC is configured as an SCC having the lowest index among serving cell indexes, the present invention proposes that the eNB individually allocate a resource (set) of PUCCH format 3 to all CCs (e.g. in TDD) or all SCCs (e.g. in FDD).

The SCC having the lowest index is preferably an SCC having the lowest index among SCCs in an activated state on UL.

Although the above description has been given specifically in the case in which ACK/NACK for a PDSCH transmitted together with a PDCCH is transmitted, this patent may be applied even when ACK/NACK for the PDSCH without the PDCCH is transmitted or ACK for the PDCCH is transmitted (e.g. ACK for a PDCCH including SPS release information is transmitted).

F. UL Transmission Timing, Power Control, and Sequence

The UE may transmit ACK/NACK information at a UL transmission timing of a PCC upon transmitting the ACK/NACK information through a PUCCH resource on the PCC and transmit the ACK/NACK information at a UL transmission timing of an SCC upon transmitting the ACK/NACK information through a PUCCH resource on the SCC. That is, the UE may use a timing advance (TA) value of the PCC as a TA value applied when the ACK/NACK information is transmitted through the PUCCH resource on the PCC and use a TA value of the SCC as a TA value applied when the ACK/NACK information is transmitted through the PUCCH resource on the SCC. This may be extended such that the UE conforms to a TA value of a CC on which ACK/NACK (PUCCH) is transmitted in order to adjust a transmission timing upon transmitting ACK/NACK.

The UE may perform power control for ACK/NACK transmission according to UL transmit power of the PCC upon transmitting the ACK/NACK information on the PCC and perform power control for ACK/NACK transmission according to UL transmit power of the SCC upon transmitting the ACK/NACK information on the SCC. That is, the UE may adjust transmit power according to TPC for a PUCCH transmitted on the PCC upon transmitting the ACK/NACK information through the PUCCH resource on the PCC and adjust transmit power according to TPC for a PUCCH transmitted on the SCC upon transmitting the ACK/NACK information through the PUCCH resource on the SCC. This may be extended such that, upon transmitting a PUCCH having ACK/NACK information on CC1, the UE conforms to TPC for the PUCCH transmitted on CC1 in order to adjust transmit power of the PUCCH.

Upon transmitting the ACK/NACK information on the PCC, the UE may perform ACK/NACK (PUCCH) transmission using a sequence generated based on a cell IC ($N^{cell}_{ID}$) a cyclic shift, and/or an orthogonal cover used in the PCC and upon transmitting the ACK/NACK information on the SCC, the UE may perform ACK/NACK (PUCCH) transmission using a sequence generated based on a cell ID, a cyclic shift, and/or an orthogonal cover used in the SCC. This may be extended such that the UE transmits ACK/NACK (PUCCH) using a sequence generated based on a cell ID, a cyclic shift, and/or an orthogonal cover used in a CC on which a PUCCH including the ACK/NACK information is transmitted.

The eNB according to the present invention may configure ACK/NACK information transmission about whether to transmit the ACK/NACK information only on the PCC according to an existing scheme or transmit the ACK/NACK information on the A-CC according to any one of the embodiments of the present invention. The eNB may inform the UE of configuration of ACK/NACK information transmission.

Figure 17:
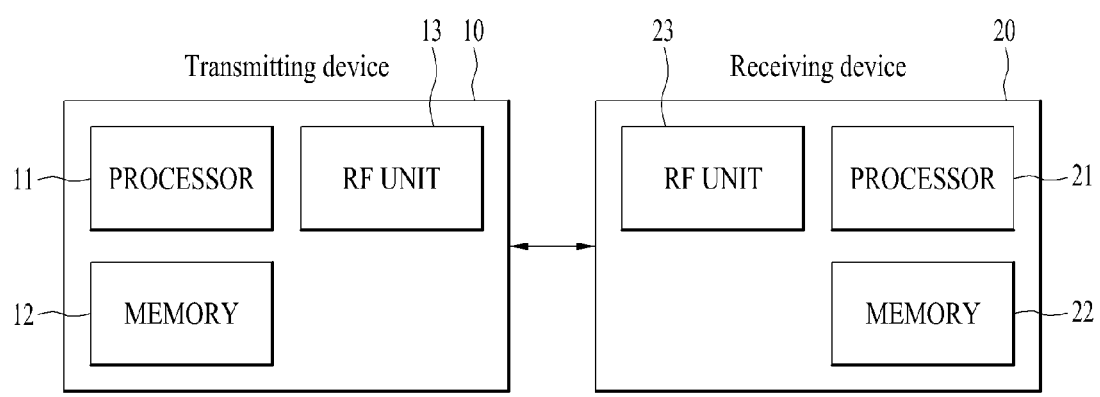
FIG. 17 is a block diagram illustrating elements of a transmitting device 10 and a receiving device 20 for implementing the present invention.

FIG. 17 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

[1] A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor and the UE processor of the present invention may map CCs configured for the UE to CC groups for ACK/NACK transmission according to any one of embodiments A.1 to A.4 of the present invention. The eNB processor and the UE processor of the present invention may configure an A-CC per CC group according to any one of embodiments B.1 to B.9. The UE processor of the present invention may cause the UE RF unit to transmit ACK/NACK information for a CC group over a PUCCH on an A-CC according to any one of embodiments C.1, C.2, D.1, and D.2 of the present invention. The UE processor of the present invention may control the UE RF unit so that the UE RF unit transmits ACK/NACK information for a CC group according to any one of embodiments E.1 to E.3 of the present invention when the A-CC is deactivated. The eNB processor of the present invention may control the eNB RF unit so that the eNB RF unit receives the ACK/NACK information for a CC group according to embodiments E.1 to E.3 of the present invention when the A-CC is deactivated. The UE processor of the present invention may perform UL transmission timing and/or power control and generate a sequence for PUCCH transmission according to embodiment F of the present invention. The eNB processor of the present invention may detect PUCCH transmission at the UL transmission timing according to embodiment F of the present invention and perform power control according to embodiment F of the present invention. In addition, the eNB processor of the present invention may detect a PUCCH using the sequence according to embodiment F of the present invention.

FIG. 18 is a flow diagram illustrating an example of ACK/NACK transmission according to an embodiment of the present invention. As illustrated in FIG. 18, if the UE receives only a PCC PDCCH, the UE transmits the ACK/NACK through the PCC. However, if the UE did not receive only a PCC PDCCH, that is, if the UE received at least one SCC PDCCH, then the UE transmits the ACK/NACK through an A-CC.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to an eNB, a UE, or other devices in a wireless communication system.

The invention claimed is:

1. A method for transmitting uplink control information by a user equipment, the method comprising:
    receiving, by the user equipment, at least one physical downlink control channel (PDCCH) for a first cell group of the user equipment, wherein the first cell group comprises a primary cell (Pcell) and one or more secondary cells (Scells) among multiple cells with which the user equipment is configured; and
    generating, by the user equipment, first acknowledgement (ACK)/negative acknowledgement (NACK) information for the first cell group; and
    transmitting, by the user equipment, a first physical uplink control channel (PUCCH) carrying the first ACK/NACK information through the Pcell when the user equipment receives a Pcell physical downlink control channel (PDCCH) only, and through a first Scell configured for ACK/NACK transmission of the first cell group among the one or more Scells of the first cell group when the user equipment receives at least one Scell PDCCH,
    wherein the Pcell PDCCH carries scheduling information for a primary cell (Pcell), and the at least one Scell PDCCH carries scheduling information for a Scell included in the first cell group, and
    wherein the first PUCCH is transmitted using a timing advance value of the Pcell when the user equipment transmits the first PUCCH through the first Pcell and the first PUCCH is transmitted using a timing advance value of the first Scell when the user equipment transmits the first PUCCH through the first Scell.

2. The method according to claim 1, wherein transmitting the first PUCCH comprises:
    transmitting the first PUCCH through the first Scell using PUCCH format 3 when the user equipment receives the Scell PDCCH or receives the Pcell and Scell PDCCHs.

3. The method according to claim 2, wherein when the user equipment operates in frequency division duplex (FDD), transmitting the first PUCCH comprises:
    transmitting the first PUCCH through the Pcell using PUCCH format 1a/1b when the user equipment receives the Pcell PDCCH only.

4. The method according to claim 2, wherein when the user equipment operates in time division duplex (TDD), transmitting the first PUCCH comprises:
    transmitting the first PUCCH through the Pcell using PUCCH format 1a/1b when the user equipment receives the Pcell PDCCH only and when a downlink assignment index (DAI) for the Pcell in the Pcell PDCCH is 1 (DAI=1); and
    transmitting the first PUCCH through the Pcell using PUCCH format 3 when the user equipment receives the Pcell PDCCH only and when the DAI for the Pcell is greater than 1 (DAI>1).

5. The method according to claim 1, the method further comprising:
    receiving, by the user equipment, at least one Scell PDCCH for a second cell group comprised of Scells other than the one or more Scells of the first cell group and no Pcell among the multiple cells;
    generating second ACK/NACK information for the second cell group; and
    transmitting a second PUCCH carrying the second ACK/NACK information through a second Scell configured for ACK/NACK transmission of the second cell group among the Scells of the second cell group.

6. The method according to claim 1, wherein the Pcell can be accessed as a standalone cell and each Scell of the multiple cells can be used only when aggregated with the Pcell.

7. A user equipment for transmitting uplink control information, the user equipment comprising:
a radio frequency (RF) unit, and
a processor that:
controls the RF unit to receive at least one physical downlink control channel (PDCCH) for a first cell group of the user equipment, wherein the first cell group comprises a primary cell (Pcell) and one or more secondary cells (Scells) among multiple cells with which the user equipment is configured;
generates first acknowledgement (ACK)/negative acknowledgement (NACK) information for the first cell group; and
controls the RF unit to transmit a first physical uplink control channel (PUCCH) carrying the first ACK/NACK information through the Pcell when the RF unit receives a Pcell physical downlink control channel (PDCCH) only, and through a first Scell configured for ACK/NACK transmission of the first cell group among the one or more Scells of the first cell group when the RF unit receives at least one Scell PDCCH,
wherein the Pcell PDCCH carries scheduling information for a primary cell (Pcell), and the at least one Scell PDCCH carries scheduling information for a Scell included in the first cell group, and
wherein the first PUCCH is transmitted using a timing advance value of the Pcell when the user equipment transmits the first PUCCH through the first Pcell and the first PUCCH is transmitted using a timing advance value of the first Scell when the user equipment transmits the first PUCCH through the first Scell.

8. The user equipment according to claim 7,
wherein the processor further controls the RF unit to transmit the first PUCCH through the first Scell using PUCCH format 3 when the user equipment receives the Scell PDCCH or receives the Pcell and Scell PDCCHs.

9. The user equipment according to claim 8,
wherein when the user equipment operates in frequency division duplex (FDD), the processor further controls the RF unit to transmit the first PUCCH through the Pcell using PUCCH format 1a/1b when the user equipment receives the Pcell PDCCH only.

10. The user equipment according to claim 8,
wherein when the user equipment operates in time division duplex (TDD), the processor further:
controls the RF unit to transmit the first PUCCH through the Pcell using PUCCH format 1a/1b when the user equipment receives the Pcell PDCCH only and when a downlink assignment index (DAI) for the Pcell in the Pcell PDCCH is 1 (DAI=1), and
controls the RF unit to transmit the first PUCCH through the Pcell using PUCCH format 3 when the user equipment receives the Pcell PDCCH only and when the DAI for the Pcell is greater than 1 (DAI>1).

11. The user equipment according to claim 7, wherein the processor further:
controls the RF unit to receive at least one Scell PDCCH for a second cell group comprised of Scells other than the one or more Scells of the first cell group and no Pcell among the multiple cells;
generates second ACK/NACK information for the second cell group; and
controls the RF unit to transmit a second PUCCH carrying the second ACK/NACK information through a second Scell configured for ACK/NACK transmission of the second cell group among the Scells of the second cell group.

12. The user equipment according to claim 7, wherein the Pcell can be accessed as a standalone cell and each Scell of the multiple cells can be used only when aggregated with the Pcell.

13. A method for receiving uplink control information by a base station, the method comprising:
transmitting, by the base station, at least one physical downlink control channel (PDCCH) for a first cell group of a user equipment, wherein the first cell group comprises a primary cell (Pcell) and one or more secondary cells (Scells) among the multiple cells with which the user equipment is configured, and
receiving, by the base station, a first physical uplink control channel (PUCCH) carrying first ACK/NACK information for the first cell group through the Pcell when the base station transmits a Pcell physical downlink control channel (PDCCH) only, and through a first Scell configured for ACK/NACK reception of the first cell group among the one or more Scells of the first cell group when the base station transmits at least one Scell PDCCH,
wherein the Pcell PDCCH carries scheduling information for a primary cell (Pcell), and the at least one Scell PDCCH carries scheduling information for a Scell included in the first cell group, and
wherein the first PUCCH is received using a timing advance value of the Pcell when the base station receives the first PUCCH through the first Pcell and the first PUCCH is received using a timing advance value of the first Scell when the base station receives the first PUCCH through the first Scell.

14. The method according to claim 13, wherein the Pcell can be accessed as a standalone cell and each Scell of the multiple cells can be used only when aggregated with the Pcell.

15. A base station for receiving uplink control information, the base station comprising:
a radio frequency (RF) unit; and
a processor that:
controls the RF unit to transmit at least one physical downlink control channel (PDCCH) for a first cell group of a user equipment, wherein the first cell group comprises a primary cell (Pcell) and one or more secondary cells (Scells) among the multiple cells with which the user equipment is configured; and
controls the RF unit to receive a first physical uplink control channel (PUCCH) carrying first ACK/NACK information for the first cell group through the Pcell when the base station transmits a Pcell physical downlink control channel (PDCCH) only, and through a first Scell configured for ACK/NACK reception of the first cell group among the one or more Scells of the first cell group when the base station transmits at least one Scell PDCCH,
wherein the Pcell PDCCH carries scheduling information for a primary cell (Pcell), and the at least one Scell PDCCH carries scheduling information for a Scell included in the first cell group, and
wherein the first PUCCH is received using a timing advance value of the Pcell when the base station receives the first PUCCH through the first Pcell and the first PUCCH is received using a timing advance value of the first Scell when the base station receives the first PUCCH through the first Scell.

16. The base station according to claim 15, wherein the Pcell can be accessed as a standalone cell and each Scell of the multiple cells can be used only when aggregated with the Pcell.

\* \* \* \* \*